United States Patent
Nagashima et al.

(10) Patent No.: US 7,455,400 B2
(45) Date of Patent: Nov. 25, 2008

(54) AQUEOUS FLUORESCENT INK, IMAGE RECORDING METHOD AND RECORDED IMAGE

(75) Inventors: Akira Nagashima, Tokyo (JP);
Sadayuki Sugama, Tsukuba (JP);
Masako Udagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 11/234,305

(22) Filed: Sep. 26, 2005

(65) Prior Publication Data

US 2006/0012657 A1    Jan. 19, 2006

Related U.S. Application Data

(63) Continuation of application No. PCT/JP03/08107, filed on Jun. 26, 2003.

(30) Foreign Application Priority Data

May 2, 2003    (JP)    ............................. 2003-162988

(51) Int. Cl.
*C09D 11/00*    (2006.01)

(52) U.S. Cl. ................... 347/100; 347/105; 106/31.16; 106/31.27; 106/31.15; 106/31.13; 428/32.1

(58) Field of Classification Search .................. 347/100, 347/105; 106/31.6, 31.15, 31.13, 31.27; 428/195, 32.1

See application file for complete search history.

(56) References Cited

U.S. PATENT DOCUMENTS

| | | | |
|---|---|---|---|
| 4,313,124 A | 1/1982 | Hara ........................ | 346/140 R |
| 4,345,262 A | 8/1982 | Shirato et al. ............ | 346/140 R |
| 4,459,600 A | 7/1984 | Sato et al. ................ | 346/140 R |
| 4,463,359 A | 7/1984 | Ayata et al. ............... | 346/1.1 |
| 4,558,333 A | 12/1985 | Sugitani et al. .......... | 346/140 R |
| 4,723,129 A | 2/1988 | Endo et al. ................ | 346/1.1 |
| 4,740,796 A | 4/1988 | Endo et al. ................ | 346/1.1 |
| 5,078,790 A | 1/1992 | Tochihara et al. .......... | 106/20 |
| 5,080,716 A | 1/1992 | Aoki et al. ................ | 106/20 |

(Continued)

FOREIGN PATENT DOCUMENTS

DE    29 42 128    4/1981

(Continued)

OTHER PUBLICATIONS

Office action from the Indian Patent Office dated Jul. 26, 2007.
Russian Office Action with English-language translation.
Nov. 3, 2006 Chinese Official Action (with English-language translation).

*Primary Examiner*—Manish S Shah
*Assistant Examiner*—Laura E Martin
(74) *Attorney, Agent, or Firm*—Fitzpatrick, Cella, Harper & Scinto

(57) ABSTRACT

The invention is to provide an aqueous ink, a recorded image and a recording method capable of improving an image fastness and a color-developing property of a recorded image, and is featured in that components of the aqueous ink are so prepared as to realize, at least on a surface portion of a recording medium, a fixed state of an ink droplet in which a contour portion of a second coloring material is formed around a central portion in which a first coloring material is fixed.

12 Claims, 18 Drawing Sheets

U.S. PATENT DOCUMENTS

| | | | | |
|---|---|---|---|---|
| 5,131,949 | A | 7/1992 | Tochihara et al. | 106/20 |
| 5,132,700 | A | 7/1992 | Tochihara et al. | 346/1.1 |
| 5,200,164 | A | 4/1993 | Medalia et al. | 423/265 |
| 5,213,613 | A | 5/1993 | Nagashima et al. | 106/20 R |
| 5,221,334 | A | 6/1993 | Ma et al. | 106/20 D |
| 5,258,066 | A | 11/1993 | Kobayashi et al. | 106/22 R |
| 5,272,201 | A | 12/1993 | Ma et al. | 524/505 |
| 5,296,022 | A | 3/1994 | Kobayashi et al. | 106/20 D |
| 5,409,529 | A | 4/1995 | Nagashima et al. | 106/22 H |
| 5,451,251 | A | 9/1995 | Mafune et al. | 106/22 HI |
| 5,478,383 | A | 12/1995 | Nagashima et al. | 106/22 H |
| 5,482,545 | A | 1/1996 | Aoki et al. | 106/22 K |
| 5,519,085 | A | 5/1996 | Ma et al. | 524/503 |
| 5,554,793 | A | 9/1996 | Hartwell et al. | 564/470 |
| 5,571,311 | A | 11/1996 | Belmont et al. | 106/20 R |
| 5,571,313 | A | 11/1996 | Mafune et al. | 106/22 H |
| 5,609,671 | A | 3/1997 | Nagasawa | 106/20 R |
| 5,733,363 | A | 3/1998 | Nagashima et al. | 106/31.43 |
| 5,852,075 | A | 12/1998 | Held | 523/161 |
| 5,854,331 | A | 12/1998 | Ma et al. | 524/505 |
| 5,865,883 | A | 2/1999 | Teraoka et al. | 106/31.32 |
| 5,936,649 | A | 8/1999 | Ikeda et al. | 347/87 |
| 6,117,921 | A | 9/2000 | Ma et al. | 523/161 |
| 6,176,908 | B1 | 1/2001 | Bauer et al. | 106/31.15 |
| 6,387,168 | B1 | 5/2002 | Koitabashi et al. | 106/31.6 |
| 6,676,254 | B2 | 1/2004 | Nagashima et al. | 347/100 |
| 6,676,734 | B2 | 1/2004 | Nagashima et al. | 106/31.32 |
| 2002/0047884 | A1 | 4/2002 | Nagashima et al. | 347/100 |
| 2004/0027404 | A1 | 2/2004 | Nagashima et al. | 347/8 |
| 2004/0074419 | A1 | 4/2004 | Nagashima et al. | 106/31.32 |
| 2004/0231554 | A1 | 11/2004 | Udagawa et al. | 106/31.15 |
| 2005/0005818 | A1 | 1/2005 | Sato et al. | 106/31.27 |
| 2005/0052515 | A1 | 3/2005 | Udagawa et al. | 347/100 |
| 2005/0088501 | A1 | 4/2005 | Nagashima et al. | 347/100 |
| 2005/0109952 | A1 | 5/2005 | Udagawa et al. | 250/461.1 |
| 2005/0195243 | A1 | 9/2005 | Nagashima et al. | 347/54 |
| 2005/0204955 | A1 | 9/2005 | Nagashima et al. | 106/31.59 |
| 2006/0007288 | A1 | 1/2006 | Takaka et al. | 347/100 |
| 2006/0012657 | A1 | 1/2006 | Nagashima et al. | 347/100 |
| 2006/0021545 | A1 | 2/2006 | Nagashima et al. | 106/31.27 |
| 2006/0096498 | A1 | 5/2006 | Tsujimura et al. | 106/31.27 |
| 2006/0098067 | A1 | 5/2006 | Imai et al. | 347/100 |
| 2006/0098068 | A1 | 5/2006 | Hakamada et al. | 347/100 |
| 2006/0100311 | A1 | 5/2006 | Tokuda et al. | 523/160 |
| 2006/0103703 | A1 | 5/2006 | Nito et al. | 347/100 |
| 2006/0103704 | A1 | 5/2006 | Hakamada et al. | 347/100 |
| 2006/0125896 | A1 | 6/2006 | Aikawa et al. | 347/100 |
| 2006/0137569 | A1 | 6/2006 | Osumi et al. | 106/31.13 |
| 2006/0137570 | A1 | 6/2006 | Osumi et al. | 106/31.27 |
| 2006/0139428 | A1 | 6/2006 | Osumi et al. | 347/100 |
| 2006/0139429 | A1 | 6/2006 | Osumi et al. | 347/100 |
| 2006/0142417 | A1 | 6/2006 | Kaneko et al. | 523/160 |
| 2006/0152570 | A1 | 7/2006 | Ishikawa et al. | 347/105 |
| 2006/0192827 | A1 | 8/2006 | Takada et al. | 347/100 |
| 2006/0194056 | A1 | 8/2006 | Nagashima et al. | 428/403 |
| 2006/0194897 | A1 | 8/2006 | Kawabe et al. | 523/160 |

FOREIGN PATENT DOCUMENTS

| | | |
|---|---|---|
| EP | 0 027 606 | 4/1981 |
| EP | 1 046 687 A1 | 10/2000 |
| JP | 56-155262 | 12/1981 |
| JP | 60-45669 B2 | 10/1985 |
| JP | 60-231777 | 11/1985 |
| JP | 60231777 A * | 11/1985 |
| JP | 59-123670 | 3/1989 |
| JP | 1-245072 | 9/1989 |
| JP | 5-179183 | 7/1993 |
| JP | 6-136311 | 5/1994 |
| JP | 7-53841 | 2/1995 |
| JP | 8-3498 | 1/1996 |
| JP | 8-239610 | 9/1996 |
| JP | 10-7956 | 1/1998 |
| JP | 10-87768 | 4/1998 |
| JP | 11-43639 | 2/1999 |
| JP | 11-80632 | 3/1999 |
| JP | 11-236502 | 8/1999 |
| JP | 11-269418 | 10/1999 |
| JP | 2000-303008 | 10/2000 |
| JP | 2002-226740 | 8/2002 |
| JP | 2003-113331 | 4/2003 |
| RU | 2 100 397 | 12/1997 |
| WO | WO 02/057386 | 7/2002 |
| WO | WO 02/092707 A1 | 11/2002 |

* cited by examiner

PLAN VIEW

SECTION VIEW

RECORDING MEDIUM

WATER-SOLUBLE COLORING MATERIAL DISSOLVED IN ALMOST MONOMOLECULAR STATE

ASSEMBLY OF WATER-DISPERSIBLE COLORING MATERIAL

CELLULOSE FIBER

PORTION DYED WITH WATER-SOLUBLE COLORING MATERIAL

AQUEOUS FLUORESCENT INK, IMAGE RECORDING METHOD AND RECORDED IMAGE

This application is a continuation of International Application No. PCT/JP03/08107 filed Jun. 26, 2003, which claims the benefit of Japanese Patent Application No. 2003-162988, filed May 2, 2003.

BACKGROUND OF THE INVENTION

1. Field of the Invention

The present invention relates to a printing ink containing a first coloring material and a second coloring material, in which at least one of the coloring materials includes a fluorescent coloring material and the first coloring material and the second coloring material form a separated state on a recording medium, and a printing ink capable of providing a printed image with improved fluorescent properties. The present invention also relates to a recorded image and an image forming method utilizing such ink. More specifically, the present invention relates to related technologies based on a novel technical idea for solving decrease in fluorescence and for enhancing fluorescence properties by separating the fluorescent region and the coloring region, more specifically by forming a region on a recording medium where dots of coagulated first coloring material are scattered in a region of the fixed second coloring material thereby significantly reducing absorption of the fluorescent emission energy from the fluorescent coloring material by the coexistent coloring material. It also relates to interrelated technologies based on a novel concept for improving fluorescence emission characteristics of a second fluorescent coloring material employed in a printing ink including a first fluorescent coloring material that, on excitation at a predetermined excitation wavelength, fluoresces in a wavelength range including a predetermined wavelength utilized for measurement or determination.

2. Related Background Art

Conventionally, water-soluble coloring materials have been used as the coloring material for aqueous inks, so that most inks show excellent color development and satisfactory resistance to coagulation or association of the coloring material, as well as good reliability such as clogging resistance and stability with time. On the other hand, these inks are insufficient in fastness of a recorded image, such as water resistance. Regarding fluorescent properties, in particular, the good solubility of the coloring material allows satisfactory fluorescence, but the intensity cannot be enhanced because of the concentration quenching (a phenomenon of fluorescence decrease when the content of the coloring material exceeds a certain amount). For example, U.S. Pat. No. 6,176,908 (patent reference 1) proposes an ink utilizing a polymer dispersant, a pigment and a fluorescent dye.

In the above proposal; however, when an ink droplet is applied onto a recording medium, the polymer dispersant, the pigment and the fluorescent dye are deposited in a solid coagulation state (FIG. 2) in the entire system, whereby the image density of a record increases but the color-developing property including fluorescence emission is not so much improved as expected because of the aforementioned concentration quenching phenomenon.

Such a drawback might be overcome, if limited to improvement of PMU (an index representing the fluorescence intensity) described in the above proposal, by controlling the print area to be measured for the fluorescent intensity, but it will be difficult in the ordinary use.

Meanwhile, for improving the water resistance, it has been proposed to employ a coloring material having carboxyl group as a water-soluble group. This proposal utilizes dissociation characteristics of the carboxylic acid constituting the water-soluble group, and, when pH of the ink shifts acidic on the recording medium, the solubility of the coloring material in water decreases and the coloring material coagulates to improve the water resistance.

In such a proposal, however, the water resistance is improved by coagulation or association of the coloring material due to decreased solubility of the coloring material in water, so there arises a problem that the color-developing properties of the coloring material is lowered. In particular, it is difficult to improve the fluorescent emission because of coagulation or association of the coloring material.

Also in order to avoid the aforementioned concentration quenching (a phenomenon of decrease in fluorescence when the content of the coloring material exceeds a certain amount) and to increase the image density of a record, for example, WO 02/092707 (patent reference 2) proposes a method of combined use of plural coloring materials in such a manner that the fluorescence emission wavelength range of a coloring material overlaps as less as possible with the absorption wavelength range of a coexistent coloring material to improve fluorescent emission of a recorded image.

Such proposals can increase the fluorescent intensity and the density of the recorded image to a certain extent but still insufficient. Also in the WO 02/092707 (patent reference 2), the fastness of the recorded image is still insufficient requiring much improvement in the water resistance and the light fastness.

Recently, in order to improve fastness of the recorded image such as water resistance and light fastness, there has been proposed an aqueous ink employing a combination of a water-dispersible color material such as carbon black or an organic pigment and a colored resin incorporating a water-soluble coloring material. For example, Japanese Unexamined Patent Publication No. 8-239610 (patent reference 3) discloses an aqueous ink containing a water-dispersible coloring material dispersed in an aqueous system by the action of a resin and an emulsion of a water-soluble coloring material emulsified with an emulsifier or a resin for enhancing color-developing property. Also WO 02/092707 (patent reference 2) proposes utilization of a pigment including a fluorescent coloring material.

When such an ink is placed on a recording medium, water or the liquid medium evaporates from or penetrates and diffuses into the recording medium to cause coagulation of the dispersed coloring material, thereby the fastness of the recorded image such as the water resistance or light fastness is improved. At the same time, the water-soluble coloring material incorporated in a resin etc. will not readily coagulate or associate by itself, thereby providing a satisfactory color-developing property, particularly fluorescence emission. However, since the ink contains a large amount of a resin, emulsifier etc., the ink-viscosity tends to increase, and, such coloring materials-employed in a larger amount tends to deteriorate the fixing-drying properties of the recorded image.

Also such ink is deficient in the resistance to solidification and tends to show a solidification of the pigment component when left standing in an environment of a normal temperature. For example, when such ink is used in an ink jet head, destruction of the stable dispersion of the coloring material tends to occur by evaporation of the water or liquid medium of the ink in the vicinity of the nozzle of the head to cause coagulation of the coloring material, whereby ink solidification or a nozzle clogging may occur. Also in an ink jet recording head for discharging an ink droplet by the action of thermal energy applied to the ink, the dispersed coloring material tends to be deposited on a heater, thereby the reliability of the ink discharge property of the head is significantly deteriorated.

Thus, the above-mentioned proposals can improve the water resistance and the light fastness for the water-soluble dye in the record, but may deteriorate the fixing-drying property of the recorded image and the resistance to solidification when the recording density of the image is raised. Also when such ink is used for the ink jet recording method, nozzle clogging or discharge failure may occur.

In recent years, various applications have been requested for ink. As such applications, in addition to formation of beautiful color images, there are proposed, for example, use of fluorescence ink for providing information (such as security information) in addition to visual information, by printing information such as characters, numbers, symbols, or barcodes with such an ink on a recording medium and irradiating UV light of an appropriate wavelength to generate colored fluorescence from the fluorescence ink. Specifically, in a system for reading out authentication (anti-counterfeit) information or security information using-an apparatus to excite fluorescence and read the emission intensity thereof, a fluorescent coloring agent is excited by excitation light of a predetermined wavelength (e.g., 254 nm) to fluoresce, and the fluorescence is determined or measured.

Regarding the coloring materials in the ink, dyes can provide a predetermined color easily but occasionally poor water-resistance, while pigments can give excellent water resistance but not the predetermined color tone occasionally. In view of the above, there is proposed ink containing both dye and pigment to obtain an ink capable of providing an image excellent in both water-resistance and color tone. For example, Japanese Examined. Patent Publication S60-45669 (Patent reference 4) discloses a recording liquid that contains a water-soluble red dye (e.g., Acid Red 52) and a red pigment as recording agents, and a polymer dispersant for dispersing the pigment in a liquid medium.

In the mailing systems of the United States, printing with fluorescent red is common, and a dye such as Acid Red 52 (AR52), which is described in the above publication, is used as a fluorescent dye. U.S. Pat. No. 6,176,908 (Patent reference 1) discloses an ink containing a fluorescent dye, a pigment and a polymer as a dispersant for the pigment, exemplifying AR52 as a fluorescent dye. It should be noted, it had been a well-known design matter long before U.S. Pat. No. 6,176,908 to adjust the final color shade according to human visual sensation by combination of dyes.

U.S. Pat. No. 6,176,908 provides an inkjet ink containing a pigment in addition to a fluorescent dye for improving the water-resistance of the ink as with JP S60-45669B (Patent reference 4), and there are described addition of two kinds of fluorescent dyes for the known object of visible (visual) color adjustment, and also additives for improving fluorescence intensity (PMU level) to the system. Concrete ink examples of improved fluorescence intensity (PMU level) contain solvents such as water, 2-pyrrolidone, and tetraethylene glycol, and the following fluorescent coloring materials other than the pigment-related component comprised of a pigment, a polymer and tetraethylene glycol or diethylene glycol. As the fluorescent coloring materials, a combination of AR52 (0.4% by mass, 0.5% by mass to 3.0% by mass) and one of AY7, AY73, and DY96, and a combination of basic violet (RHDB) and basic yellow (BY40) are described, for example.

JP H11-80632A (Patent reference 5) discloses an invisible fluorescence aqueous ink containing three different fluorescent coloring materials (a fluorescence brightening agent, a yellow fluorescent dye of a coumarin derivative, and a red fluorescent dye of rhodamine-B or rhodamine-6G), and postcard printing using the ink. In the technical descriptions thereof, each of these three fluorescent coloring materials emits light under UV light irradiation to excite the other coloring material sequentially leading to final fluorescence emission having a wavelength peak at 587 nm. In this publication, however, there is no concrete description about excitation wavelengths, and the technical description is made using a result that the ink and the recorded image show the same fluorescence characteristics. Generally, water absorbs UV light, so that the fluorescence of a recorded image will be different from that of the ink used. Judging from this, the invention described in the publication lacks technical credibility. WO 02/092707 (Patent reference 2) discloses an ink that can form a dark image and also exhibit fluorescence of a predetermined color when exposed exciting radiation. The ink contains a plurality of dyes (e.g., red and yellow fluorescent dyes, a blue dye, and a black dye) as with the patent reference 5, but differs from the patent reference 3 in that dyes are selected such that the longer wavelength absorption band and the shorter wavelength emission band would not overlap. In this publication, the relationship between the fluorescent coloring materials is not analyzed sufficiently so that the desired fluorescence intensity cannot always be obtained. JP 2003-113331A (Patent reference 6) discloses an invention for improving the fluorescence characteristics of ink in terms of the relationship between solvents and fluorescent coloring materials. In other words, the patent reference 6 discloses a recording ink that includes two fluorescent coloring materials of the same color (there is an example where a non-fluorescent coloring material is added), two different organic solvents (e.g., glycerin and a nonionic surfactant) which have no compatibility to each other, and pure water for dissolving these components.

Patent reference 1: U.S. Pat. No. 6,176,908;

Patent-reference 2: WO 02/092707;

Patent reference 3: Japanese Unexamined Patent Publication No. 8-239610;

Patent reference 4: Japanese Examined Patent Publication No. 60-45669;

Patent reference 5: Japanese Unexamined Patent Publication No. 11-80632;

Patent reference 6: Japanese Unexamined Patent Publication No. 2003-113331.

As explained above, there has not been proposed an aqueous ink that can provide excellent water resistance, recorded image density, and particularly color-developing properties including fluorescence with high reliability. An object of the present invention is to provide an ink capable of solving the aforementioned problems.

In particular, the present invention is to provide an ink that is less affected by the absorption characteristics of a coloring material used in the ink, clarifying "the problem of fluorescence loss according to the absorption characteristics of the coloring material of joint use (light absorption due to the color of a coloring material)", one of the major factors inhibiting the fluorescence emission, by analyzing a fixed state of the ink on the recording medium based on a novel technical concept, whereby providing a recorded image with satisfactory fluorescent emission on a recording medium and a method forming such an image.

SUMMARY OF THE INVENTION

The above-mentioned objects can be attained by the present invention in the following embodiments.

More specifically, the present invention provides an aqueous single fluorescent ink capable of forming a first region in a central part where a first coloring material is concentrated including a second coloring material and forming a second region on the entire periphery of the first region including the inside of the recording medium where the second coloring material is present alone, wherein the aqueous single fluorescent ink contains a first coloring material, a second coloring material and a liquid medium and water for dissolving or dispersing the coloring materials and at least either of the first coloring material and the second coloring material is a fluorescent coloring material.

Also the present invention provides a recorded image that comprises a first region formed in a central part where a first coloring material is concentrated with a second coloring material and a second region formed on the entire periphery of the first region including the inside of the recording medium where the second coloring material is present alone, wherein at least either of the first coloring material and the second coloring material is a fluorescent coloring material.

Also the present invention provides an aqueous single fluorescent ink comprising a first coloring material, a second coloring material, and a liquid medium and water for dissolving or dispersing the coloring materials, wherein at least either of the first coloring material and the second coloring material is a fluorescent coloring material, the ink being capable of forming on a recording medium a fixed region containing a plurality of scattered minute spots of the first coloring material in a coagulated state in a region where a second coloring material is fixed.

Also the present invention provides a recorded image formed on a recording medium that comprises a coloring material fixed portion wherein a plurality of a coagulated first coloring material are present scattered in a fixed portion of a second coloring material, wherein at least either of the first coloring material and the second coloring material is a fluorescent coloring material.

Also the present invention provides a recorded image-forming method comprising a step of forming on a recording medium an image with plural dots by applying an aqueous single fluorescent ink capable of forming on a recording medium a first region, in which a first coloring material is concentrated with a second coloring material, and a second region, in which a second coloring material is present alone, to surround an entire periphery of the first region including a portion in the recording medium, where at least either of the first coloring material and the second coloring material is a fluorescent coloring material, wherein the aqueous single fluorescent ink is so applied that the first region of each dot is not mutually adjoined between the dots.

Also the present invention provides a recorded image-forming method comprising a step of applying an aqueous single fluorescent ink to a recording medium to form an image, the ink capable of forming on a recording medium a first region, in which the first coloring material is concentrated with the second coloring material, and a second region, in which the second coloring material is present alone, to surround the entire periphery of the first region including a portion in the recording medium, wherein the image has a different resolution in a longitudinal direction and a lateral direction.

Also the present invention provides a recorded image forming method comprising a step of forming on a recording medium an image with plural dots by applying an aqueous single fluorescent ink, the ink capable of forming on a recording medium a dot comprising a first fixed region within a second fixed region, the first fixed region containing a plurality of scattered minute spots of a coagulated first coloring material fixed therein and the second fixed region containing a second coloring material fixed therein, where at least either of the first coloring material and the second coloring material is a fluorescent coloring material, and the first coloring material is a water dispersible coloring material, wherein the dots are formed in such a manner that the first region of each dot does not mutually adjoined between the dots, and a vertical resolution is different from a horizontal resolution.

Also the present invention provides an aqueous single fluorescent ink comprising a first coloring material having a free carboxylic acid as a main water-soluble group, a second coloring material having a free sulfonic acid as a main water-soluble group, a surfactant capable of holding the second coloring material in a larger amount compared with the first coloring material.

Such aqueous single fluorescent ink preferably includes a water-soluble crystalliferous substance which is solid in an environment of a normal temperature.

DESCRIPTION OF THE PREFERRED EMBODIMENTS

In the following the present invention will be clarified in more details with preferred embodiments thereof.

First explained is a mechanism by which an aqueous single ink of the present invention improves the fastness, particularly the water resistance, the color development including fluorescence emission, and the image quality including the image density of a recorded image. The mechanism to be explained in the following has been reached by analyzing various phenomena based on experimental data and after many trials and errors, but does not cover all the aspects since complex interactions are involved in the present invention.

The present inventors have made investigations and confirmations for ink having satisfactory reliability and safety and capable of improving the image fastness, particularly water resistance, and also improving the color-developing properties including fluorescence emission and the image density. As a result, they found a fact that an aqueous single fluorescent ink capable of forming a first region in which a first coloring material is concentrated with a second coloring material in a central part and forming a second region in which the second coloring material is present alone on the entire periphery of the first region including the inside of the recording medium can improve the fastness, particularly the water resistance and the print quality, also the color-developing property including fluorescence emission and the image density. Thus the present invention was made.

Figure 1:
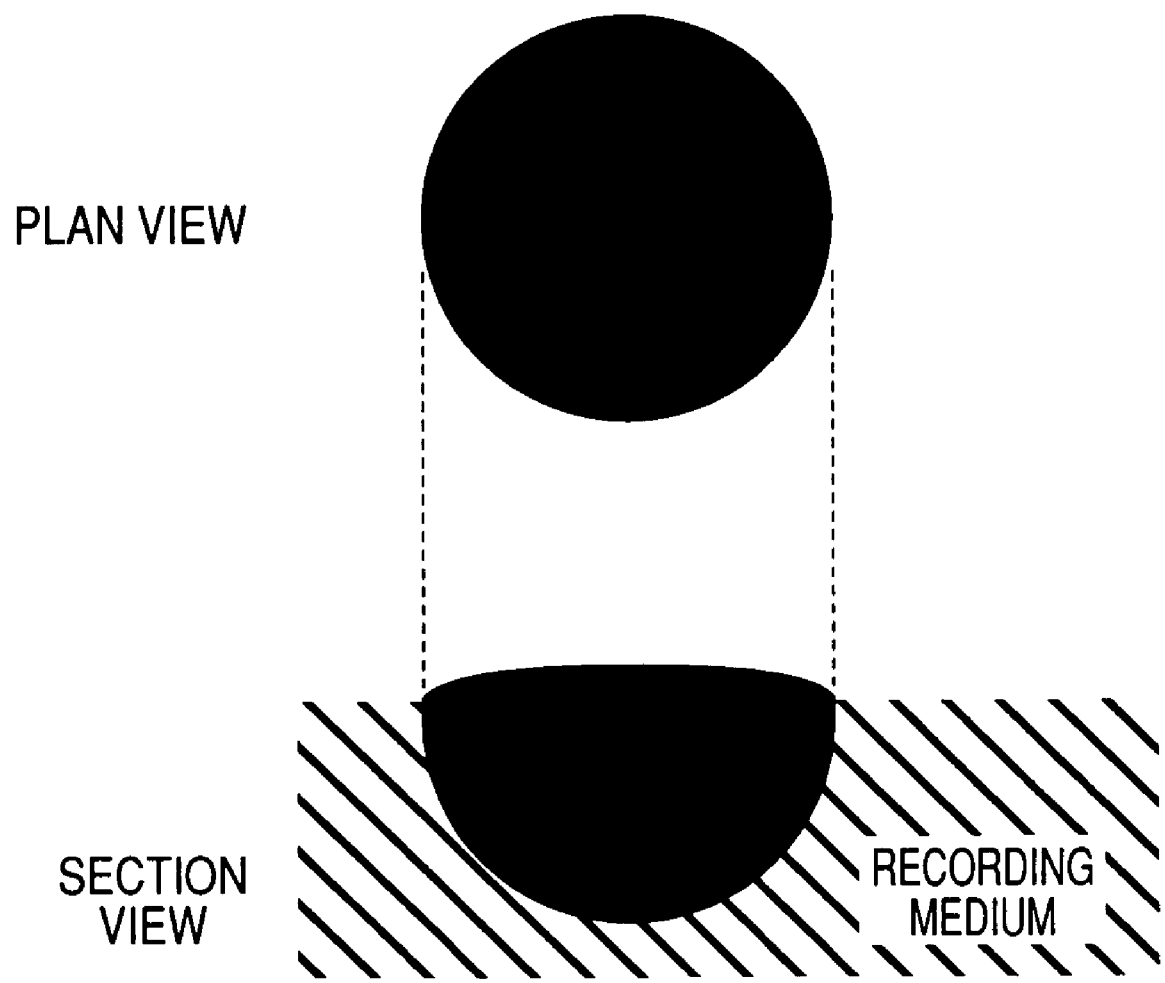
FIG. 1 is a schematic view showing a structure of a dot formed on a recording medium with a conventional ink.

First, there is given an explanation with an ink of the prior art. A model is shown in FIG. 1. FIG. 1 represents a dot formed with an ink droplet, in which a solid black area indicates a region where the coloring material is fixed. In FIG. 1, the upper plan view is a schematic plan view of a dot, i.e., a region where the coloring material is fixed, formed with an ink droplet on a recording medium and viewed from above. Also FIG. 1 shows a schematic cross-sectional view of the dot.

For increasing the density of a recorded image, there can be employed a method of increasing a content of the coloring material in the solid black area, or a method of hindering a permeation of the ink into the recording medium. In such a situation, when the coloring material in the solid black circle area has a satisfactory water resistance, the coloring material in the area aggregates and associates to reduce the solubility in water resulting in satisfactory water resistance. In such a case, however, the coloring material is fixed on the recording medium in an associated, coagulated or assembled state. Such an associated, coagulated or assembled state deteriorates a color-developing property inherent to the coloring material, whereby the ink shows a low color-developing property on the recording medium.

Figure 2:
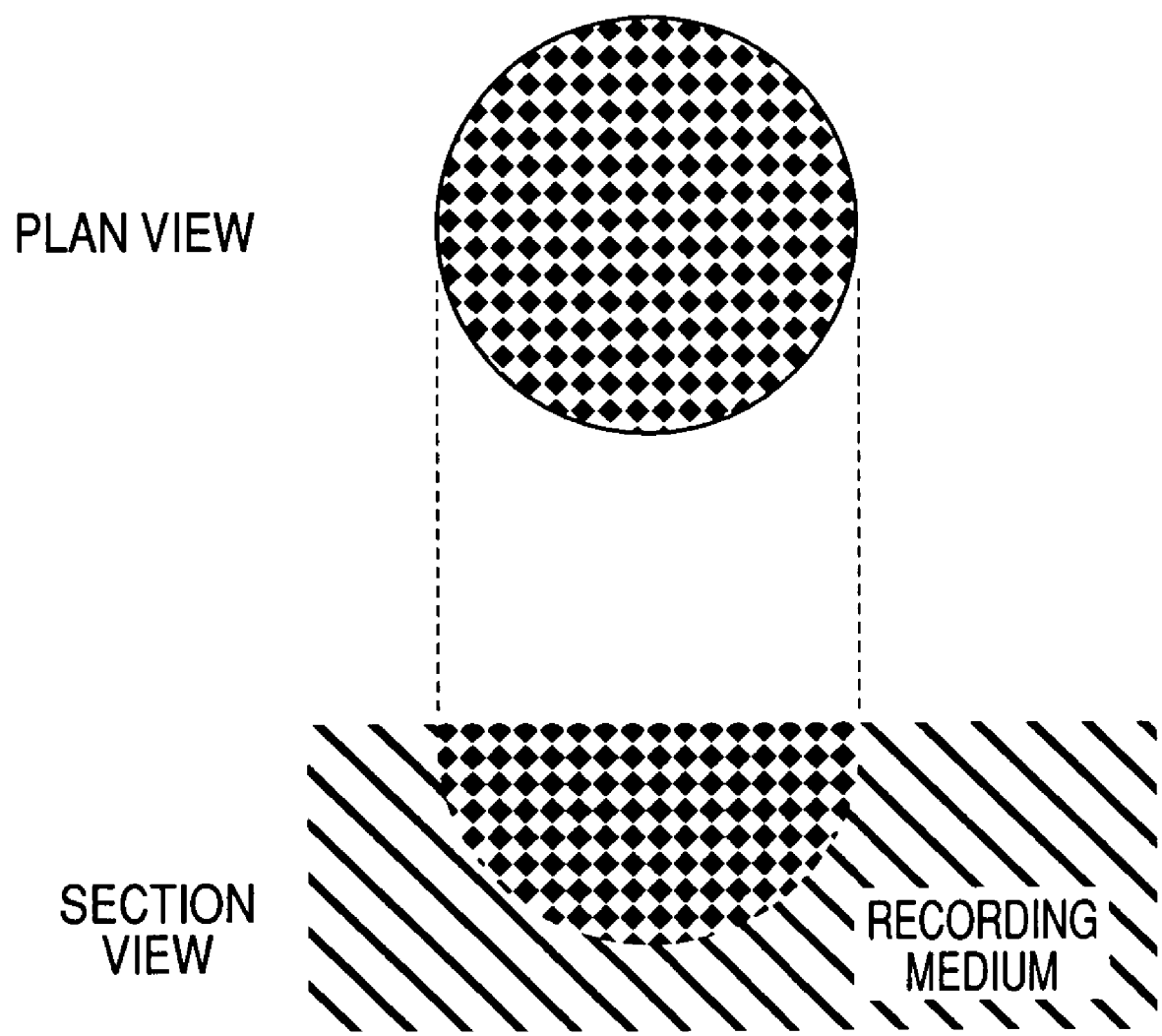
FIG. 2 is a schematic diagram showing a structure of a dot formed on a recording medium with a conventional ink including plural coloring materials.

On the other hand, when plural coloring materials, for example, one can improve water resistance, one can increase the image density and one can improve color, are employed, they are fixed in a mixed state on the recording medium as shown in FIG. 2. For example, when a coloring material capable of improving the water resistance is used, the water resistance may be improved but the coloring materials are fixed in a mixed state, and coloring materials tend to form a coagulated, associated or assembled state, so that it is difficult to improve the color-developing property. When the permeability of the ink into the recording medium is reduced to increase the image density, the plural coloring materials are fixed on the recording medium in a similar mixed state as above, so that the color-developing property is lowered. Particularly in case of employing a fluorescent coloring material for fluorescence emission, the coloring materials in a coagulated, associated or assembled state significantly reduce the fluorescence emission.

In FIG. 2, black diamonds represent a first coloring material, and white diamonds represent a second coloring material. In FIG. 2, the upper plan view is a schematic plan view of a dot formed with an ink droplet on a recording medium viewed from above, and the lower is a schematic cross-sectional view of the dot showing inside the recording medium.

Figure 3:
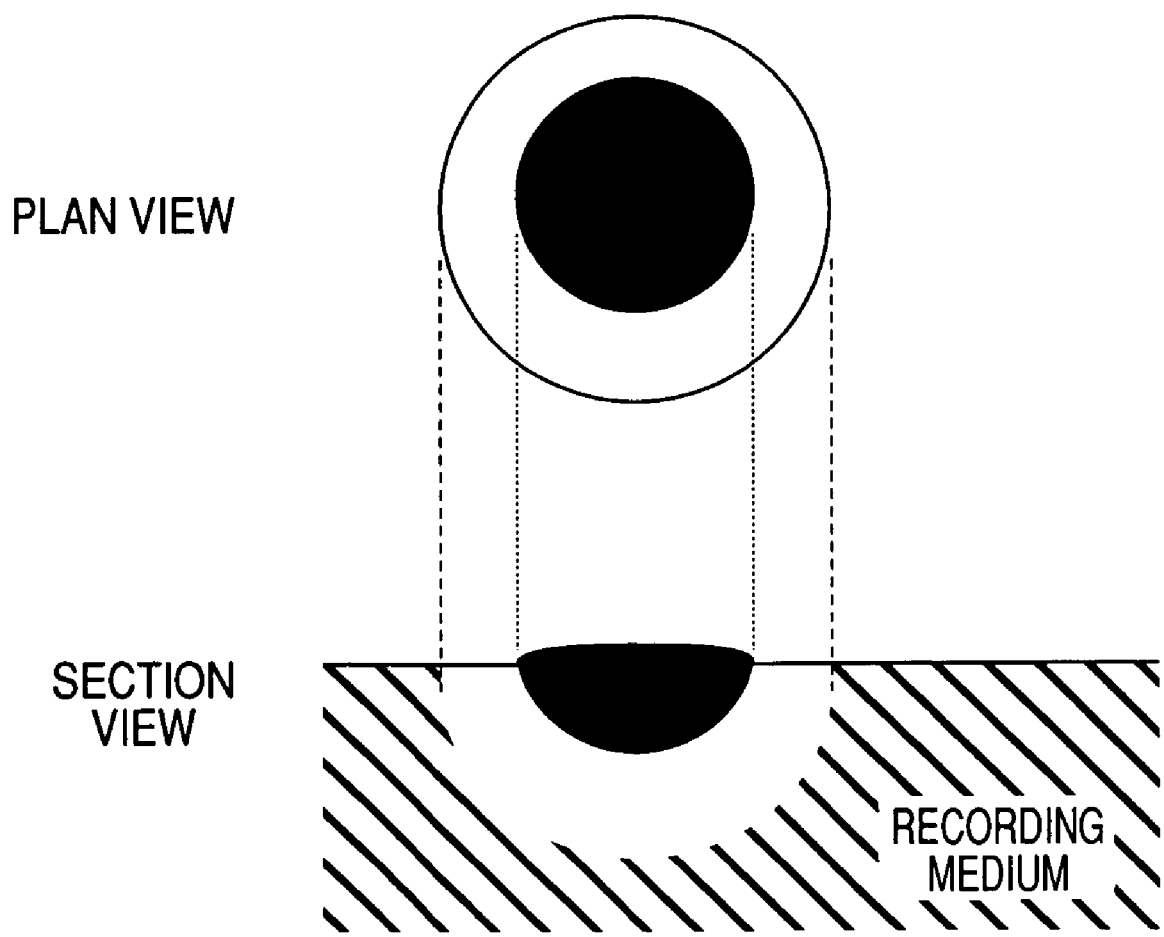
FIG. 3 is a schematic diagram showing a structure of a dot formed on a recording medium with an ink of the present invention.

On the other hand, FIG. 3 is a schematic illustration of a dot formed with an aqueous single ink of the present invention. In FIG. 3, the solid black area indicates a region where at least the first coloring material is fixed, and a white area indicates a region where the second coloring material is fixed alone. In FIG. 3, the upper schematic plan view shows a dot formed with an ink droplet on the recording medium viewed from above. Also in FIG. 3, the cross-sectional view is a schematic illustration of the dot showing the inside of the recording medium.

According to a preferred embodiment of the present invention, the aqueous single ink contains an aqueous liquid medium (usually water and a water-soluble organic solvent), a first coloring material and a second material before the deposition to the recording medium, but, once the aqueous single ink is deposited on the recording medium, the liquid medium of the ink droplet evaporates, and penetrates or defuses into the recording medium, whereby the coloring materials are fixed.

When the coloring materials of the aqueous single ink of the present invention are fixed to the recording medium to form an image, the first coloring material forms an image at the position where the ink droplet was deposited or slightly diffuses from the original position, whereas the second coloring material forms an image diffusing on and in the recording medium. Thus, the aqueous single ink of the present invention forms a recorded image as shown in FIG. 3, with the first and second coloring materials of which diffusion properties on and in the recording medium are different from each other. In such image formation, the first coloring material comes to a coagulated, associated or assembled state, thereby the fastness such as water resistance and light fastness is improved. Also when an assembled image is formed on and in the recording medium, the coloring material is fixed in a concentrated manner so that image density having an impact or images of high density can be obtained.

On the other hand, the second coloring material forms an image region apparently surrounding the first coloring material. The second coloring material has weaker tendency in coagulation, association or assembling on and in the recording medium than the first coloring material, and fixes to the recording medium in an almost monomolecular state in comparison with the first coloring material, which is considered to improve the color-developing property. Also, there is a tendency that the greater the diffusion of the second coloring material in the recording medium is, the better the image characteristics become.

Further, it is preferred that the first coloring material of the aqueous single ink is a water-dispersible coloring material and the second coloring material is a water-soluble coloring material.

When the first coloring material is a water-dispersible coloring material, satisfactory coagulation property is easily obtained to increase local image density, so the density of the entire recorded image. Also it can improve water resistance.

When the second coloring material is a water-soluble coloring material, the water-soluble coloring material diffuses on and into the recording medium together with water being a main component of the ink. It is predicted that such a state allows fixation of the coloring material to the recording medium in an almost monomolecular state to improve color-developing property.

Also, since the fixed image (for example, a dot) of an ink droplet-deposited on the recording medium comprises a first region formed with a coagulated coloring material mainly in the central portion and a second region formed with a diffused coloring material-fixed on the entire periphery of the first region including the interior of the recording medium, a density gradient decreasing from the center to the peripheral area is present. Therefore, in case an image is formed with dots, the dots are less conspicuous and the granular appearance of the obtained image is alleviated making excellent image formation easier.

Also, when the aqueous single ink is a fluorescent ink, the inventors have found that the fluorescence emission property becomes excellent particularly in a case where the fluorescence emission is stronger in the region formed with the second coloring material than in the region formed mainly with the first coloring material. They also have found that a high image density and a satisfactory fluorescence emission can be attained by employing a water-dispersible coloring material as the first coloring material and a water-soluble coloring material as the second coloring material. When a fluorescent coloring material is the second coloring material, it diffuses on the recording medium, causing little association or coagulation of the fluorescent coloring material, whereby a satisfactory fluorescence emission is provided. On the other hand, the first coloring material can increase the image density as aforementioned. As a result, a recorded image with a high density and a satisfactory fluorescence emission property over the entire recorded image can be obtained. It is also possible to obtain satisfactory water resistance cue to the coagulating property of the first coloring material.

Figure 4:
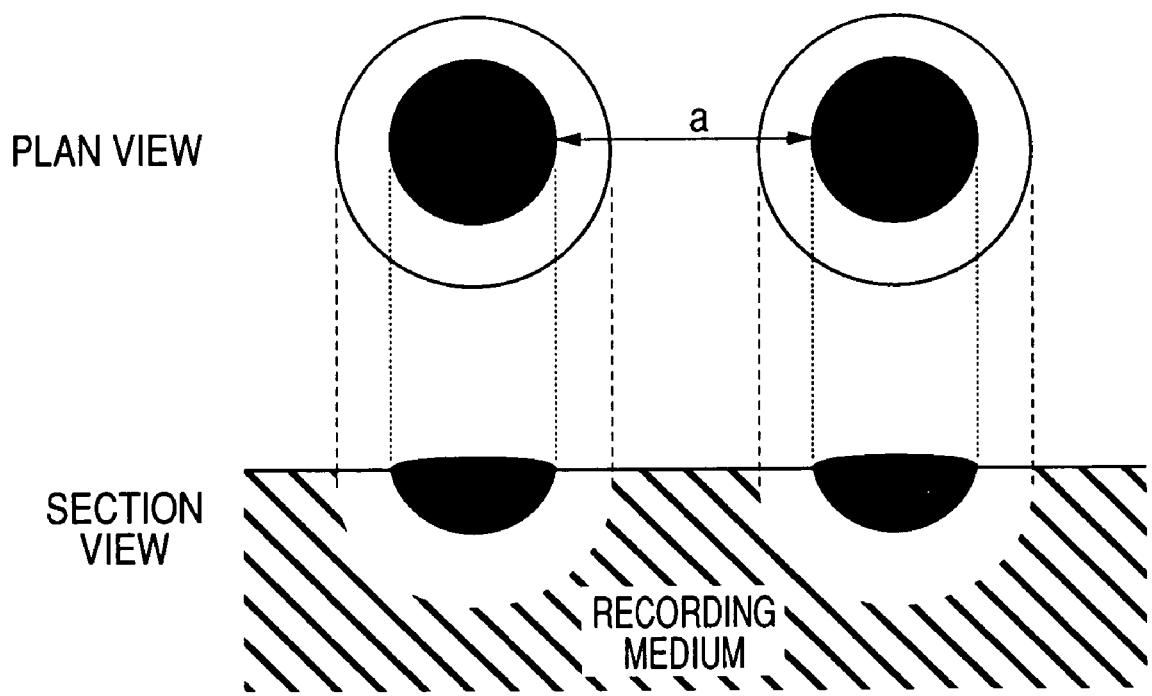
FIG. 4 is a schematic diagram of the structure of dots formed on a recording medium with the ink of the present invention.

They have also found out that when an image is formed with plural dots using an aqueous single ink in such a manner that each region where the first coloring material is concentrated in the presence of the second coloring material is not adjoined with each other (cf. FIG. 4), it allows formation of the second regions where the second coloring material is present alone, thereby a very satisfactory recorded image is obtained. In FIG. 4, the solid black regions each represents a region where the first coloring material is concentrated, and the white regions each represents a region where the second coloring material is present alone. In FIG. 4, the upper plan view is a schematic plan view of two dots comprised of fixed coloring materials, each formed with an ink droplet deposited on a recording surface of a recording medium and viewed from above. Also in FIG. 4, the cross-sectional view schematically shows the dots comprised of fixed coloring materials in the recording medium. In FIG. 4, "a" denotes the distance between the regions where mainly the first coloring material is concentrated.

Further, they have found that, when a recorded image on a recording medium is formed with an aqueous single ink of the present invention in such a manner that the resolution in the vertical direction is different from that in the horizontal direction, room for the second coloring material to diffuse is secured, which further improves the effect of the aqueous single ink of the present invention.

Figure 5:
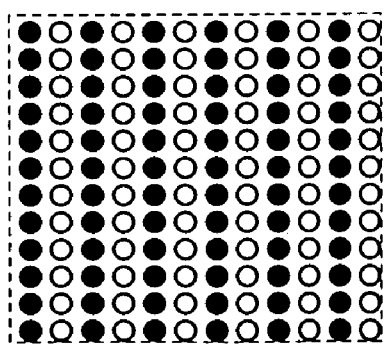
FIG. 5 is a schematic diagram showing an arrangement of ink dots in an image formed with the ink of the present invention.

Here, "to apply plural ink droplets on the recording medium in such a manner that each region where the first coloring material is concentrated in the presence of the second coloring material is not adjoined with each other" means, for example as shown in FIG. 5, ink is applied in such a matter that there are areas between dots where ink is not deposited. FIG. 5 is a schematic plan view of a recording surface of a recording medium, in which black circles each represents an area in which an ink droplet is deposited, and open circles represent areas in which ink droplets are not deposited.

Figure 6:
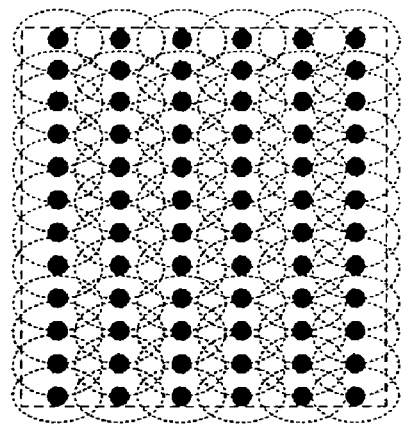
FIG. 6 is a schematic diagram showing an arrangement of ink dots in an image formed with the ink of the present invention.

When an aqueous single ink of the present invention is used by a recording method as shown in FIG. 5, the resulting recorded image is as shown in FIG. 6, facilitating formation of the regions where the second coloring material is present alone. As a result, the effect of the present invention is fully expressed. In FIG. 6, a black circle indicates a region where mainly the first coloring material is fixed, and the peripheral area is a region in which mainly the second coloring material is fixed.

When an image is formed as described above to obtain an image as shown in FIG. 6, a dot-on-dot image forming method is not preferred. In a dot-on-dot image formation, the first regions where mainly the first coloring material is concentrated and the second regions where the second coloring material is present alone are undesirably overlapped.

Figure 7:
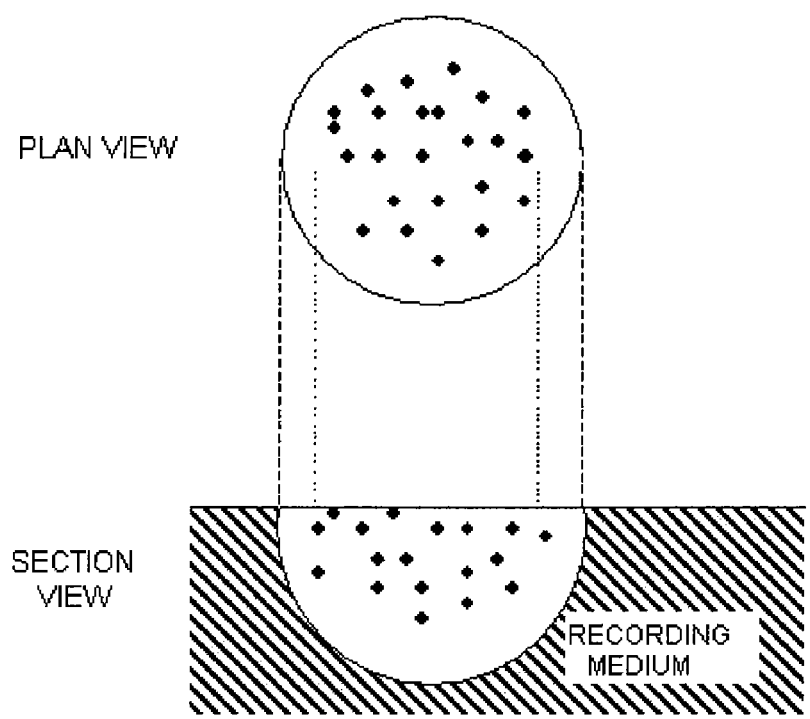
FIG. 7 is a diagram illustrating formation of an assembly in the ink of the present invention.

The present inventors have clarified that the effect of the present invention can be satisfactorily exhibited by an aqueous single ink containing a water-dispersible coloring material, a water-soluble coloring material, a surfactant and water, the surfactant capable of holding (dissolving) the water-soluble coloring material in a large amount but scarcely the water-dispersible coloring material. FIG. 7 schematically shows a case where such a surfactant is employed.

In FIG. 7, a black spot indicates a region where the first coloring material is fixed, and the white portion indicates a region where the second coloring material is fixed.

In FIG. 7, an upper view is a schematic plan view of a dot viewed from above, where the dot is comprised of regions where coloring materials are fixed and formed by depositing an ink droplet on a recording surface of a recording medium. Also in FIG. 7, the cross-sectional view schematically shows the dot comprised of fixed coloring materials in the recording medium.

When an ink contains a surfactant that can hold or dissolve the water-soluble coloring material in a large amount compared with the water-dispersible coloring material, the surface tension of the ink is reduced and the wetting property with the recording medium is increased, thereby permeation and diffusion of the ink into the recording medium is facilitated. When an ink is applied to a recording medium, the surfactant is distributed in the recording medium in the vicinity of the surface of the recording medium where the ink droplet is deposited, and diffuses while adsorbing. If the surfactant is one that can hold or dissolve the water-soluble coloring material but hardly the water-dispersible coloring material, the water-soluble coloring material diffuses in the recording medium together with the surfactant and water, a main ink component, to form a wide region where the second coloring material is fixed. In other words, the water-soluble coloring material diffuses and permeates together with the ink solvent and the surfactant on and into the recording medium. In such a state, separation of the coloring materials takes place on and in the recording medium, thus ink fixation occurs as shown in FIG. 7.

On the other hand, the surfactant is still present in the vicinity of the area where the ink droplet was deposited due to adsorption or the like, so that the water-dispersible coloring material is less diffusible in comparison with the water-soluble coloring material, and the inherent agglomeration tendency of the water-dispersible coloring material is further accelerated. In this state, the water-dispersible coloring material does not coagulate in one point but coagulates in the course of diffusion, forming a distribution of aggregates in the entire region where the water-dispersible coloring material is concentrated, that is, the region is spotted with agglomerates of the water dispersible coloring material. In other words, the first coloring material forms an assembly of a plurality of agglomerates in a region of the recording medium as shown in FIG. 7, which region corresponds to the first region where the water-dispersible coloring material is concentrated.

When such a surfactant is used, the area occupied with the first coloring material per unit area of the first region is reduced, so that the area occupied with the second coloring material in the first region where the first coloring material is concentrated is increased, thereby the color-developing property is improved while maintaining the apparent image density. Particularly when the second coloring material has a fluorescent property, the fluorescence emission is improved (cf. FIG. 7). In this state, the first image region where the first coloring material is concentrated including the second coloring material comprises portions where mainly the first coloring material is fixed and portions where the second coloring material is fixed, that is, the first coloring material and the second coloring material constitute a region in a mutually separated state. Thus, it is possible to obtain a satisfactory density of the recorded image and a satisfactory color-developing property such as the fluorescent property, when the first coloring material is a coloring material capable of increasing the image density and the second coloring material is a coloring material capable of improving the color-developing property, particularly a fluorescent coloring material. It is also possible to obtain a satisfactory water resistance by the coagulating characteristics of the first coloring material.

In this case, the first coloring material forms plural small coagulations as shown in FIG. 7, but such coagulations are recognized as one under visual observation because coagulations are too small to be recognized by the human eyes, so that the density of the recorded image with such minute agglomerations is comparable to that where such agglomerations are not formed. Also when an image is formed with dots, the dots are less conspicuous so that high quality images can be obtained. Also if a content of the surfactant in the ink is maintained equal to or higher than the critical micelle concentration, the diffusion of the ink on and into the recording medium is improved, thereby the effect of the present invention is enhanced.

It is preferable that the difference between the dynamic surface tension and the static surface tension of the surfactant to be employed is small. This means faster orienting speed of the surfactant to an interface, which accelerates the diffusion of the liquid medium of the ink on and into the recording medium, and, in case a water-dispersible coloring material is employed in the invention, such surfactant promptly is adsorbed and oriented onto the water-dispersible coloring material in a minute agglomeration state, whereby minute agglomerations of the water-dispersible coloring material are distributed on the recording medium to further enhance the effect of the present invention.

A preferred combination of the surfactant and the water-dispersible coloring material can be determined, for example, as follows: when a solution of a desired water-dispersible coloring material such as a 15 mass % aqueous dispersion (for example, about 0.1 g) is dropped from a syringe into a solution of a selected surfactant, if the water-dispersible coloring material floats in a coagulated state on the surface of the surfactant solution, and when left to stand for a long time or at 60° C., the coagulated coloring material would not dissolve into the surfactant solution but precipitate to the bottom of the solution, the combination is preferable.

FIGS. 27 to 30 illustrate such testing conceptually. Each drawing schematically illustrates a state immediately after dropping (left) and a state after the lapse of a time (right), when a water-dispersible coloring material is dropped onto a surfactant solution in a Petri dish or the like.

Figure 27:
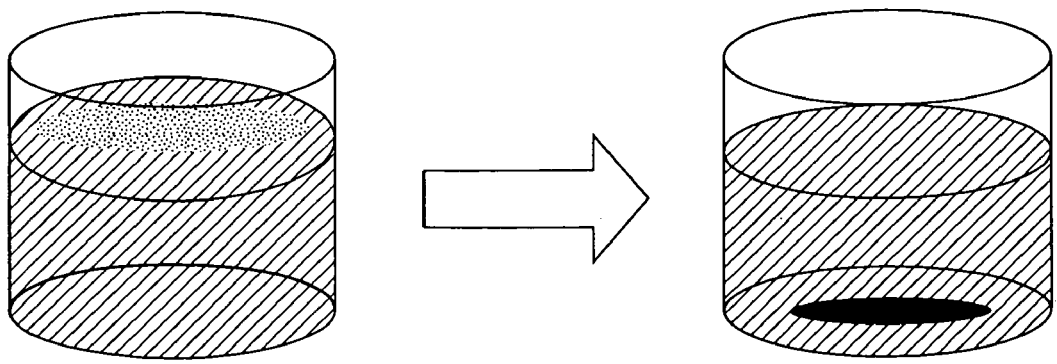
FIG. 27 is a diagram schematically showing, when a water-dispersed coloring material is added dropwise to a surfactant solution in a vessel such as a Petri dish: immediately after addition (left) and after a lapse of time (right).
Figure 28:
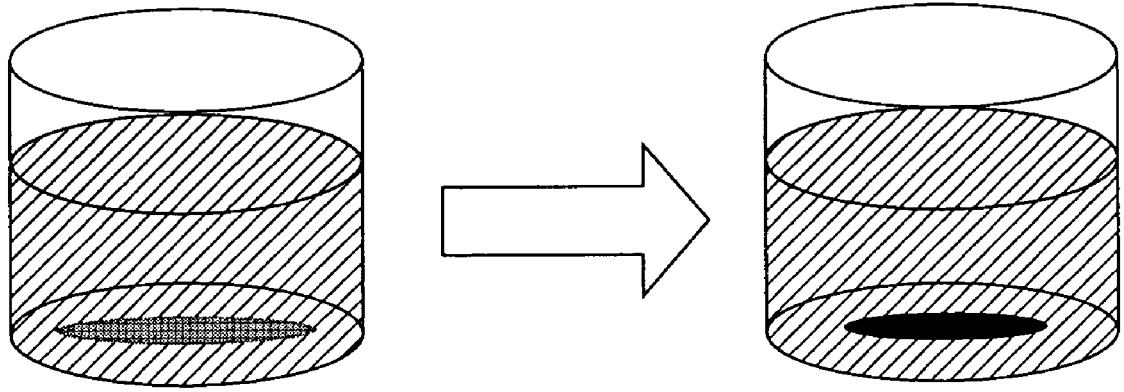
FIG. 28 is a diagram schematically showing, when a water-dispersed coloring material is added dropwise to a surfactant solution in a vessel such as a Petri dish: immediately after addition (left) and after a lapse of time (right).

FIG. 27 shows a particularly preferred combination where the water-dispersible coloring material is separated in a floating state on the surface of the surfactant solution immediately after dropping and is separated in a precipitate state on the bottom after the lapse of a time. FIG. 28 shows a next preferred combination in which the water-dispersible coloring material is separated in a precipitate state at the bottom of the surfactant solution immediately after dropping and is still separated in a precipitate state on the bottom after the lapse of a time.

Figure 29:
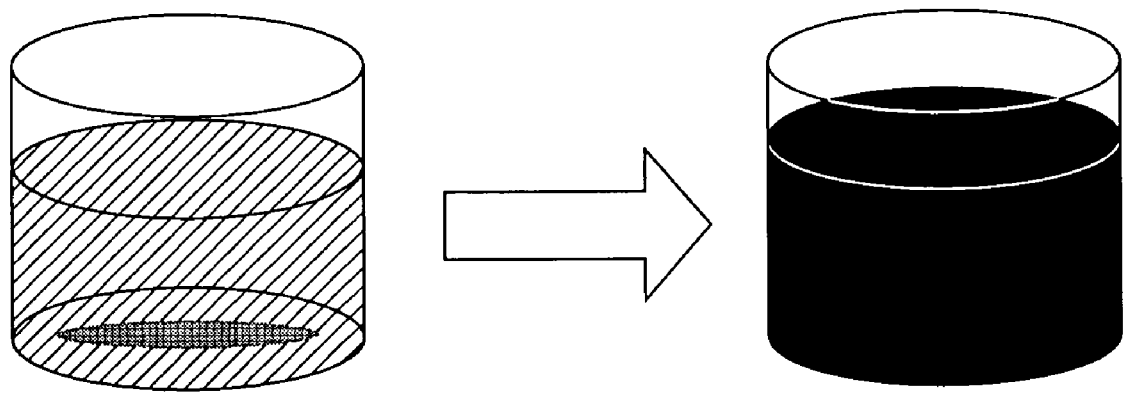
FIG. 29 is a diagram schematically showing, when a water-dispersed coloring material is added dropwise to a surfactant solution in a vessel such as a Petri dish: immediately after addition (left) and after a lapse of time (right).
Figure 30:
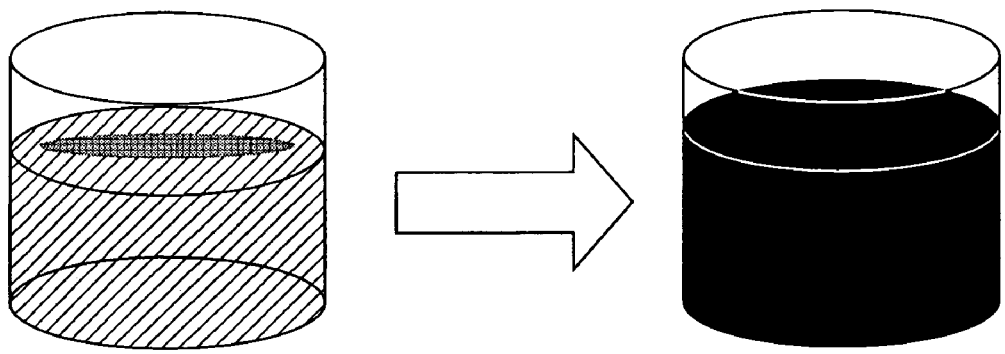
FIG. 30 is a view schematically showing, in case a water-dispersible coloring material is dropwise added to a container such as a Petri dish containing a surfactant solution, a state immediately after addition (left) and a state after a lapse of time (right).

On the other hand, FIGS. 29 and 30 show undesirable combinations. In FIG. 29, the water-dispersible coloring material is separated in a precipitate state at the bottom of the surfactant solution immediately after dropping but diffuses into the entire solution after the lapse of a time to form a dissolved state. In FIG. 30, the water-dispersible coloring material is separated in a floating state on the surface of the surfactant solution immediately after dropping but diffuses into the entire solution after the lapse of a time to form a dissolved state.

In the present invention, selection of nonionic surfactants as the aforementioned surfactant can minimize problems in consideration of various properties of the ink and the coloring materials to be employed.

This is because polarity may facilitate salt formation with various anionic and cationic components contained in the ink, thereby a preferred oriented state to the interface and thus satisfactory coagulation of the water-dispersible coloring material may be hindered.

The aqueous single ink of the present invention preferably includes, in addition to the aforementioned surfactant, a water-soluble crystalliferous substance (crystal-forming component) which is solid under a normal temperature environment. The ink of such a preferred embodiment is in a stable mixed state of the water-dispersible coloring material, the water-soluble coloring material, the liquid medium (aqueous medium), the surfactant of the aforementioned function and the water-soluble crystal forming component. When such an ink is left to stand, the water in the ink decreases by evaporation, and the water-soluble crystal forming component reaches a saturation concentration in the ink and begin to precipitate. At the same time, the water-dispersible coloring material reaches a saturation concentration, and the dispersion state becomes unstable easily causing coagulation.

Figure 8:
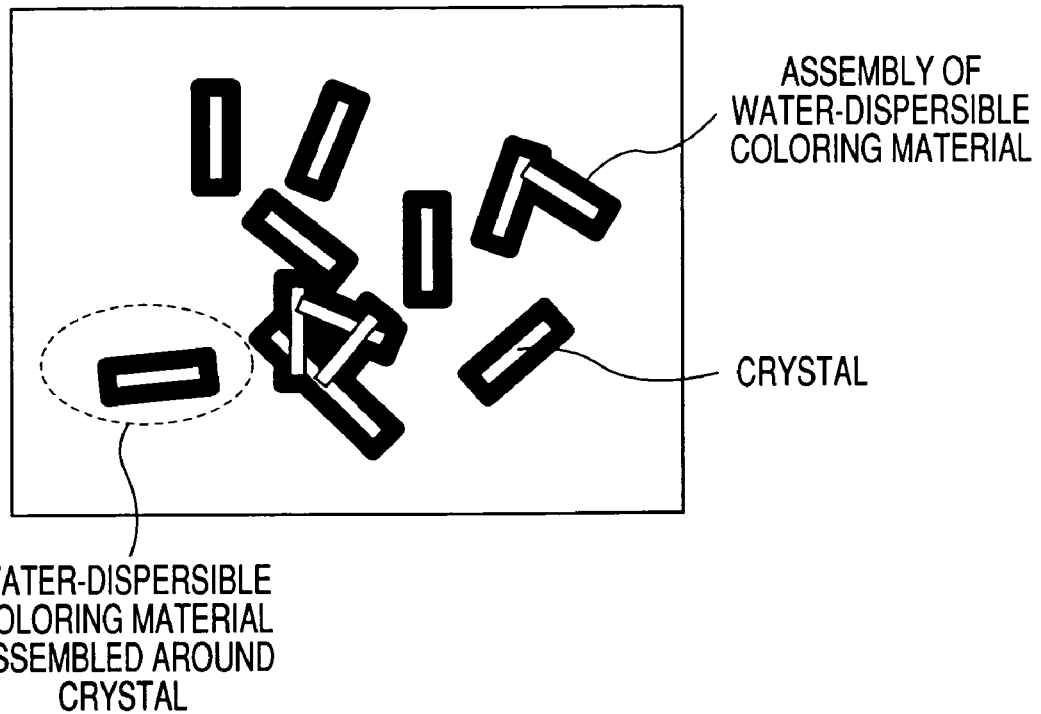
FIG. 8 is a diagram illustrating formation of a coagulated body of a water-dispersed coloring material.
Figure 9:
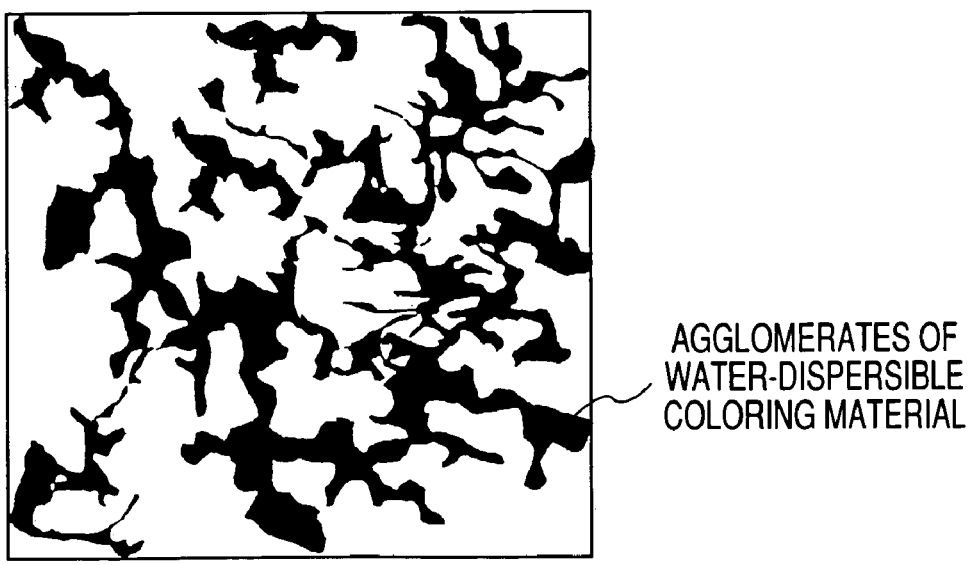
FIG. 9 is a diagram illustrating a state where assemblies of a water-dispersed coloring material of the present invention are deposited on a recording medium.

By simultaneous development of such two states, namely crystal precipitation in the ink and unstable dispersion of the water-dispersible coloring material leading to coagulation, there is formed an assembly of dispersed aggregates of the water-dispersible coloring material, in which the water-dispersible coloring material is assembled around precipitated crystals in the ink as nuclei (FIG. 8). The presence of an assembly of the dispersed coloring materials including crystals as nuclei in the ink hinders a network formation (FIG. 9) of the water-dispersible coloring material that will occur in an ink utilizing an ordinary water-dispersible coloring material.

In addition, as the concentration of the surfactant of the aforementioned function increases, the water-dispersible coloring material shows a stronger coagulating property to facilitate formation of dispersed minute agglomerates of the water-dispersible coloring material. The agglomerates of the dispersed coloring materials including the crystals as nuclei does not easily form a network, thus not forming a strong solidification as with the dispersed coloring material alone and thus improving a resistance to solidification and clogging.

Furthermore, since such assembly includes water-soluble nucleus, even in case of a clogging for example in the vicinity of a nozzle of an ink jet head, a recovery operation such as a pressurization by suction can easily resolve the clogged state by actions from the interior and the exterior on the assembly of the water-dispersible coloring material having such crystal as the nucleus present in the vicinity of the nozzle and constituting such clogging.

Figure 10:
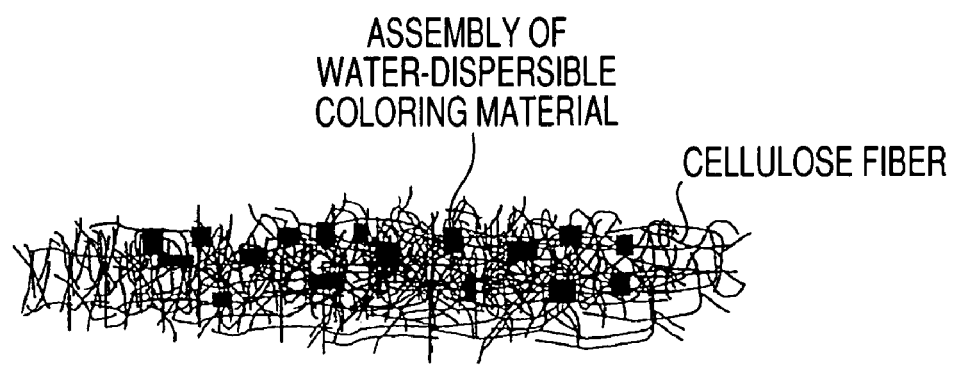
FIG. 10 is a diagram illustrating a state of formation of a coagulated body of a water-dispersed coloring material with a combination use of the water-dispersed coloring material and a water-soluble coloring material.

Also on the recording medium, the ink deposited thereon loses water by evaporation and permeation whereby an assembly of the water-dispersible coloring material, formed around the nucleus of the crystal component, is developed in a surface part of the recording medium and at the same time the water-dispersible coloring material forms a strong chemical and physical interaction with cellulose fibers etc. constituting the recording medium, thus providing a satisfactory fastness such as water resistance (FIG. 10).

Figure 11:
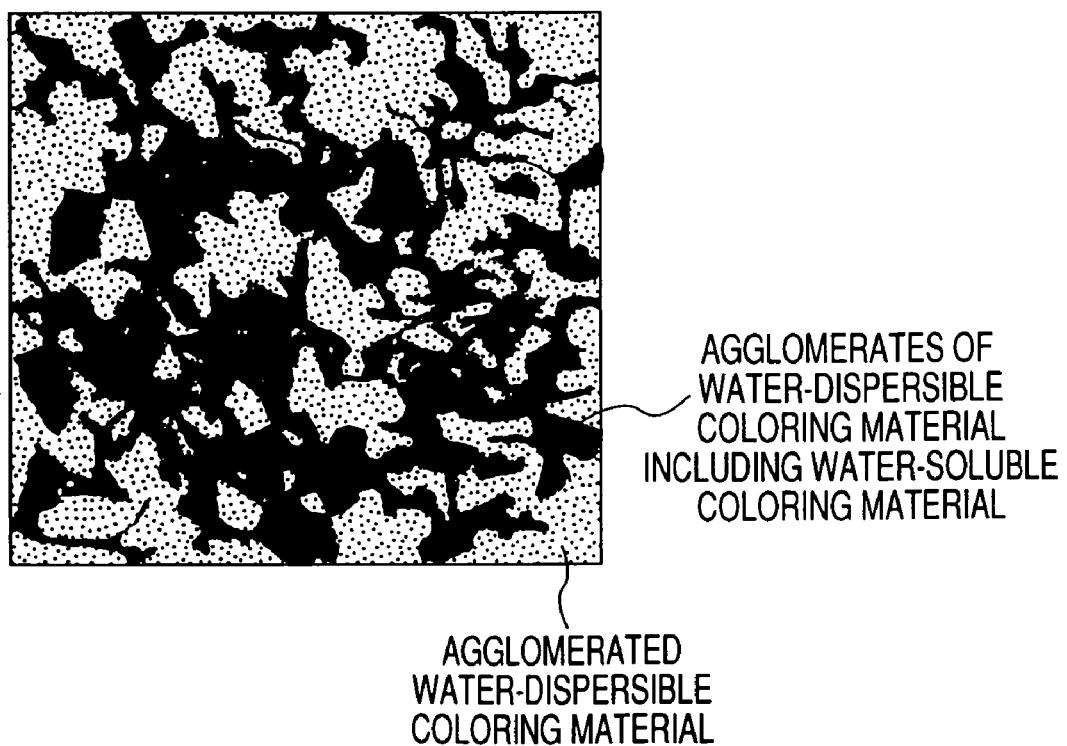
FIG. 11 is a diagram illustrating a state of an ink in which a dispersible coloring material is forming assemblies with crystals as nuclei in the presence of a water-soluble coloring material having a solubility higher than that of the water-dispersed coloring material in the solvent of the ink.
Figure 13:
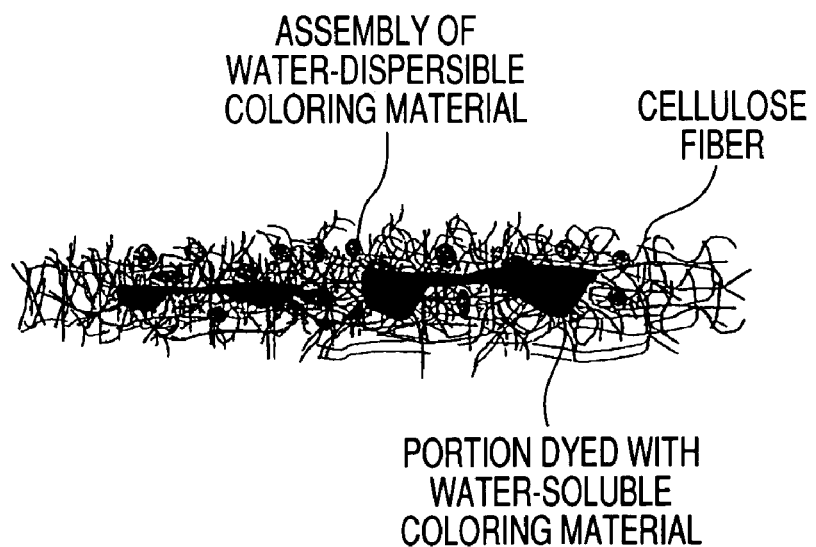
FIG. 13 is a diagram illustrating a state of formation of an assembly of a water-dispersible coloring material of the present invention with a combination use of the dispersed coloring material and a water-soluble coloring material.

Further, although the water-dispersible coloring material and the water-soluble coloring material are coexistent in the ink, the recorded image is further improved in the color-developing property and the resistance to solidification. The mechanism is considered as follows. With a conventional ink in which a water-dispersible coloring material and a water-soluble coloring material are coexistent, while the ink deposited on the recording medium loses water and is fixed thereto, the water-soluble coloring material is incorporated in the coagulation network of the water-dispersible coloring material, and the water-soluble coloring material coagulates with the water-dispersible coloring material, trapped in the coagulated network, unable to develop satisfactory color-developing property (FIG. 11). On the other hand, according to the present invention, the water-dispersible coloring material does not coagulate locally due to the above-described function of the surfactant, and coagulates in the course of diffusion to form a state where minute agglomerates of the water-dispersible coloring material with or without a crystal nucleus formed from the crystal-forming component are dispersed, without forming a large local coagulation of the water-dispersible coloring material. As a result, a network of the water-dispersible coloring material is not formed and the water-soluble coloring material is present in the solvent portion apart from the agglomerates in the ink, and the water-soluble coloring material can exhibit a satisfactory color-developing property (FIG. 13).

Figure 12:
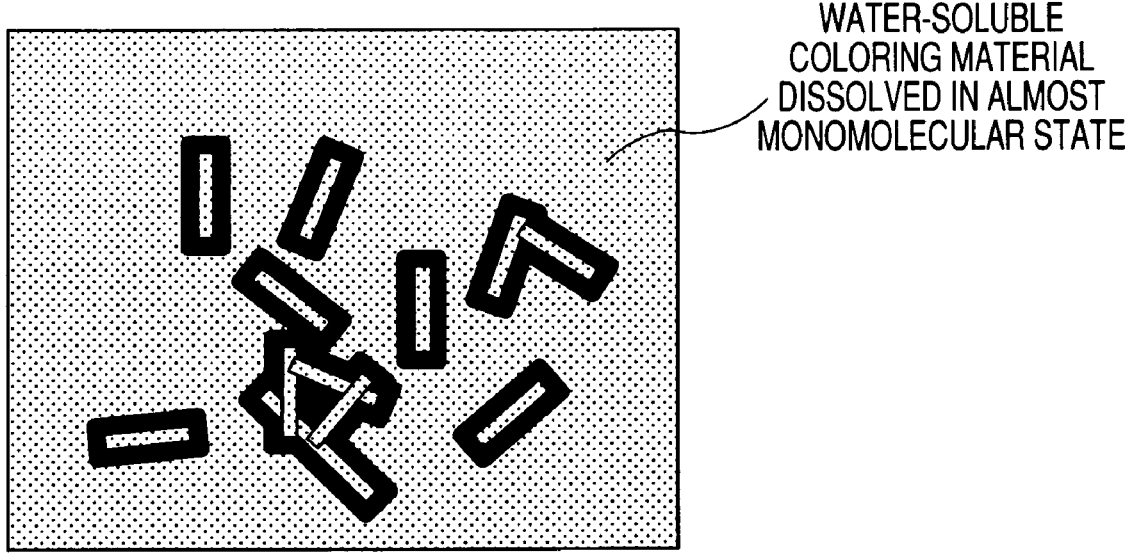
FIG. 12 is a schematic diagram illustrating a state of an ink in which a dispersible coloring material is forming assemblies with crystals as nuclei in the presence of a water-soluble coloring material having a solubility higher than that of the water-dispersed coloring material in the solvent of the ink.

The mechanism for improvement in anti-solidification properties is considered as follows. The assemblies of the water-dispersible coloring material formed around the crystal nuclei can be present in a satisfactory dispersion state due to the buffer action between the aggregates. In addition, as the water-soluble coloring material more soluble than the water-dispersible coloring material is present in the solvent of the ink, good assembly of the water-dispersible coloring material occurs around the crystal nuclei due to the difference in the solubility of the two coloring materials in the ink (FIG. 12).

Use of a fluorescent coloring material as the water-soluble coloring material is particularly effective in enhancing the fluorescent intensity of the image. It is considered that the fluorescent coloring material is present in a monomolecular state not trapped in the coagulation of the water-dispersible coloring material as explained above with a water-soluble coloring material, thereby exhibiting a high fluorescent intensity. In this case, the content of the fluorescent coloring material should be lower than a content that causes the concentration quenching on the recording medium. For example, the content is determined to be less than the content of the fluorescent coloring material that causes the concentration quenching in an evaporated ink, i.e., an aqueous ink composition from which water has been evaporated. The concentration quenching means a phenomenon of decrease of the fluorescent intensity with increase of the content of the fluorescent coloring material in the ink.

As described above, the ink of the present invention contains at least, as constituents thereof, an aqueous medium, a water-dispersible coloring material and a crystal forming component. Further, to provide a preferable effect, the ink may contain an organic solvent capable of dissolving the crystal forming component.

The ink of the invention including such an organic solvent facilitates, not only formation of assemblies around the crystals as the nucleus, but also formation of not-associated agglomerates in the ink, thereby assemblies of the water-dispersible coloring material are effectively developed. For such an organic solvent, there is particularly preferred a solvent hardly volatile at the ordinary temperature, such as glycerin or triethylene glycol. Further, if such an organic solvent can also dissolve the water-soluble coloring material, the color-developing properties including the fluorescence of the recorded image are further improved. This is because a satisfactory dissolved state of the water-soluble coloring material can be secured by such an organic solvent.

Furthermore, in a relationship of the organic solvent and the crystal forming component, there is particularly preferred a relationship that a content of the crystal forming component in the ink is equal to or higher than a saturation concentration with respect to the content of the organic solvent in the ink. This is to facilitate formation of the assembly of the water-dispersible coloring material having a core of a crystal of the crystal forming component. It is therefore particularly preferred, for the mechanism of the present invention, that the saturation concentration of the crystal forming component in the organic solvent does not exceed the saturation concentration in water.

Also, the effect of the present invention can be further satisfactorily exhibited when the content of the crystal forming component in the ink is equal to or lower than the saturation concentration in water used in the ink and is equal to or higher than the saturation concentration in the organic solvent used in the ink. This is because the crystal-forming component is satisfactorily dissolved in the ink but promptly crystallizes as the volatile components in the ink evaporate.

On the other hand, the present inventors have found that the density and fastness of the recorded image can be improved as well as the color-developing property and the image quality, by using an aqueous single ink comprising a coloring material having a free carboxylic acid as the main water-soluble group, a coloring material having a free sulfonic acid as the main water-soluble group, a surfactant capable of containing the coloring material having a free sulfonic acid in a larger amount than the coloring material having a free carboxylic acid, and water.

Particularly referring to FIG. 3, if the first coloring material is a coloring material having a free carboxylic acid as the main water-soluble group and the second coloring material is a coloring material having a free sulfonic acid as the main water-soluble group, the recorded image becomes satisfactory in density, fastness and color-developing property, and, in case of forming the recorded image with dots, the dot becomes less conspicuous so that a recorded image of a satisfactory quality is obtained. A carboxylic acid is less hydrophilic, so that a coloring material having a carboxylic acid coagulates more easily than that having a sulfonic acid. Also, in case of employing a surfactant capable of containing the coloring material having a free sulfonic acid as the main water-soluble group in a larger amount than the coloring material having a free carboxylic acid as the main water-soluble group, it is possible to improve the density and the fastness of the recorded image by the coloring material having a free sulfonic acid as the main water-soluble group, and to obtain satisfactory color-developing property and image quality by the coloring material having a free carboxylic acid as the main water-soluble group. Furthermore, these effects can be further improved by including the aforementioned crystal-forming component.

In the following, there will be explained components of the ink of the present invention, capable of providing excellent effects by the above-described mechanisms.

It is important that the first coloring material and the second coloring material, the constituting components of the present invention, are such a combination that they can be separated from each other on the recording medium. For separating these on the recording medium, there can be employed, for example, a method of utilizing a difference in the solubility of the coloring materials at a pH of the surface of the recording medium; a method of including, in the ink, a component capable of reducing the solubility of one of the coloring materials so that when the ink is applied onto the recording medium and the water content is decreased, it acts on the coloring material to reduce the solubility thereof; or a method of including in the ink a volatile component capable of increasing the solubility of one of the coloring materials and reducing the solubility of the coloring material when the ink is deposited on the recording medium and the volatile component is evaporated. In these cases, the first coloring material preferably has a lower solubility/dispersibility than the second coloring material.

As the coloring materials to be employed in the ink, it is preferred to employ a water-dispersible coloring material and a water-soluble coloring material.

The water-dispersible coloring material means a coloring material which scarcely dissolves or disperses in water by itself but is dispersed in water by a chemical or physical action of a compound having a water-soluble group such as a surfactant or a polymer, or it means a coloring material formed from a coloring material not dispersible in water by chemically bonding a hydrophilic group such as a sulfonic acid or a carboxylic acid by oxidizing or treating the surface of the coloring material with a low-molecular compound having a hydrophilic group.

The water-dispersible coloring material can be an inorganic pigment for example a carbon black pigment such as furnace black, lamp black, acetylene black or channel black, and specific examples include commercially available products such as Raven 700, Raven 5750, Raven 5250, Raven 5000 ULTRA, Raven 3500, Raven 2000, Raven 1500, Raven 1250, Raven 1200, Raven 1190 ULTRA-II, Raven 1170, Raven 1255 (products of Columbian Chemicals Co.); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R (foregoing manufactured by Cabot Corp.); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (foregoing manufactured by Degussa Corp.); No. 25, No. 33, No. 40, No. 47, No. 52, No. 900, No. 2300, MCF-88, MA600, MA7, MA8 and MA100 (foregoing manufactured by Mitsubishi Chemical Co.), and there can also be employed a newly prepared product. These can be used singly or in combination of two or more kinds.

Specific examples of an organic pigment include an insoluble azo pigment such as toluidine red, toluidine maroon, hanza yellow, benzidine yellow and pyrazolone red; a soluble azo pigment such as lithol red, helio bordeaux, pigment scarlet and permanent red 2B; a vat dye derivative such as alizarine, indanthrone and thioindigo maroon; a phthalocyanine pigment such as phthalocyanine blue and phthalocyanine green; a quinacridone pigment such as quinacridone red or quinacridone magenta; a perylene pigment such as perylene red or perylene scarlet; an isoindolinone pigment such as isoindolinone yellow or isoindolinone orange; an imidazolone pigment such as benzimidazolone yellow, benzimidazolone orange or benzimidazolone red; a pyranthrone pigment such as pyranthrone red or pyranthrone orange; a thioindigo pigment; a condensed azo pigment; a diketopyrrolopyrole pigment; and other pigments such as flavanthrone yellow, acylamide red, quinophthalone yellow, nickel azo yellow, copper azomethine yellow, perynone orange, anthrone orange, dianthraquinonyl red, and dioxadine violet. These may be employed singly or in combination of two or more kinds.

Also examples of the organic pigment, indicated by color index (C.I.) numbers, include C.I. Pigment Yellow 12, 13, 14, 17, 20, 24, 55, 74, 83, 86, 93, 97, 98, 109, 110, 117, 120, 125, 128, 137, 13.8, 139, 147, 148, 15.0, 151, 153, 154, 155, 166, 168, 180, 185; C.I. Pigment Orange 16, 36, 43, 51, 55, 59, 61, 71; C.I. Pigment Red 9, 48, 49, 52, 53, 57, 97, 122, 123, 149, 168, 175, 176, 177, 180, 192, 202, 209, 215, 216, 217, 220, 223, 224, 226, 227, 228, 238, 240, 254, 255, 272; C.I. Pigment Violet 19, 23, 29, 30, 37, 40, 50; C.I. Pigment Blue 15, 15:1, 15:3, 15:4, 15:6, 22, 60, 64; C.I. Pigment Green 7, 36; C.I. Pigment Brown 23, 25, 26 etc. There are various methods, for example, for dispersing C.I. Pigment Yellow 13, 17, 55, 74, 93, 97, 98, 110, 128, 139, 147, 150, 151, 154, 155, 180, 185; C.I. Pigment Red 122, 202, 209; C.I. Pigment Blue 15:3, 15:4 etc.; Japanese Patent Application Laid-open No. S46-52950, U.S. Pat. Nos. 5,200,164 and 5,554,739, Japanese Patent Application Laid-open No. H8-3498 and U.S. Pat. No. 5,571,311 disclose: a method of bonding a hydrophilic group to the surface of a coloring material through a diazonium group thereby enabling dispersion in water as a self-dispersible pigment, a method of oxidizing the surface of a coloring material with hypochlorous acid etc., thereby forming a hydrophilic group and enabling dispersion in water; a method of including a coloring material in a surfactant or a polymer thereby enabling dispersion in water as an emulsion or capsules; and Japanese Patent Applications Laid-open Nos. H05-179183, H06-136311, H07-053841, H10-87768, H11-043639, H11-236502 and H11-269418 disclose a method for dispersion in water utilizing physical adsorption of a dispersant such as a surfactant or a polymer on the surface of the not-water-dispersible coloring material.

The dispersant can be, for example, a resin such as a random or block polymerized styrene-acrylic acid copolymer or a styrene-maleic acid copolymer; a nonionic or anionic surfactant capable of realizing a water dispersed state utilizing a micelle state or an emulsion state; or a block copolymer, a random copolymer, a graft copolymer or a salt thereof of at least two monomers selected from styrene, a styrene derivative, vinylnaphthalene, a vinylnaphthalene derivative, an aliphatic alcohol ester of an α,β-ethylenic unsaturated carboxylic acid, acrylic acid, an acrylic acid derivative, maleic acid, a maleic acid derivative, itaconic acid, an itaconic acid derivative, fumaric acid, a fumaric acid derivative, vinyl acetate, vinylpyrrolidone, acrylamide and a derivative thereof (here at least one of the two monomers is hydrophilic). Among these, a block copolymer is particularly preferred for executing the present invention. A water-dispersible coloring material obtained using a block copolymer is uniform and facilitates a stable ink.

The block copolymer has a structure represented by AB, BAB, ABC etc. It is particularly advantageous in carrying out the present invention, a block copolymer having a hydrophobic block and a hydrophilic block of which block size is well-balanced to contribute to the dispersion stability. It is also possible to incorporate a functional group into a hydrophobic block to which the pigment binds), thereby the specific interaction between the dispersant and the pigment is enhanced for improving the dispersion stability. Also the weight-averaged molecular weight of the polymer is preferably less than 30,000, preferably less than 20,000 and more preferably within a range of 2,000 to 10,000.

Producing methods for such polymer are disclosed in Japanese Unexamined Patent Publication Nos. H05-179183, H06-136311, H07-053841, H10-87768, H11-043639, H11-236502 and H11-269418.

The following are examples of representative hydrophobic monomer usable in the block copolymer, but such examples ate not restrictive: benzyl acrylate, benzyl methacrylate, methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxyethyl methacrylate (HEMA), hydroxypropyl methacrylate, 2-ethoxyethyl methacrylate, methacrylonitrile, 2-trimethylsiloxyethyl methacrylate, glycidyl methacrylate (GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, 2-phenylethyl methacrylate, hydroxyethyl acrylate, hydroxypropyl acrylate, acrylonitrile, 2-trimethylsiloxyethyl acrylate, glycidyl acrylate, p-tolyl acrylate and sorbyl acrylate. A preferred hydrophobic monomer is benzyl acrylate, benzyl methacrylate, 2-phenylethyl methacrylate, methyl methacrylate, butyl methacrylate, or 2-ethylhexyl methacrylate, and it is preferred to produce a block copolymer utilizing a homopolymer or a copolymer produced therefrom, such as a copolymer of methyl methacrylate and butyl methacrylate.

Also, the following are examples of the representative hydrophilic monomers usable in the block copolymer, but not limited thereto: methacrylic acid (MMA), acrylic acid, dimethylaminoethyl methacrylate (DMAEMA), diethylaminoethyl methacrylate, tert-butylaminoethyl methacrylate, dimethyaminoethyl acrylate, diethylaminoethyl acrylate, dimethylaminopropyl methacrylamide, methacrylamide, acrylamide and dimethylacrylamide. It is preferred to produce a block copolymer utilizing a homopolymer or a copolymer of methacrylic acid, acrylic acid or dimethylaminoethyl methacrylate.

An acid-containing polymer can be produced either directly or from a blocked monomer, having a blocking group to be eliminated after the polymerization. Examples of the blocked monomer, generating acrylic acid or methacrylic acid after the elimination of the blocking group, include trimethylsilyl methacrylate (TMS-MAA), trimethylsilyl acrylate, 1-butoxyethyl methacrylate, 1-ethoxyethyl methacrylate, 1-butoxyethyl methacrylate, 1-ethoxyethyl methacrylate, 1-butoxyethyl acrylate, 1-ethoxyethyl acrylate, 2-tetrahydropyranyl acrylate and 2-tetrahydropyranyl methacrylate.

The content of the pigment as the dispersible coloring material in the ink is not particularly limited. However, the separation of the first coloring material and the second coloring material on the recording medium is important for the present invention; when the content of the coloring material is excessively high, the water-dispersible coloring material will be fixed on the recording medium in a coagulated state undesirable for the present invention. Therefore, the content of the water-dispersible coloring material in the ink is preferably less than 10 mass %, more preferably less than 4 mass % and further preferably less than 2.5 mass % for an ordinarily employed recording medium, although it may vary depending on the type of the recording medium, for example, on the type of a sizing agent and the internal addition amount thereof. The lower limit of the content of such a pigment can be determined according to a desired image density.

Also in case a dispersant such as a resin dispersant or a surface active dispersant is added to disperse the water-dispersible coloring material, for example, by physical adsorption, such a resin dispersant or surface active dispersant can be employed singly or in combination of two or more kinds, and the amount of the dispersant is preferably 0.5 to-10 mass % of the total mass of the ink, more preferably 0.8 to 8 mass % and further preferably 1 to 6 mass %. In case the content of the dispersant exceeds such a range, it will be difficult to maintain the desired ink viscosity.

Also, when the content of the water-dispersible coloring material in the ink is excessively high, there will remain free coloring material that cannot assemble around the crystal nucleus, thereby deteriorating the effect of the present invention. The water-dispersible coloring material may be employed singly or in combination of two or more kinds.

A water-soluble coloring material means a coloring material having a water-soluble group such as a sulfonic acid group, a free carboxylic acid or phosphoric acid group, a hydroxyl group or an amino group, capable of stably present in water without the action of a secondary component such as a surfactant or a resin. As a compound having fluorescent property or fluorescent coloring material to be used as a component of the ink of the present invention, various compounds or coloring materials can be employed that emit light on excitation. For example, there can be employed a compound which is excited by ultraviolet light and emits light in the ultraviolet, visible or infrared wavelength range, a compound which is excited by visible light and emits light in the visible or infrared wavelength range, or a compound which is excited by infrared light and emits light in the visible or infrared wavelength range. Particularly preferred are compounds having the following atomic groups or basic structures.

[chemical formulas]

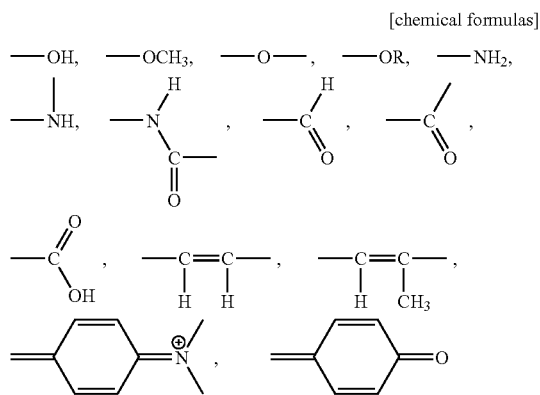

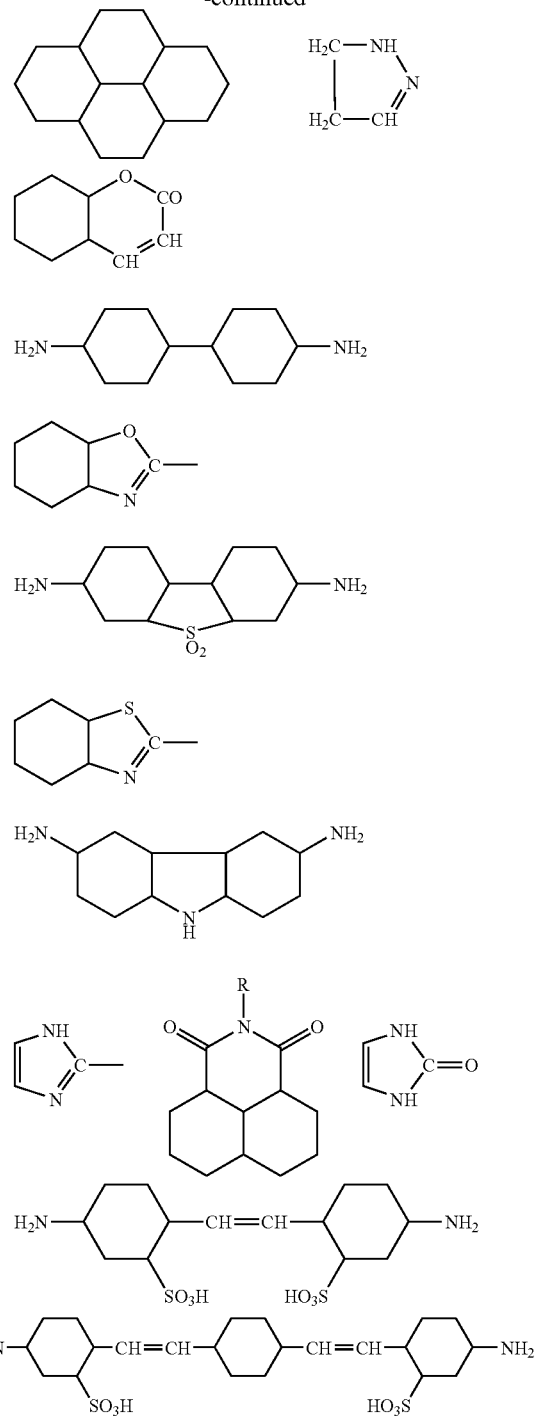

Specific examples include a compound with a xanthene structure such as Acid Red 52, Acid Red 92, Acid Red 289, or Acid Yellow 73; a pyranine derivative such as Solvent Green 7; a coumarine derivative such as Acid Yellow 184; an oxazole derivative, a thiazole derivative, an imidazole derivative, an imidazolone derivative, a pyrazolone derivative, a benzidine derivative, a diaminostilbenedisulfonic acid; and dyes of the structures shown in the following table and water-soluble derivatives thereof. A water-soluble fluorescent dye can exhibit the effect of the present invention most highly.

TABLE 1

| Dye | Structure | Color under daylight | Fluorescent color |
|---|---|---|---|
| Brilliant sulfoflavine FF (C.I.56205) | | yellow | green to yellow green |
| Basic yellow HG (C.I.46040) | | yellow | green yellow to yellow |
| Eosine (C.I.45380) | | red | yellow to orange |
| Rhodamine 6G (C.I.45160) | | red | yellow to orange |
| Rhodamine B (C.I.45170) | | pink | orange to red |

TABLE 1-continued

| Pigment | Structure |
| --- | --- |
| Lumogen L yellow | 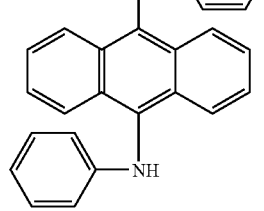 |
| Lumogen L brilliant yellow | 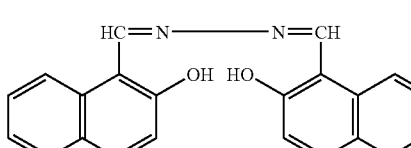 |
| Lumogen L yellow orange | 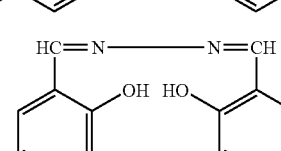 |
| Lumogen L red orange | 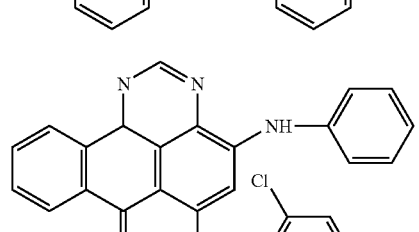 |

Also as the compound having a fluorescent property, there can be employed a common fluorescent whitening agent. In particular the following water-soluble fluorescent coloring material A (hereinafter it may be referred to as "fluorescent compound (A)" or "fluorescent material A", is one of the particularly satisfactory fluorescent coloring materials.

Water-soluble fluorescent coloring material A

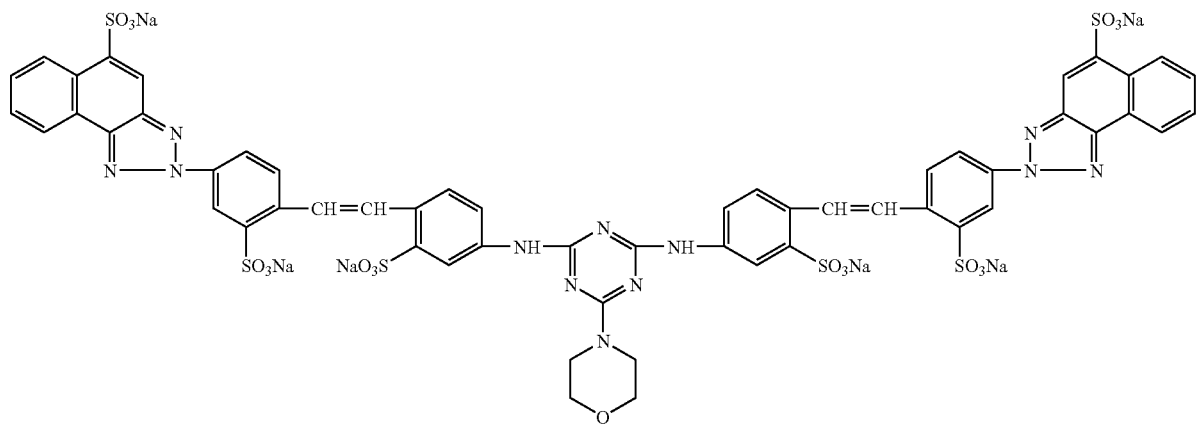

The content of the fluorescent dye in the ink is preferably 0.01 to 30 mass % of the total mass of the ink, more preferably 0.05 to 20 mass %. Also in case a fluorescent property is required to the record matter (recorded image), it is preferable that the content does not develop the concentration quenching (phenomenon of fluorescent intensity decrease when the content in the ink exceeds a certain limit) when recording is executed by depositing the ink of the present invention onto the recording medium. If enhancement of the fluorescent property is most important, a content not higher than 3 mass % is particularly preferred, but, depending on the recording medium or the property of the fluorescent coloring material, the content is not limited thereto.

Also a material having the aforementioned basic structure for fluorescent emission in plural units within the structure thereof, for example a coloring material having a structure of a dimer or a trimer through a connecting group, exhibits an excellent effect for the fluorescence emitting property, particularly in view of concentration quenching resistance.

When the present invention is applied aiming at the fluorescent characteristics, it is preferred for the present invention to further include conditions considering the following points.

Now there will be given an explanation on "plural fluorescent dyes" applicable to the present invention. The "plural fluorescent dyes" to be explained in the following is a technology that can significantly increase the fluorescent intensity of a first fluorescent coloring material in a predetermined (reference) fluorescent wavelength range (for example 580-629 nm) by excitation at a reference excitation wavelength in a relationship with another fluorescent coloring material (hereinafter called second coloring material).

For example, the inventors of the present invention have investigated the phenomenon that although the fluorescent dye AR52 mentioned above emits sufficient red fluorescence even in an ink containing water that absorbs UV light, the recorded image with the dye shows weak fluorescence under UV excitation light. Such an investigation on the phenomenon revealed that the excitation wavelength for AR52 to emit red fluorescence distributes not only in the UV region but also in the visible-light region, and the fluorescent intensity is influenced by the fixing state of the dye in the recording medium. Therefore, technical analysis was carried out on how to provide excitation light as much as possible and how to make the fixing state of the dye in the recorded image suitable for fluorescence emission.

Furthermore, when AR52 is used as a first coloring material, a sufficient fluorescent intensity is obtained when water is evaporated from an ink containing AR52 0.01% by mass or less. However, there are additional matters for consideration including: loss of the coloring material into the recording medium such as a paper sheet or envelope, not fixed onto the surface fibers; and the concentration-quenching problem that the fluorescence intensity of the coloring material decreases with increase of the first and second coloring materials in the ink. Also it must be considered that the energy source is limited to the predetermined excitation light. Other analyses will be understood by the following description.

Therefore, the present invention solves at least one of the following problems (preferably, a plurality of the problems) for improving the fluorescence intensity in comparison with the conventional technical standard.

A first object of the present invention is to provide a print ink capable of increasing the fluorescence intensity thereof at a standard excitation wavelength such that the energy efficiency thereof is improved by focusing attention on a correlation between the fluorescence emission of a second coloring material to be generated by imparting light having the predetermined excitation wavelength and an excitation wavelength of a first coloring material for obtaining a predetermined emission wavelength (hereinafter, referred to as a predetermined fluorescence wavelength of a single wavelength or a wavelength interval).

A second object of the present invention is to provide a print ink capable of increasing the fluorescence intensity thereof at a predetermined emission wavelength such that the energy efficiency thereof is enhanced significantly by focusing attention on an absorption spectrum of a first coloring material and the fluorescence emission of a second coloring material to be generated by imparting light having the predetermined excitation wavelength.

A third object of the present invention is to provide a print ink capable of increasing the fluorescence intensity thereof at a predetermined emission wavelength by focusing attention on the knowledge obtained by analyzing a structural difference between fluorescent dyes (i.e., the amounts of the respective fluorescent dyes to be added can be increased by reasonably preventing the fluorescent dyes from being assembled).

A fourth object of the present invention is to provide a print ink capable of increasing the fluorescence intensity thereof at a predetermined emission wavelength by focusing attention on the involvement with the fluorescence emission of the second coloring material to be generated by imparting light having the predetermined excitation wavelength and the excitation wavelength characteristics for obtaining the predetermined emission fluorescence wavelength of the first coloring material, in addition to the third object.

A fifth object of the present invention is to provide a print ink capable of increasing the fluorescence intensity thereof at a predetermined emission wavelength more stably as the characteristics of the ink itself that contains a plurality of fluorescent coloring materials.

A sixth object of the present invention is to provide a print ink capable of increasing the fluorescence intensity thereof at a predetermined emission wavelength without substantially depending on the kind or characteristics of a recording medium on which an image is to be formed, that is owing to the knowledge obtained by analyzing an image to be formed.

A seventh object of the present invention is to provide a print ink capable of increasing the fluorescence intensity thereof at a predetermined emission wavelength by focusing attention on a correlation between the excitation characteristics of the first coloring material and the absorption spectrum of the second coloring material, in addition to the first object. Other problems and objects of the present invention will become apparent from the following description.

The present invention for attaining the above objects provides the following embodiments. The relationship between wavelengths in the invention is summarized as follows: the fluorescence emission wavelength range (see FIG. 16 described later) of a second fluorescent coloring material covers at least the peak wavelength range (see FIG. 15 described later) of the excitation wavelength spectrum of a first fluorescent coloring material for obtaining fluorescence at a predetermined emission wavelength (e.g., 600 nm), and optionally the absorption wavelength range in visible light region of the first fluorescent coloring material (see the lower graph of FIG. 19 as described later).

First of all, according to a first embodiment of the present invention for attaining at least the first object, there is provided a print ink that comprises:

a first fluorescent coloring material that emits fluorescence at a predetermined emission wavelength to be used for measurement or determination on excitation at a predetermined excitation wavelength; and a second fluorescent coloring material that emits a fluorescence on excitation at the predetermined excitation wavelength, wherein an excitation spectrum of the first coloring material in the ink to obtain the fluorescence at the predetermined emission wavelength has a peak wavelength range next to the predetermined fluorescence wavelength, and an emission fluorescence spectrum of the second coloring material has an emission wavelength region substantially including at least the peak wavelength range.

Here, the expression "a peak wavelength range that corresponds to a peak region next to the predetermined fluorescence wavelength" of the fluorescence emission from the first fluorescent coloring material of the present invention has a practical meaning in consideration of the energy conversion efficiency thereof. In other words, in the excitation wavelength spectrum for obtaining a predetermined fluorescence wavelength of the first fluorescent coloring material, a region having a peak next to the predetermined fluorescence wavelength of which intensity is 100 or more is defined as a peak region, and a range of wavelength corresponding to this region is defined as a peak wavelength range.

The predetermined excitation wavelength is preferably 254 nm, and the peak wavelength range is preferably 430 nm to 600 nm both inclusive. It is preferable that the emission wavelength range of the second fluorescent coloring material includes the predetermined fluorescence wavelength (600 nm), and ranges from 425 nm to 600 nm both inclusive. Furthermore, in the ink according to the first embodiment of the present invention, it is preferable that the absorption spectrum of the first fluorescent coloring material has a peak region in a visible light region, and the wavelength range of the fluorescence emission of the second fluorescent coloring material covers a region of shorter wavelength than the above peak region of the absorption spectrum.

According to a second embodiment of the present invention capable of attaining at least the second object, there is provided a print ink containing: a first fluorescent coloring material that emits fluorescence at a predetermined fluorescence wavelength to be used for measurement or determination on excitation with light of a predetermined excitation, wavelength; and a second fluorescent coloring material that emits fluorescence by excitation at the predetermined excitation wavelength, where an emission wavelength region of the second fluorescent coloring material includes at least a main absorption wavelength region in a light absorption spectrum of the first fluorescent coloring material in an excitation wavelength region for obtaining the emission at the predetermined fluorescence wavelength of the first fluorescent coloring material in the ink.

In the ink according to the second embodiment of the present invention, it is preferable that the main absorption wavelength region of the first fluorescent coloring material is in the range of 500 nm to 590 nm both inclusive, and the main emission wavelength region of the second fluorescent coloring material is in the range of 450 nm to 600 nm both inclusive.

Furthermore, in the ink according to each of the first and second embodiments of the present invention, it is preferable that the second fluorescent coloring material is a coloring material having a structure with a plurality of fluorescence groups.

According to a third embodiment of the present invention capable of attaining at least the third object, there is provided a print ink containing: a first fluorescent coloring material that emits fluorescence at a predetermined fluorescence wavelength to be used for measurement or determination on excitation at a predetermined excitation wavelength; and a second fluorescent coloring material that emits fluorescence on excitation at the predetermined excitation wavelength and enhances an emission-intensity at the predetermined fluorescence wavelength, where the second fluorescent coloring material has a plurality of fluorescence groups.

In the ink according to the third embodiment of the invention, it is preferable that an emission wavelength region of the second fluorescent coloring material is in the excitation wavelength region for obtaining the predetermined fluorescence wavelength of the first fluorescent coloring material in the ink.

According to a fourth embodiment of the present invention capable of attaining at least the fourth object, there is provided a print ink containing: a first fluorescent coloring material that emits fluorescence at a predetermined fluorescence wavelength to be used for measurement or determination on excitation at a predetermined excitation wavelength; and a second fluorescent coloring material that emits fluorescence on excitation at the predetermined excitation wavelength, where the second fluorescent coloring material has a plurality of fluorescence groups, and an emission wavelength region of the second fluorescent coloring material overlaps with at least a part of an excitation wavelength region for obtaining emission at the predetermined fluorescence wavelength of the first fluorescent coloring material in the ink.

In the ink according to each of the third and fourth embodiments of the present invention, it is preferable that each of the plurality of fluorescence groups in the second fluorescent coloring material has a basic structure for brightening its fluorescence. In addition, the second fluorescent coloring material preferably has a plurality of sulfone groups.

In the ink according to any one of the first to fourth embodiments of the present invention, the plurality of fluorescence groups in the second fluorescent coloring material are preferably in a dimer form. Meanwhile, in the first to fourth embodiments of the present invention, the second fluorescent coloring material is preferably a direct dye.

Furthermore, the print ink according to each of the third and fourth embodiments of the present invention is preferably an aqueous ink which emits fluorescence on excitation at the predetermined excitation wavelength where the aqueous print ink is in a water-evaporated state and/or a printed image state, of which emission spectrum has a first peak including the predetermined fluorescence wavelength and a second peak in a wavelength region corresponding to the excitation wavelength region of the first fluorescent coloring material for obtaining the emission at the predetermined fluorescence wavelength in the ink.

According to a fifth embodiment of the present invention for attaining at least the fifth object, there is provided an aqueous print ink containing: a first fluorescent coloring material that emits fluorescence at a predetermined fluorescence wavelength to be used for measurement or determination on excitation at a predetermined excitation wavelength; and a second fluorescent coloring material that emits fluorescence on excitation at the predetermined excitation wavelength, which emits fluorescence by the predetermined excitation wavelength while the aqueous print ink is in a water-evaporated state and/or a printed image state, of which emission spectrum has a first peak including the predetermined fluorescence wavelength and a second peak in a wavelength region corresponding to the excitation wavelength region of the first fluorescent coloring material for obtaining the emission at the predetermined fluorescence wavelength in the ink. In the ink according to the fifth embodiment of the present invention, preferably, the second fluorescent coloring material may have a structure having a plurality of fluorescence groups.

According to a sixth embodiment of the present invention for attaining at least the sixth object, there is provided a print ink containing: a first fluorescent dye that emits fluorescence at a predetermined fluorescence wavelength to be used for measurement or determination on excitation at a predetermined excitation wavelength; a second fluorescent dye for emitting fluorescence on excitation at the predetermined excitation wavelength and for enhancing an emission intensity at the predetermined fluorescence wavelength; and a solvent including a first solvent that shows relatively high solubility to the first fluorescent dye, and low solubility to the second fluorescent dye, and a second solvent that shows high solubility to the second fluorescent dye and compatibility to the first solvent.

In the ink according to the sixth embodiment of the invention, each of the first fluorescent dye and the second fluorescent dye may preferably have a sulfone group. In addition, it is preferabe that an emission wavelength region of the second fluorescent dye substantially covers a peak wavelength range next to the predetermined fluorescence wavelength in an excitation spectrum of the first fluorescent dye for obtaining fluorescence of the predetermined fluorescence wavelength in the ink. In the ink according to the sixth embodiment of the present invention, furthermore, the emission wavelength region of the second fluorescent dye may be preferably in the excitation wavelength region of the first fluorescent dye for obtaining fluorescence at the predetermined fluorescence wavelength excluding a region corresponding to a main absorption wavelength region in a light absorption spectrum of the first fluorescent dye.

On the other hand, the print ink according to the sixth embodiment of the present invention may be preferably an aqueous ink, where an emission spectrum of the ink, which emits fluorescence by the predetermined excitation wavelength when the aqueous print ink is in a water content evaporated ink state and/or a printed image state, exhibits a first peak that contains the emission at the predetermined fluorescence wavelength and a second peak in the excitation wavelength region for obtaining the emission at the predetermined fluorescence wavelength of the first fluorescent coloring material in the ink.

According to a seventh embodiment of the present invention capable of attaining at least the seventh object, there is provided a print ink containing: a first fluorescent coloring material that emit fluorescence at a predetermined fluorescence wavelength to be used for measurement or determination on excitation at a predetermined excitation wavelength; and a second fluorescent coloring material that emits fluorescence on excitation at the predetermined excitation wavelength, where an emission wavelength range of the second fluorescent coloring material includes at least a peak wavelength range corresponding to a peak region next to the predetermined fluorescence wavelength in an excitation wavelength range of the first fluorescent coloring material for the predetermined fluorescence wavelength, and a main absorption wavelength range in a light absorption spectrum of the second fluorescent coloring material is in a shorter wavelength range than the excitation wavelength range of the first fluorescent coloring material. In the ink according to the seventh embodiment of the present invention, preferably, the predetermined excitation wavelength is 254 nm, the peak wavelength range of the first fluorescent coloring material is in the range of 430 nm to 600 nm both inclusive, and the absorption wavelength region of the second fluorescent coloring material is 440 nm or less.

In the ink according to any one of the first to five embodiments and the seventh embodiment of the present invention, more preferably, the print ink contains a first solvent showing a relatively high solubility to the first fluorescent dye and low solubility to the second fluorescent dye, a second solvent showing a high solubility to the second fluorescent dye and compatibility to the first solvent, and a third solvent showing no compatibility to the second solvent and solving the second fluorescent dye. This solvent condition can further improve the fluorescence intensities of the different fluorescent coloring materials of the present invention.

When one of the above print inks is used in inkjet recording, a recorded image excellent in fluorescence intensity is obtained. An inkjet recording method of the present invention to exert such an advantage is a method comprising the steps of ejecting ink through a discharge port and attaching the ink on a recording medium to thereby perform recording, in which the ink is one of the print inks according to one of the above embodiments.

The printing ink of the present invention contains plural fluorescent coloring materials where a first fluorescent coloring material provides a light emission of which wavelength range includes a predetermined wavelength to be utilized for measurement or judgment when excited at a predetermined exciting wavelength, and a second fluorescent coloring material emits fluorescence by excitation at the predetermined excitation wavelength, and the relationship between the first and the second fluorescent materials are as defined in aforementioned inventions.

As described later, the print ink according to the present invention of the best dye combination is able to increase the PMU level of the recorded image (measured by using a LM-2C luminance meter as described in U.S. Pat. No. 6,176, 908 B) at least by twofold in comparison with the conventional fluorescent ink (by threefold when the solvents are selected according to Aspect 3 described below).

Hereinafter, the print ink of the present invention will be described with reference to the drawings. Unless noted as a recorded image or a printed matter, the results are with an evaporated ink in which water was removed by evaporation and coloring materials are dispersed in an organic solvent. The print ink according to each embodiment of the present invention contains a first fluorescent coloring material that emits fluorescence of a predetermined wavelength that is used for measurement or determination, with excitation at a predetermined excitation wavelength, a second fluorescent coloring material that emits fluorescence with excitation at the same excitation wavelength, and a liquid medium for solving or dispersing these materials therein.

The first and second fluorescent coloring materials of the present invention can be pigments or dyes so long as the configuration of each embodiment is satisfied. Dyes are preferable for higher feathering rates and higher fluorescence intensities on the recording medium.

Specific examples of the dyes include: C.I. Basic Red 1, 2, 9, 12, 13, 14, and 17; C.I. Basic Violet 1, 3, 7, 10, 11:1, and 14; C.I. Acid Yellow 73, 184, and 250; C.I. Acid Red 51, 52, 92, and 94; C.I. Direct Yellow 11, 24, 26, 87; 100, and 147; C.I. Direct Orange 26, 29, 29:1, and 46; and C.I Direct Red 1, 13, 17, 239, 240, 242, and 254.

The total amounts of the respective first and second fluorescent coloring materials in the ink is, preferably, in the range of 0.01% by mass or more and 15% by mass or less, more preferably in the range of 0.05% by mass or more and 10% by mass or less of the total amount of the ink for practical use. According to the coloring materials, when the total amount of the coloring materials in the ink is not higher than 0.01% by mass, fluorescence intensity sufficient for a printed matter may not be obtained. When the ink is for ink jet recording, the discharge characteristics thereof may be affected when the total amount of the above materials is 15% by mass or more. In practical view, it is preferable that the amount of the first fluorescent coloring material be selected from the range of 0.01 to 1% by mass, and the amount of the second fluorescent coloring material may preferably be higher than that of the first fluorescent coloring material in the ink to improve the excitation energy efficiency further.

Some dyes in the above list are known to have weaker fluorescence at a concentration higher than a certain concentration, having a concentration region for strong fluorescence intensity. In such a case, it is preferable to use the dye in such a concentration region.

To improve the fluorescence intensity, it is preferable that the first and the second fluorescent coloring materials satisfy at least of one of the following Aspect 1 to Aspect 3. A combination of the first and second fluorescent can be selected from the coloring materials described above coloring materials according to the Aspect.

In the present invention, a most preferable example of the combination of fluorescent coloring materials is a combination of C.I. Acid Red 52 as the first fluorescent coloring material and the compound (A) described below as the second fluorescent coloring material. In the following description, but not limited to, the predetermined emission wavelength used for measurement or determination is 600 nm, although it may be a band or any wavelength in the range of 580 nm to 620 nm both inclusive.

Figure 14:
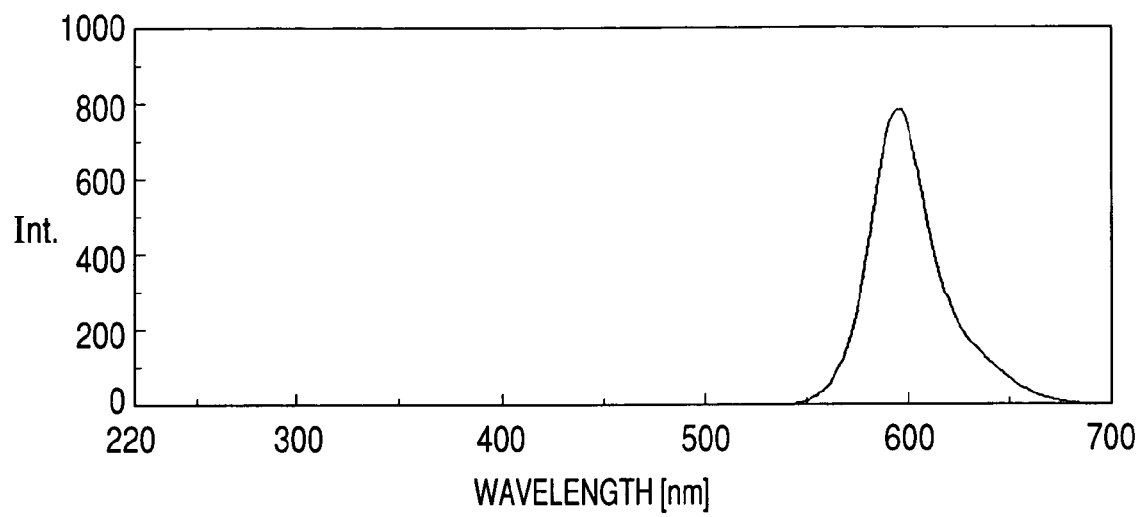
FIG. 14 shows a fluorescence emission spectrum of C.I. Acid Red 52 at an excitation wavelength of 254 nm.

As shown in FIG. 14, when the AR52, the first fluorescent coloring material, is excited at 254 nm, the fluorescence spectrum shows a wide fluorescence region from 550 nm to ca. 675 nm with a peak at 600 nm. In other words, AR52 emits fluorescence not only at the predetermined emission wavelength of 600 nm as defined above, but also in the range of 580 nm to 620 nm both inclusive. On the other hand, the absorption band of AR52 in the visible region ranges from 460 nm to 610 nm with a peak at 565 nm, as shown in the bottom graph of FIG. 19.

Figure 16:
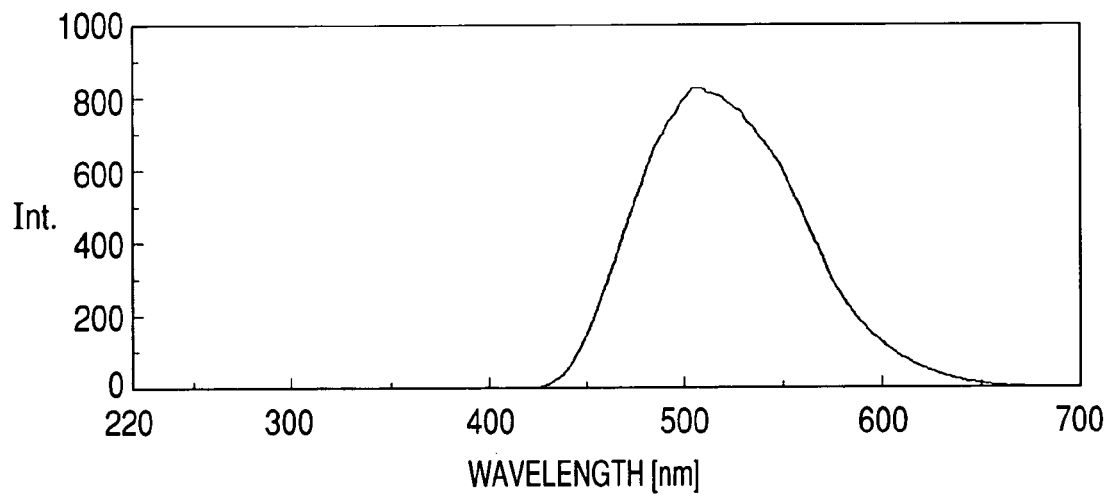
FIG. 16 shows a fluorescence emission spectrum of a water-soluble fluorescent coloring material A at an excitation wavelength of 254 nm.

The compound (A) has a dimeric structure having plural emission groups. Thus, the compound (A) has an association-preventing function, and also the fluorescence intensity can be improved with increasing the amount of the compound (A). The compound (A) is a direct dye having sulfone groups and having poor water solubility (less than 2 wt % in pure water), while showing good solubility in organic solvents. As shown in FIG. 16, a fluorescence spectrum of the compound (A) on excitation at 254 nm shows a wide fluorescence emission region ranging from 425 nm to ca. 650 nm with a peak at 510 nm. Therefore, the more the compound (A) is added, the higher its fluorescence intensity becomes, so that the excitation energy for the first fluorescent coloring material increases. Furthermore, as shown in the bottom graph in FIG. 18, the absorption in visible region of the compound (A) is up to 440 nm having a peak at 380 nm, and it also has UV absorption. Therefore, even if the compound (A) is added in a substantially large amount, it will not spoil the fluorescence characteristics of the compound (A), the fluorescence intensity in the region corresponding to the excitation wavelength region for the first fluorescent coloring material, or the fluorescence characteristics of the first fluorescent coloring material.

Figure 20:
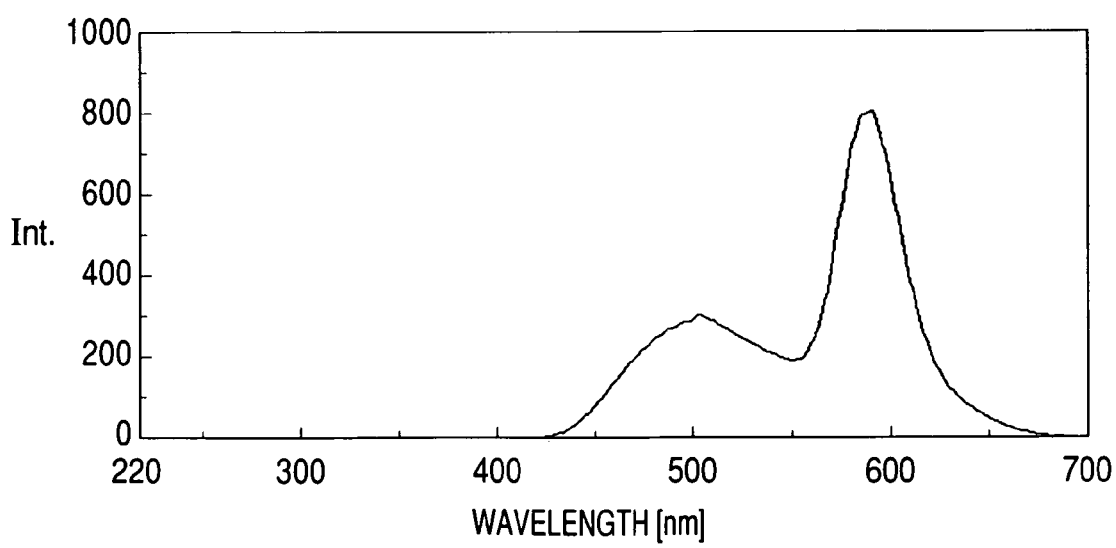
FIG. 20 shows a fluorescence spectrum of a mixed ink of C.I. Acid Red 52 and the water-soluble coloring material A.

The preferable solvents for the ink are pure water that can dissolve the first fluorescent coloring material in a large amount, and an organic solvent that can dissolve the second fluorescent coloring material in a large amount. More preferably, a surfactant may be included in the liquid medium. Such a liquid medium serves for forming images where the first fluorescent coloring material is fixed in a monomolecular state and the first and second coloring materials are uniformly dispersed and fixed. As a result, when excited at 254 nm, the fluorescence characteristics of a recorded image (FIG. 21) is much improved in comparison with those of the evaporated ink (FIG. 20). Thus, the compound (A) is a preferable example having a structure and characteristics to achieve various objects of the present invention.

Hereinafter, the combination of C.I. Acid Red 52 as a first fluorescent coloring material and the compound (A) as a second fluorescent coloring material is described using a determination standard of a predetermined emission wavelength of 600 nm and a predetermined excitation wavelength of 254 nm, including embodiments of the present invention.

[Aspect 1]

Figure 15:
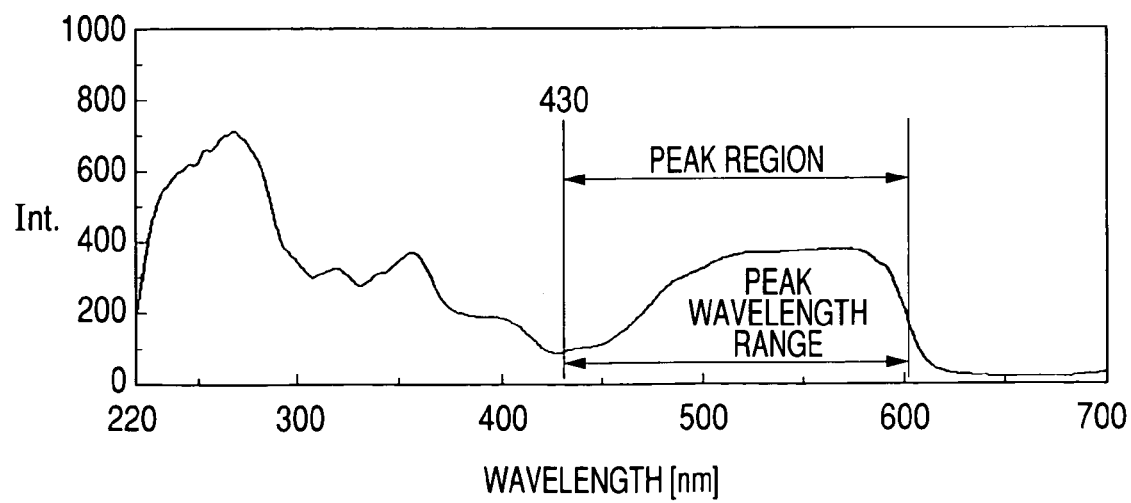
FIG. 15 shows an excitation spectrum of C.I. Acid Red 52 for fluorescence emission at a wavelength of 600 nm.

Aspect 1 is characterized in that the fluorescence emission wavelength region of the second fluorescent coloring material covers at least the peak wavelength range of the excitation spectrum of the first fluorescent coloring material measured for emission at 600 nm (see FIG. 15) and/or the absorption wavelengths in the visible region of the first fluorescent coloring material (see the bottom of FIG. 16). According to Aspect 1, the relative relation of wavelength regions is complementary or efficiency is improved. First, an evaporated ink was prepared as follows: a predetermined amount (in this case, 0.3% by mass of the solution) of C.I. Acid Red 52 (AR52) as the first fluorescent coloring material was dissolved in an aqueous solution (an organic solvent (e.g., glycerin) and pure water), and the solution was heated at 60° C. to completely evaporate water. When the evaporated ink was subjected to excitation at 254 nm using a measuring device (FP 750, manufactured by JASCO Corporation), the fluorescence emission spectrum was as shown in FIG. 14, and the excitation wavelength spectrum for a predetermined emission wavelength of 600 nm is shown in FIG. 15. FIG. 15 shows that the UV region of 380 nm or shorter has a peak region having a peak around 265 nm and a peak region having a peak around 360 nm, and also one peak region in the visible light region. Generally, the UV excitation wavelength to be used for calling is, 254 nm or 365 nm. When the energy conversion efficiency was studied, it was found that when the excitation intensity, as plotted in the vertical axis of FIG. 15, is 100 or more, the determination is effective, that is, the intensity is sufficient for calling. Therefore, "the peak wavelength range corresponding to the peak region next to the predetermined emission wavelength" of the fluorescence emission of the first fluorescent coloring material in the present invention has a practical meaning in consideration of the above energy conversion efficiency. In other words, in the "excitation wavelength spectrum for obtaining emission at the predetermined wavelength" of the first fluorescent coloring material (FIG. 15), "peak region" is a region of which intensity is 100 or more in the spectrum having a peak next to the predetermined fluorescence wavelength. A range of the wavelength corresponding to this region is a peak wavelength range.

Therefore, in FIG. 15, when the predetermined fluorescence wavelength of AR52 is 600 nm (the predetermined excitation wavelength: 254 nm), the peak wavelength range thereof is from 430 nm to 600 nm both inclusive. On the other hand, as shown in FIG. 1-6, the compound (A) provided as a second fluorescent coloring material has a main fluorescence emission ranging 450 nm to 600 nm both inclusive almost covering the peak wavelength range of 430 nm to 600 nm both inclusive. From each of the figures, when the above fluorescence intensity is set to 100, it can be also understood that the compound (A) fluoresces to satisfy such a range.

Figure 17:
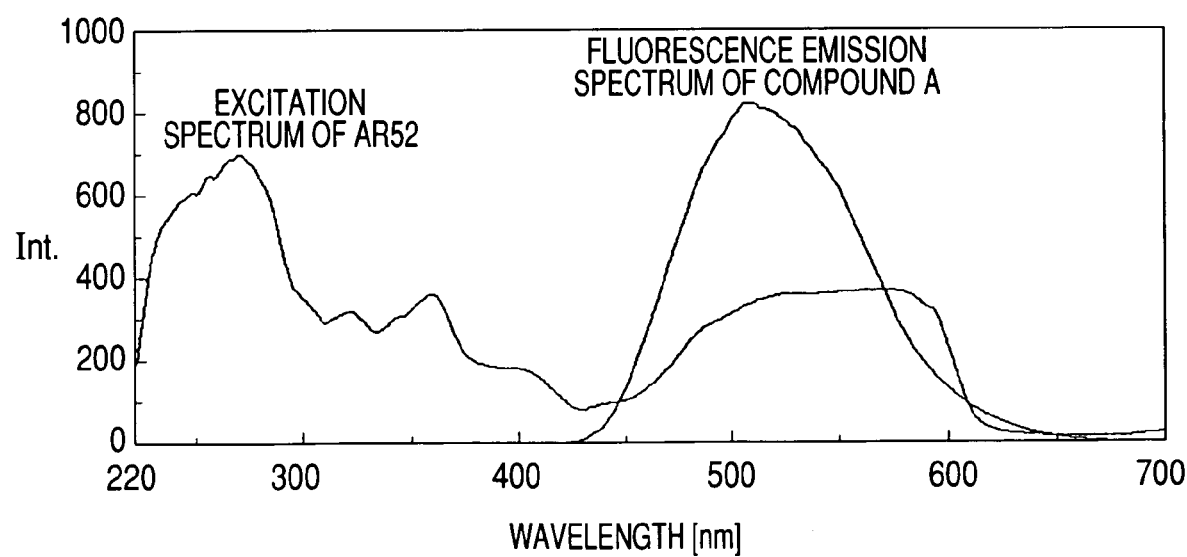
FIG. 17 shows a comparison of an excitation spectrum of C.I. Acid Red 52 for fluorescence emission at a wavelength of 600 nm and a fluorescence emission spectrum of the water-soluble coloring material A at an excitation wavelength of 254 nm.

FIG. 17 is a graph showing the relationship between fluorescence emission wavelength characteristics of the compound (A) and an excitation wavelength for obtaining the emission of AR52 at 600 nm, where the excitation wavelength spectrum (FIG. 15) of the first fluorescent coloring material and the emission spectrum (FIG. 16) of the second fluorescent coloring material are superimposed. As can be understood from FIG. 17, in comparison with the fluorescence intensity of AR52 at the wavelength of 600 nm at which emission intensity of AR52 is maximum as shown in FIG. 14, the maximum emission intensity of the compound (A) is as high as 800 or more at the wavelength of 510 nm. Referring to these figures, this embodiment can be understood. Therefore, the emission wavelength of the second fluorescent coloring material includes the peak wavelength range of the first fluorescent coloring material, so that the energy conversion can be efficiently performed, and the fluorescence intensity at the predetermined fluorescence wavelength can be improved synergistically on excitation at a predetermined excitation wavelength.

Figure 18:
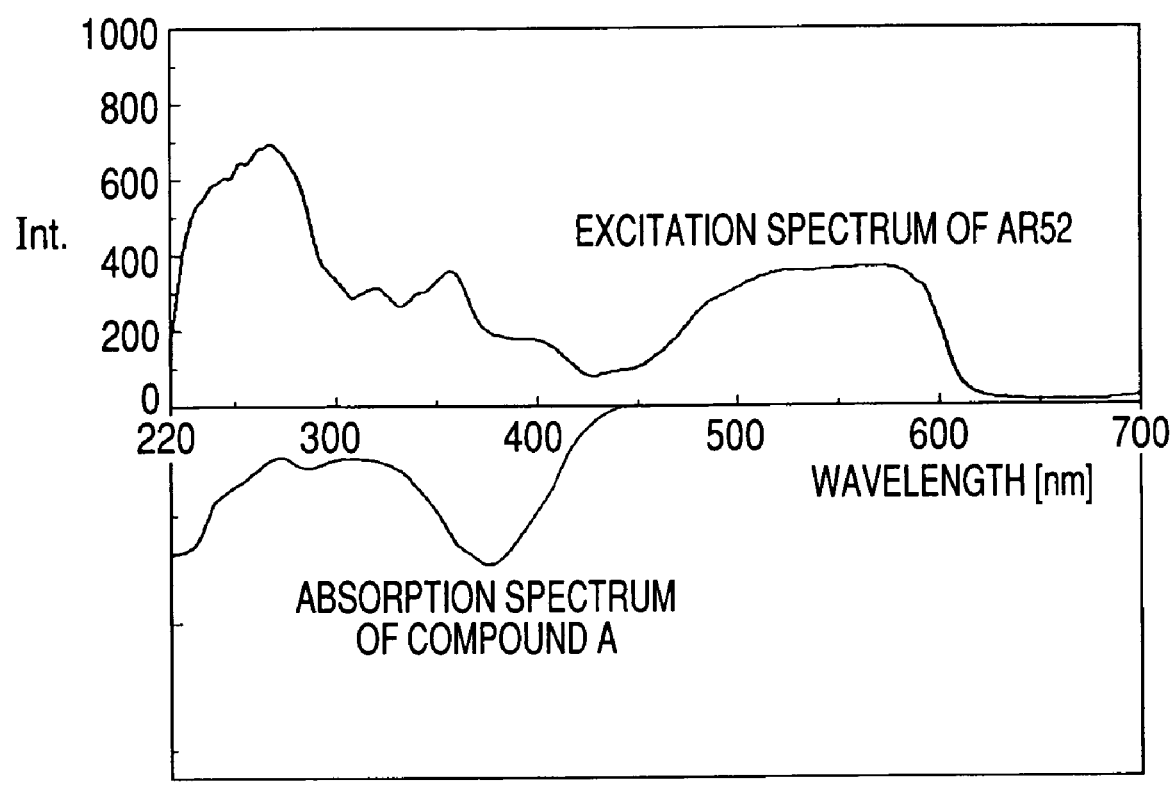
FIG. 18 shows a comparison of an excitation spectrum of C.I. Acid Red 52 for fluorescence emission at 600 nm and an absorption spectrum of the water-soluble coloring material A.

Next, the absorption spectrum of a coloring material to be used should be taken into consideration of loss. FIG. 18 shows the excitation spectrum of AR52 for fluorescence emission at 600 nm (the upper graph) and a light absorption spectrum of the compound (A) (the lower graph), where the upper and lower graphs are compared with each other with the same wavelength scale. Here, the absorption and the excitation cannot be quantitatively compared with each other, but the relative relation therebetween can be found. Generally, the absorption band overlaps partially with the emission band, but shifting toward shorter wavelength. The light absorption spectrum of the compound (A) also overlaps with the fluorescence emission wavelength region shown in FIG. 16, showing absorption at a wavelength of 440 nm or shorter. The absorption spectrum has practical meaning around the peaks. Therefore, it is preferable that the wavelength region including the maximum absorption wavelength (380 nm) of the compound (A) does not overlap with the main excitation wavelength region of AR52 ranging from 425 nm to 600 nm both inclusive where the fluorescence intensity is 100 or more, more preferably no overlap between the main absorption region of 425 nm or shorter and the main excitation region of AR52. Anyway, the absorption band of the compound (A) does not overlap with the peak wavelength range of AR52, so that the absorption band does not directly affect the above energy conversion.

If a large percentage of the emission of the second fluorescent coloring material corresponding to the excitation wavelength region of the first fluorescent coloring material is absorbed by the second coloring material by itself, it will be a loss in improvement of fluorescence intensity.

Since the wavelength range of the fluorescence emission of the compound (A) overlaps with the excitation wavelength range of AR52 effective to obtain emission at the predetermined wavelength, the emission from the compound (A) is utilized to excite AR52. In addition, the absorption by the compound (A) does not lower the efficiency of the energy conversion. Therefore, the fluorescence emission from the second fluorescent coloring material becomes new excitation energy for the first fluorescent coloring material, for enhancing fluorescence.

As is evident from a comparison between FIG. 14 and FIG. 16, the fluorescence emission of AR52 and the fluorescence emission of the compound (A) overlap in a wavelength range of, at least, 580 nm or more and 620 nm or less. The overlap provides a more effective relationship for the determination at the predetermined emission wavelength.

Figure 19:
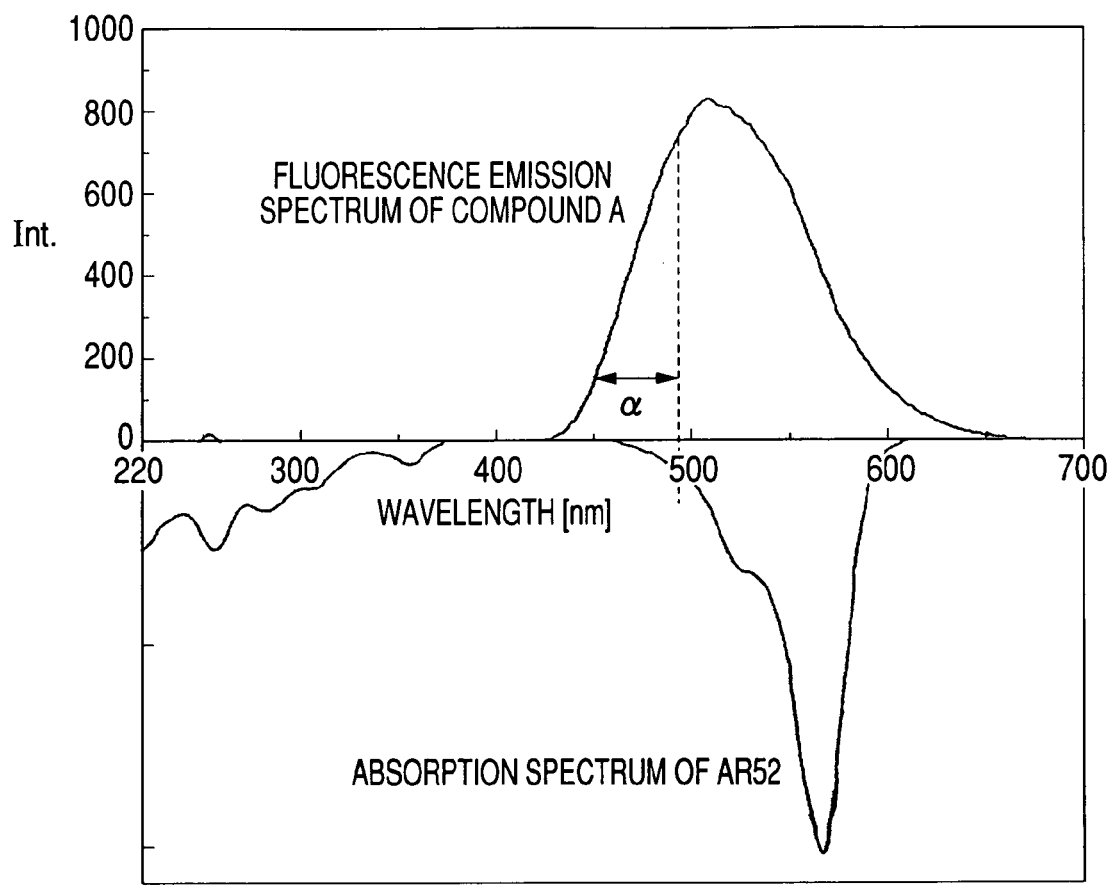
FIG. 19 shows a comparison of a fluorescence emission of the water-soluble coloring material A at 254 nm and an absorption spectrum of C.I. Acid Red 52.

Next, the feature of the present invention with respect to the absorption spectrum of the first fluorescent coloring material is described. FIG. 19 is a graph incorporating the absorption spectrum of AR52 (the lower graph) and the fluorescence emission spectrum of the compound (A) (the upper graph) on the same wavelength scale. The absorption spectrum of AR52 can be considered to show the energy loss to the fluorescence emission of the compound (A). The absorption spectrum of AR52 has a main peak near 560 nm ranging from 600 nm to 460 nm both inclusive in the visible light region. The range of substantial absorption of AR52 is narrower than the above, ranging from 500 nm to 590 nm both inclusive. Considering the range of the fluorescence emission of AR52 (550 nm or more) and the intensity thereof as shown in FIG. 14, absorption is considered to occur in the range of 500 nm to 560 nm both inclusive. Since this absorption band is present in the visible light region, it has been kept out of the technical argument on the fluorescence emission of AR52. However, since different fluorescent coloring materials are used in the present invention, this absorption band has become a point of consideration in the two-stage excitation energy conversion. That is, once this absorption band is recognized, a solution is that the fluorescence emission of the second fluorescent coloring material is in a range covering the excitation wavelength of AR52 for obtaining emission at the predetermined fluorescence wavelength, but not including this absorption range. FIG. 19 shows this relationship. As can be recognized from the upper and lower graphs in FIG. 19, the main fluorescence emission of the compound (A) is in a range of 430 nm to 515 nm both inclusive, not affected by the absorption band. The fluorescence emission of the compound (A) includes a fluorescence emission range designated as $\alpha$ in FIG. 19 (430 nm$\leq\alpha$<500 nm) in a wavelength range not overlapping with the substantial absorption band of AR52 ranging from 500 nm to 590 nm both inclusive having a peak at 560 nm. The light energy of this region $\alpha$ is used as extra excitation energy for the first fluorescent coloring material. Therefore, the entire fluorescence intensity at the predetermined emission wavelength can be enhanced. In other words, the region $\alpha$ contributes to the improvement of fluorescence intensity of AR52, because at least the region $\alpha$ overlaps with the second excitation wavelength region of AR52.

Figure 23:
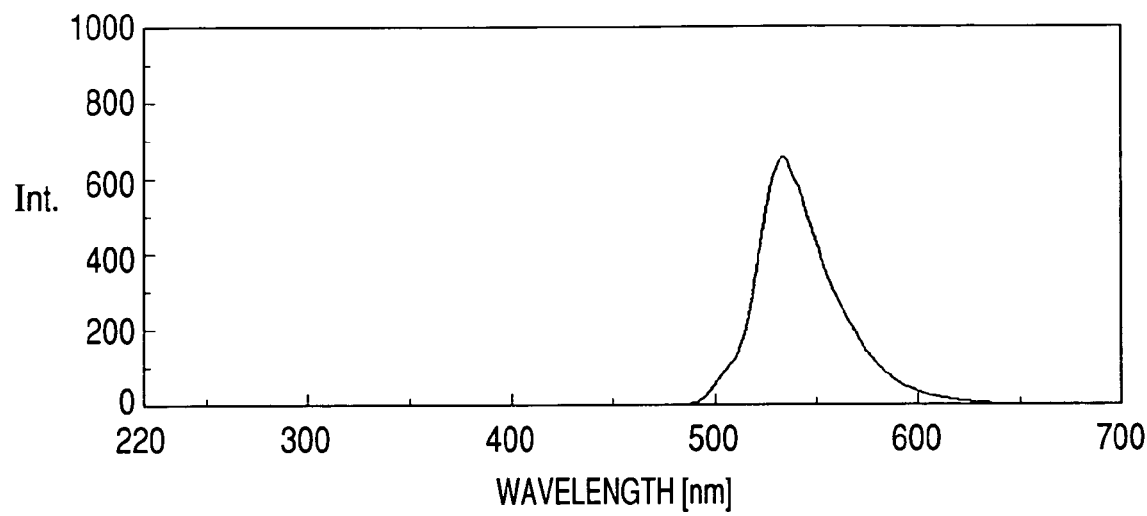
FIG. 23 shows a fluorescence emission spectrum of C. I. Acid Yellow 73 at an excitation wavelength of 254 nm.

Next, as a reference example, a combination of C.I. Acid Yellow 73 (AY73) and AR52 will be explained with reference to FIGS. 23 to 26, a combination described in U.S. Pat. No. 6,176,908 B. In each figure, the evaporated ink was used when UV light was applied, while the absorption was measured with the normal ink. As shown in FIG. 23, AY73 emits fluorescence in a wavelength region of about 500 to 600 nm both inclusive (peak: 530 nm) when excited at a predetermined excitation wavelength of 254 nm.

Figure 24:
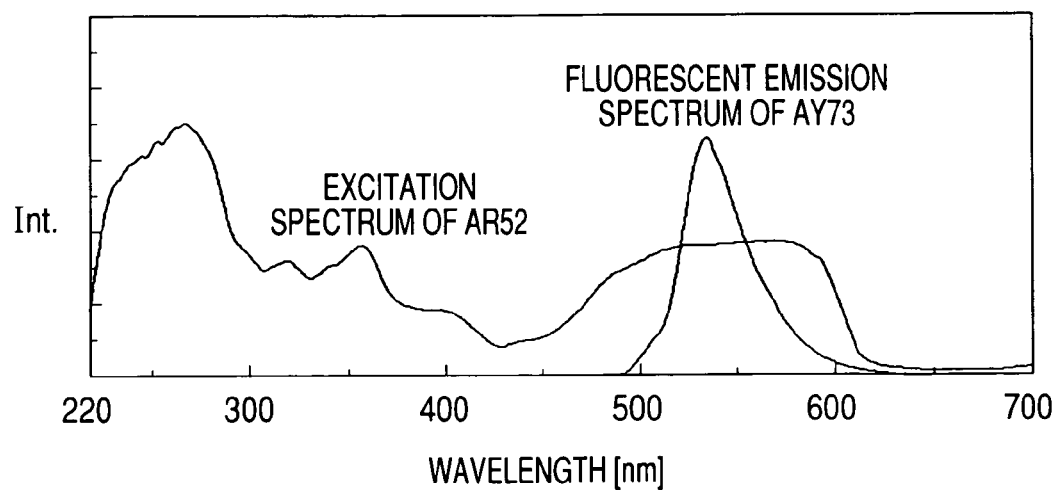
FIG. 24 shows a comparison of an excitation spectrum of C.I. Acid-Red 52 for fluorescence emission at a wavelength of 600 nm and a fluorescence emission spectrum of C.I. Acid Yellow 73 with an excitation wavelength of 254 nm.

In FIG. 24, the fluorescence spectrum of AY73 of FIG. 23 is superimposed on the excitation spectrum of AR52 shown in FIG. 15. As seen from this figure, the fluorescence emission of AY73 is in a wavelength region of about 500 to 600 nm both inclusive (peak: 530 nm), and the wavelength range with the effective emission intensity is narrow. The fluorescence emission range of AY73 is inside the peak excitation wavelength range of A52 (475 nm to 600 nm both inclusive). Therefore, AY73 does not emit fluorescence enough to make AR52 fluoresce.

Figure 25:
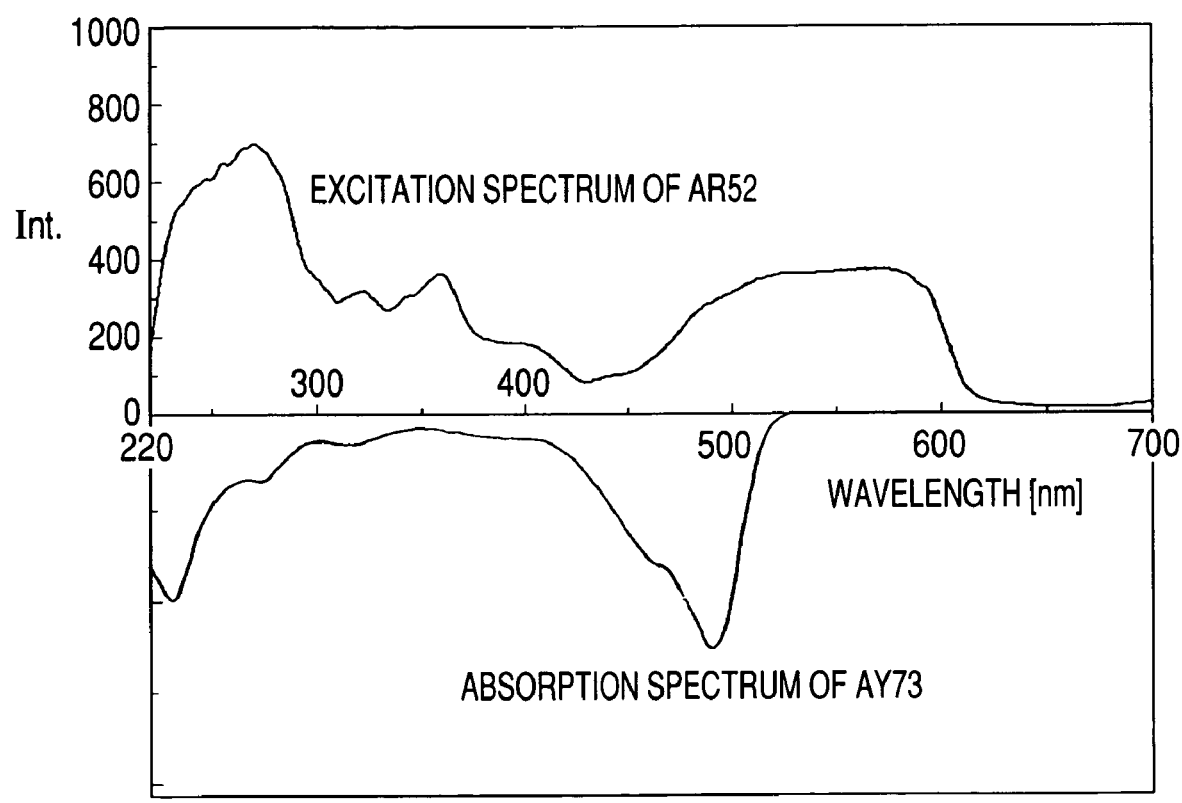
FIG. 25 shows a comparison of an excitation spectrum of C.I. Acid Red 52 for a fluorescence emission at 600 nm and an absorption spectrum of C.I. Acid Yellow 73.

FIG. 25 shows a comparison between the excitation spectrum of AR52 for obtaining emission at 600 nm and a light absorption spectrum of AY73. The light absorption band of AY73 is in the visible light region of not higher than 525 nm and has a peak at 490 nm. When an ink contains the compound (A) and both of AR52 and AY73, as an example of the present invention, AY73 acts to lower the effect of the compound (A) according to the light absorption spectrum. Therefore, it is necessary to increase the addition amount of the compound (A) as much as desired (see Aspect 2 described below) and to compensate the loss due to the absorption by AY73. Furthermore, as shown in FIG. 25, the maximum absorption wavelength (490 nm) of AY73 is present in the excitation wavelength region (450 nm to 600 nm both inclusive) of AR52.

Figure 26:
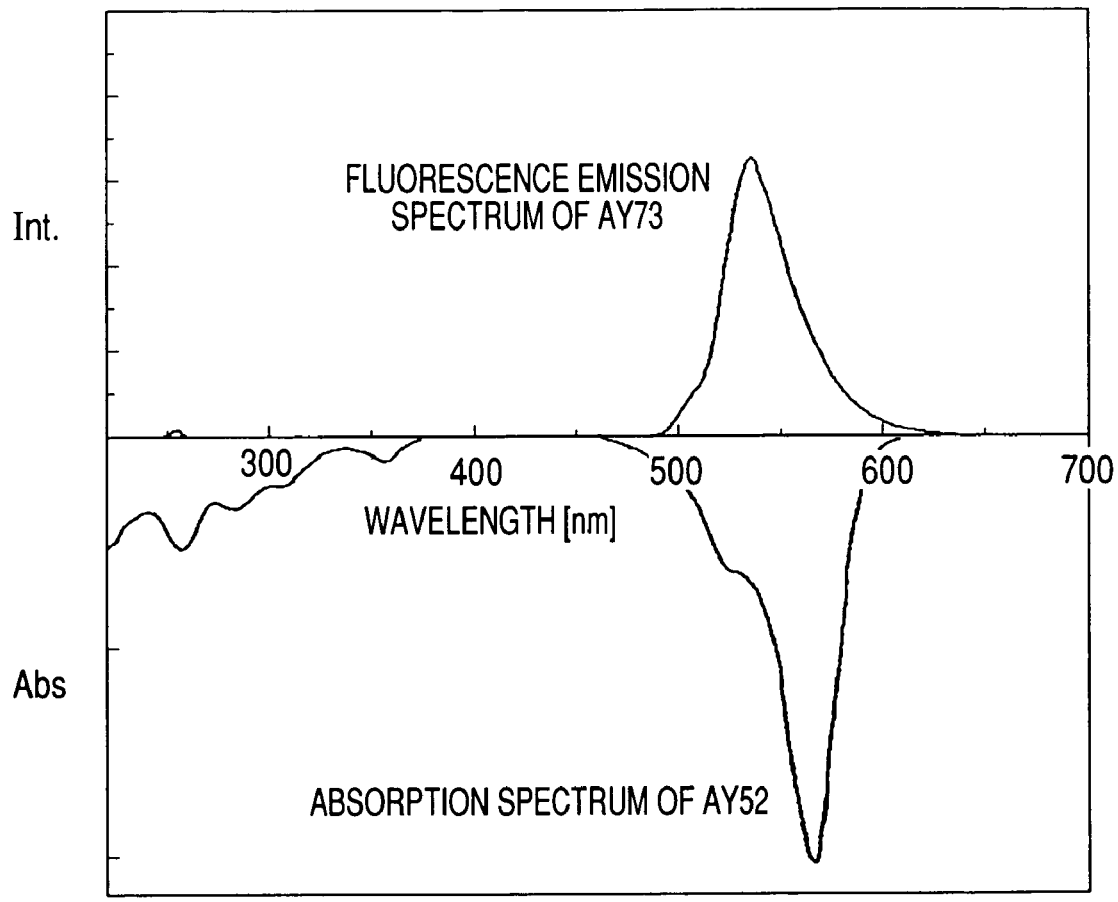
FIG. 26 shows a comparison of an absorption spectrum of C.I. Acid Red 52 and a fluorescence emission spectrum of C.I. Acid Yellow 73 at 254 nm.

FIG. 26 shows a combination of the absorption spectrum of AR52 shown in the lower graph of FIG. 19 and the fluorescence spectrum of AY73. As seen from FIG. 26, the fluorescence band of AY73 is included in the substantial absorption region (500 nm to 590 nm both inclusive) of AR52, and no emission wavelength is observed at shorter wavelengths than the above absorption region. Therefore, the combination of only AR52 and AY73 does not disclose any of the configurations of the present invention described above and does not provide the advantage of present invention.

Figure 21:
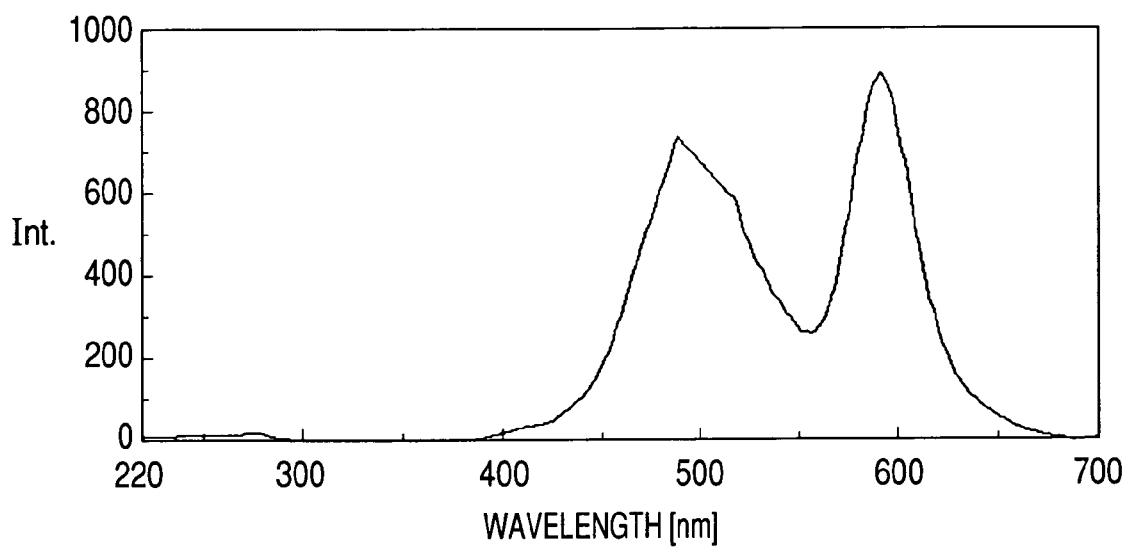
FIG. 21 shows a fluorescence spectrum of a print formed with an ink containing C.I. Acid Red 52 and the water-soluble coloring material A.

Referring back to FIGS. 20 to 22, the present invention will be further described in view of ink and a recorded image. FIG. 20 represents the measurements obtained by preparing recording ink that contains both AR52 and the compound (A), pure water, and an organic solvent, followed by exciting the recording ink as the evaporated ink at a predetermined excitation wavelength of 254 nm by the FP-750. FIG. 21 represents the measurements obtained by exciting an image recorded on a recording medium using the recording ink at a predetermined excitation wavelength of 254 nm by the FP-750. In other words, FIG. 20 shows the results of studying the characteristics of the recording ink of the present invention with evaporated ink, and FIG. 21 shows the characteristics of a recorded image with the recording ink of the present invention, and the use of the recording ink of the present invention can be proved in terms of the recorded image.

The effects of the present invention will be confirmed by comparing FIG. 20 and FIG. 21. This is because the same ink is used in those figures, which is effective in a relative comparison. In each of FIG. 20 and FIG. 21, the graph has two peaks in the vicinity of 500 nm and at 590 nm, respectively. As is evident from each of FIG. 14 and FIG. 16 described above, the compound (A) provides a peak at approximately 500 nm, and AR52 provides a peak at 590 nm. As can be seen from the comparison between FIG. 20 and FIG. 21, with respect to FIG. 20 showing AR 52 and the compound (A) which are in an ideal dissolution state, a recorded image receives a further increase in fluorescence intensity, particularly an increase in fluorescence intensity of the predetermined emission wavelength (600 nm, or the whole range of 580 nm to 620 nm). Those facts prove the following. In the recorded image, each of the coloring materials utilizes the predetermined excitation wavelength efficiently, and the emission from the compound (A) provided as a second fluorescent coloring material and the emission from the first fluorescent coloring material using the emission from the compound (A) can be obtained. Generally, when the fluorescent coloring materials are associated with each other, a peak wavelength is shifted toward longer wavelengths. However, in the comparison between FIG. 20 and FIG. 21, there is no shift as above. Thus, the absence of such a shift means that the association-preventing action of the present invention and other technological contents were proved as a result. FIG. 20 shows a result obtained by investigating the characteristics of the recording ink of the present invention with the evaporated ink. FIG. 21 shows the characteristics of the recorded image with the recording ink of the present invention, proving the use of the recording ink of the present invention in terms of the recorded image.

Furthermore, the evaporated ink that contains both of AR52 and the compound (A) has two peaks as shown in FIG. 20. Therefore, it is evident that the compound (A) compensates all characteristics of AR52 even in the case of using recording ink, and the fluorescence emission of the compound (A) exerts its characteristics enough to enhance the predetermined emission wavelength. In addition, as shown in FIG. 21, the recorded image has two peaks, so that there is shown that the fluorescence ink in which the concentration quenching can be hardly generated is completed and durability that continues to enhance the fluorescence intensity in the long term is provided.

Figure 22:
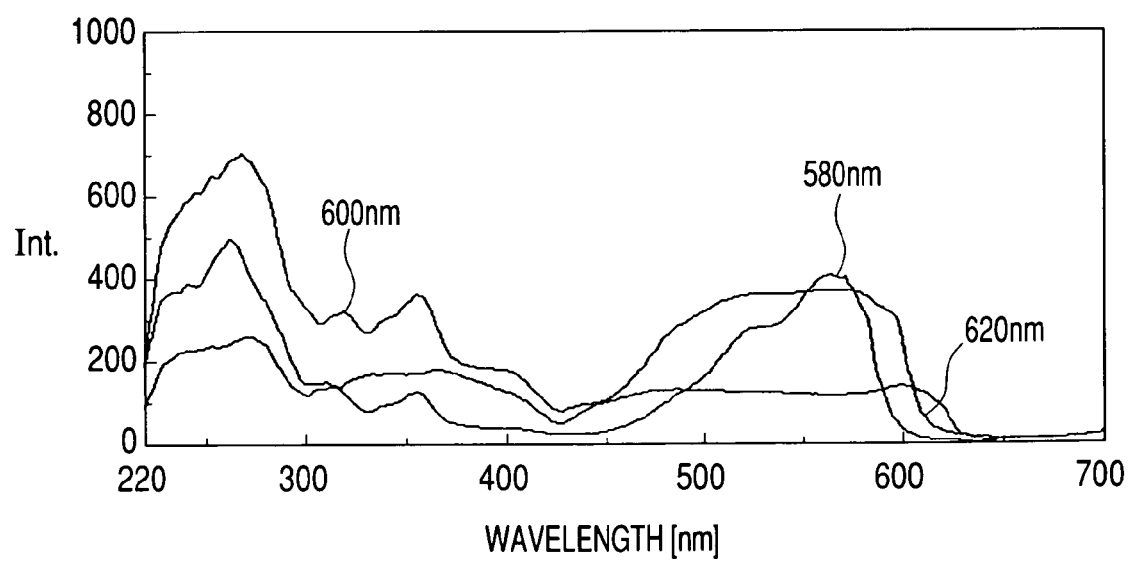
FIG. 22 shows excitation spectra of C.I. Acid Red 52 at 580, 600 and 620 nm.

Note that the predetermined fluorescence wavelength in the present invention can be selected depending on the application of the ink and images formed with the ink. For example, FIG. 22 shows the excitation spectra of AR52 obtained using fluorescence emission wavelengths (predetermined fluorescence wavelength) of 580, 600, and 620 respectively. Thus, the peak wavelength range corresponding to the peak region next to each predetermined fluorescence wavelength can be defined according to the present invention. As described above, when the predetermined emission wavelength is defined as a band ranging from 580 nm to 620 nm inclusive, it is preferable that the emission wavelengths of the second fluorescent coloring material on excitation at the predetermined excitation wavelength covers most of the peak wavelength ranges of the excitation spectra. In this case, however, in order to obtain an efficiency level higher than the prior arts, the emission wavelength may be a single wave of high efficiency, or preferably it may be a broader band, e.g., 600 nm±5 nm or ±10 nm, when the predetermined emission wavelength is defined as a certain wavelength range. That is, the fluorescence emission wavelength sufficiently includes wavelengths in the excitation spectrum at which the predetermined fluorescence emission is obtained efficiently. For instance, in the case of AR52, as shown in FIG. 22, it is more efficient to satisfy the peak wavelength range of the excitation spectrum for an emission wavelength of 600 nm as described above, not of the excitation spectra for 580 nm and 620 nm. The effects of Aspect 1 above can be naturally enhanced if the addition amount of the second fluorescent coloring material can be increased.

[Aspect 2]

Aspect 2 relates to the conventionally not recognized characteristic requirement in the structure of the second fluorescent coloring material, which allows increased addition of the second fluorescent coloring material to the ink. That is, the conditions for wavelengths described in Aspect 1 for the second fluorescent coloring material are eased such that at least a part of the fluorescence wavelength region overlaps with the excitation spectrum of the first coloring material. The energy relationship between the excitation wavelength and the emission wavelength can be improved by increasing the addition amount of the second fluorescent coloring material. More specifically, the addition amount of the second fluorescent coloring material can be increased while preventing molecular association of the first coloring material with a basic structure of the second coloring material that hinders molecular association of the coloring materials. As a result, the fluorescence intensity at the predetermined emission wavelength can be enhanced. The intensity of the fluorescence emission of the first fluorescent coloring material at the predetermined excitation wavelength can be improved by using a combination of the first and second fluorescent coloring material at least one of which, preferably the second fluorescent coloring material, has a basic structure of the following atoms or atomic groups, or of the following fluorescence group.

In particular, the structure of a coloring material preferably has the plurality of fluorescence groups. That is, a coloring material having a plurality of fluorescence groups in the same molecular structure is large structurally, and shows an enhanced three-dimensional property, compared with the conventional fluorescent coloring material. Thus, it becomes difficult to aggregate or associate the coloring material with regularity as compared to the conventional fluorescent coloring material. Therefore, even if the content of the fluorescent coloring material in the ink is increased compared with that of the conventional coloring material, it is difficult to decrease the fluorescence intensity. Furthermore, a coloring material having a plurality of fluorescence groups in the same molecular structure contains a plurality of fluorescence groups in the single molecule of the coloring material. Thus, the fluorescence emission per molecule becomes strong, so that the intensity of fluorescence emission can be enhanced. In addition, as described above, compared with the conventional fluorescent coloring material, the fluorescent coloring material of the present invention is structurally large, and shows an enhanced three-dimensional property, so that the coloring materials can be easily absorbed on the components of the recording medium, resulting in good water-resistance. Furthermore, when the fluorescent coloring material has substantivity, its water-resistance can be improved and also the substantivity can contribute to the durability of fluorescence emission. Furthermore, the coloring material having a plurality of fluorescence groups in the same molecular structure hardly aggregates or associates with regularity, compared with the conventional coloring-material. Therefore, for example, even if the water content in the ink is evaporated, the aggregation of the coloring material hardly has regularity. Accordingly, a strong aggregation state is hardly caused, so that excellent sticking resistance can be obtained. This mechanism allows the ink of the present invention to have good fluorescence intensity and water-resistance. In addition, the coloring material having a plurality of fluorescence groups in the same molecular structure further improves the effects of the present invention using a sulfonic acid with a strong affinity to water as a hydrophilic group.

A preferable fluorescence group that satisfies the above requirements and is functionally effective may be an aminostilbene disulfonic acid derivative. The structure of the compound (A) also contains this derivative.

In the case of a fluorescent coloring material such as the conventional coloring material, even if the concentration of the coloring material is increased in ink, the fluorescence intensity of the coloring material may not be increased, but the fluorescence intensity may be decreased. In the case of using such a fluorescent coloring material, the applicable concentration range (content in the ink) is narrowed, and there is a limit to raising fluorescence intensity. On the other hand, in a combination of the first and second fluorescent coloring materials according to the present invention which bring color emission into visible light, the fluorescence intensity can be further increased when the content of the fluorescent coloring material is increased depending on an increment of the content.

Examples of fluorescence groups of the fluorescent coloring material of the present invention, with atomic groups and groups having fluorescence brightness functions, are shown below. Here, the fluorescent coloring material of the present invention may have a light absorption wavelength region in the visible light region or other regions, but it is important it fluoresces in the visible light region to give emission corresponding to the excitation wavelength region.

As shown by the above structural formula, the compound (A) has a dimeric structure having plural fluorescence groups and sulfone groups.

Thus, when the fluorescent coloring material contains the fluorescence groups, it increases the fluorescence intensity of the first fluorescent coloring material with excitation at the predetermined excitation wavelength, because of the excellent fluorescence emission corresponding to the predetermined excitation wavelength region of the first fluorescent coloring material. In particular, aminostilbene disulfonic acid derivatives are preferable because of a wide fluorescence emission region.

[Aspect 3]

Aspect 3 is effective alone or in combination with each of Aspects 1 and 2. Aspect 3 is a technology for improving fluorescence intensity by appropriate arrangement of the fluorescent coloring material on the recording medium, utilizing a liquid medium such as a mixture of a first solvent having high solubility to a first coloring material and low solubility to a second coloring material and a second solvent having high solubility to the second coloring material.

Certain dyes cause a chemical phenomenon known as association to maintain an energetically stable state. In this phenomenon of association, for a dye molecule having an almost flat skeleton having two ring structures or less, two molecules face each other and supply and loss of energy occur between these molecules. Therefore, with a fluorescent dye, such a phenomenon may be an inhibiting factor for the fluorescence properties of the dye. Since this stacking state is maintained not only in the ink but also in a printed matter on paper, means for preventing dye association is required. Generally, it has been known to add urea, naphthalene sulfonic acid, or the like as an association-preventing agent for preventing the association. However, if an association-preventing agent itself has florescence property to enhance the fluorescence intensity of the first fluorescent coloring material, and has an association-preventing function, it is possible to attain both effects of enhancing the fluorescence intensity and of efficiently generating fluorescence by virtue of prevention of association.

Then, in preparation of an ink containing a first fluorescent coloring material and a second fluorescent coloring material capable of enhancing the fluorescence intensity of a first fluorescent coloring material when excited at the same excitation wavelength, it is used a mixture solvent containing a first solvent having high solubility to the first coloring material and low solubility to the second coloring material and a second solvent having high solubility to the second coloring material.

Here, the term "having high solubility" or "good solvent" means that the coloring material can be dissolved at a concentration of roughly 3% by mass or more, and the term "having low solubility" or "poor solvent" means that the coloring material can be dissolved at a concentration of less than roughly 3% by mass.

For instance, when water is selected as a first solvent and glycerin is selected as a second solvent, the water has high solubility to AR52 and low solubility to the compound (A) and glycerin has high solubility to the compound (A). Then, ink is prepared by adding AR52 and the compound (A) to a solvent containing water and glycerin. In the ink, the compound (A) is under an environment excess in the poor solvent, so that the compound (A) is dissolved in a weak association state, forming a stable system together with AR52. However, when the ink is placed on a recording medium, the water being a poor solvent quickly diffuses and permeates into the recording medium. On the other hand, glycerin slowly diffuses and permeates into the recording medium due to its high viscosity. At this point, the compound (A) dissolves in, not water being a poor solvent, but in glycerin being a good solvent. Thus, the compound (A) slowly diffuses and permeates into the recording medium together with glycerin. Furthermore, because the glycerin is a good solvent, the compound (A) is absorbed in a monomolecular state by the components of the recording medium. Therefore, good fluorescence emission occurs. Furthermore, the compound (A) is dissolved in a monomolecular state, so that the compound (A) can also prevent the association of AR52. In other word, the molecules of the compound (A) and AR52 are fixed on the recording medium in a state of being mixed and dispersed together to an appropriate degree. Thus, the effect of enhancing the fluorescence intensity of AR52 by the compound (A) becomes significant. In this case, the first fluorescent coloring material and the second fluorescent coloring material each preferably have a plurality of sulfone groups.

Furthermore, for preferable expression of the above phenomenon, the content of the fluorescent coloring material to be used is preferably not more than the amount that the poor solvent can dissolve.

On the other hand, when association prevention is considered in view of the molecular structure of the fluorescent coloring materials, if at least one of the first and second coloring materials has a molecular structure having three or more ring structures, the molecules of the first and second coloring materials is prevented from stacking but present in the vicinity, enabling easy energy transfer and receiving mentioned above. As a result, the fluorescence is intensified.

Thus, the second fluorescent coloring material to be used in the present invention preferably has a plurality of fluorescence groups. More preferably, the second fluorescent coloring material to be used in the present invention further has a basic structure for fluorescence brightening. Furthermore, the fluorescence groups in the second fluorescent coloring material are preferably a dimer.

Examples of a ring structure of a second fluorescent dye are a ring structure having a double bond or a conjugated double bond, an aromatic ring structure, a cyclo ring structure, or a heterocyclic structure, as described above.

When the first fluorescent coloring material and the second fluorescent coloring material are both water-soluble, these two fluorescent coloring materials have preferably the same group for water-solubility for preventing the association more easily. More preferably, the water-solubility group is a sulfone group of which solubility is not affected by the pH of the ink.

In the present invention, the ink may contain a fluorescent or non-fluorescent coloring material as the third coloring material in addition to the above two fluorescent coloring materials.

Next, an aqueous medium that constitutes a fluorescence ink of the present invention together with the dyes described above is described. The aqueous medium to be used in the present invention is preferably an aqueous medium mainly containing water. The content of water in the ink is 10 to 95% by mass, preferably 25 to 93% by mass, more preferably 40 to 90% by mass of the total mass of the ink. The water to be used in the invention is preferably ion-exchanged water.

Furthermore, for the ink of the present invention, water may be solely used as an aqueous medium or may be used in combination with a water-soluble organic solvent to further increase the effects of the present invention.

The water-soluble organic solvents usable in the present invention are those described above, so no repeated here.

The content of the water-soluble organic solution in ink is generally equal to or less than 50% by mass, preferably, 5 to 40% by mass, and more preferably 10 to 30% by mass of the total mass of the ink.

Among those solvents, ethylene glycol, diethylene glycol, triethylene glycol, 2-pyrrolidone, glycerin, and 1,2,6-hexanetriol are preferably used.

Further, the ink of the present invention preferably contains urea., ethylene urea, or trimethylolpropane as a humectant similar to a solvent. Among them, ethylene urea and trimethylolpropane are particularly suitable to the present invention. The content of those is preferably 1% by mass or more and 20% by mass or less of the total mass of the ink.

The fluorescence ink of the present invention constructed as described above is particularly effective when used in inkjet recording. As an inkjet recording method, there are a recording method including acting mechanical energy on ink to discharge liquid droplets and an inkjet recording method including expanding ink with the supply of thermal energy to the ink to discharge liquid droplets. The fluorescence ink of the present invention containing plural fluorescent coloring material is particularly suitable to those inkjet recording methods.

Next, the present invention will be described more concretely with reference to the examples and the reference examples. Here, measured values obtained with pure-water diluents of coloring materials were used for an absorption wavelength region, a maximum absorption wavelength region, and a fluorescence wavelength region. Using an absorption spectrometer, absorption wavelengths were measured. A diluent was prepared such that the absorbance thereof was in the range of 0.5 to 0.7. A higher region from a base line as an absorption peak of the coloring material was defined as an absorption wavelength region, and the peak value was defined as a maximum absorption wavelength region. In addition, for fluorescence wavelengths, the measurement conditions were defined such that the fluorescence intensities would not exceed the measurement threshold value. Then, the measurement of fluorescence wavelengths was performed by using the diluent used in the measurement of absorbance and by fixing the excitation wavelengths of the first and second coloring materials at predetermined wavelengths. A region higher than the base line was defined as a fluorescence emission wavelength region.

Inks in the following examples of plural fluorescence satisfy the configuration of one of print inks according to the first to sixth embodiments of the present invention described above.

Example of Plural Florescence 1

The following components were added to be adjusted to predetermined concentrations, and then the components were mixed and agitated sufficiently, followed by filtration through a micro-filter (manufactured Fuji Photo Film Co., Ltd.) with a pore size of 0.2 μm under pressure to prepare an ink.

| | | |
|---|---|---|
| C.I. Acid Red 52 (first fluorescent coloring material): | 0.25 | part by mass |
| Compound (A) (second fluorescent coloring material): | 1 | part by mass |
| Glycerin: | 7.5 | parts by mass |
| Diethylene glycol: | 5 | parts by mass |
| Urea: | 5 | parts by mass |
| Acetylenol E100 (Acetylene glycol EO adduct, manufactured by Kawaken Fine Chemicals Co., Ltd.) | 1 | part by mass |
| Water: | 80.25 | parts by mass |

The fluorescence emission spectra and excitation spectra of the first and second fluorescent coloring materials were measured using the fluorometer FP-750, manufactured by JASCO Corporation, respectively. Each sample was an ink from which water content was evaporated to remove the influence of water on the measurement.

The absorption wavelength regions of the first and second coloring materials were measured using the spectrophotometer U-3200, manufactured by Hitachi Ltd., after the sample was diluted with pure water 100,000 fold. The absorption wavelength region of the first coloring material ranged from 450 to 620 nm both inclusive, and the maximum absorption wavelength thereof was 565 nm. In addition, the absorption wavelength region of the second coloring material ranged from 300 to 450 nm both inclusive, and the maximum absorption wavelength thereof was 372 nm.

Reference Example 1

The following components were added to predetermined concentrations, and then the components were mixed and agitated sufficiently, followed by filtration through a microfilter (manufactured by Fuji Photo Film Co., Ltd.) with a pore size of 0.2 μm under pressure to prepare an ink.

| | | |
|---|---|---|
| C.I. Acid Red 52 (first fluorescent coloring material): | 0.25 | parts by mass |
| Glycerin: | 7.5 | parts by mass |
| Diethylene glycol: | 5 | parts by mass |
| Urea: | 5 | parts by mass |
| Acetylenol E100 (Acetylene glycol EO adduct, manufactured by Kawaken Fine Chemicals Co., Ltd.): | 1 | part by mass |
| Water: | 81.25 | parts by mass |

(Evaluation)

(1) Fluorescence Intensity

Using an inkjet recording apparatus (BJS600, manufactured by Canon Inc.) having an on-demand type multi-recording head from which ink is discharged by imparting thermal energy depending on a recording signal to the ink, a solid pattern of 50% duty was printed on inkjet plain paper (SW-101, manufactured by Canon Inc.). Subsequently, under the following conditions, the fluorescence intensity was measured using a fluorometer (FP-750, manufactured by JASCO Corporation). The results were evaluated on the basis of the criteria described below and were listed in Table 1. The conditions at the measurement were as follows: the excitation wavelength was set to 254 nm; the fluorescence intensity at the maximum fluorescence wavelength was measured; and the resulting measured fluorescence intensity was normalized by defining the fluorescence intensity of the ink of Reference Example 1 as 100, followed by evaluation with the following criteria:

AA: The measured fluorescence intensity was 150 or more;
A: The measured fluorescence intensity was 110 or more and less than 150; and
B: The measured fluorescence intensity was less than 110.

(2) Color Development

Using an inkjet recording apparatus (BJS600, manufactured by Canon Inc.) having an on-demand type multi-recording head from which ink is discharged by imparting thermal energy depending on a recording signal to the ink, a solid pattern of 50% duty was printed on inkjet plain paper (SW-101, manufactured by Canon Inc.). Subsequently, the color development property was measured using a Macbeth densitometer of a print recording matter (RD-918, manufactured by Macbeth Co., Ltd.).

AA: 0.7 or more, at which a printed matter is visually legible at once;
A: 0.5 or more and less than 0.7, at which a printed matter is visually legible;
B: 0.3 or more and less than 0.5, at which a printed matter is visually legible with difficulty; and
C: less than 0.3, at which a printed matter is not visually legible.

(3) Fastness

Using an inkjet recording apparatus (BJS600, manufactured by Canon Inc.) having an on-demand type multi-recording head from which ink is discharged by imparting thermal energy depending on a recording signal to the ink, a solid pattern of 50% duty was printed on inkjet plain paper (SW-101, manufactured by Canon Inc.). Subsequently, the paper was allowed to stand for 24 hours, and then immersed in running water for 5 minutes. Then, the change of print density was evaluated using Macbeth RD 918 on the basis of the following criteria:

AA: density change of less than 50%, at which a printed matter is visually legible at once;
A: 50% or more and less than 70%, at which a printed matter is visually legible; and
B: 70% or more, at which a printed matter is not visually legible.

TABLE 1

| | (1) Fluorescence intensity | (2) Color development property | (3) Fastness property |
|---|---|---|---|
| Plural Fluorescence Example 1 | AA | A | A |
| Reference Example 1 | B | A | B |

Each ink was prepared according the composition shown in Table 2 in each of Plural Fluorescence Examples 2 to 6 and Reference Examples 2 and 3. Relations of fluorescence, excitation and absorption in the combination of the first coloring material and the second coloring material in the plural-fluorescence example 4 are shown in FIGS. 14-18; relations of fluorescence, excitation and absorption in the combination of the first coloring material and the second coloring material in the plural-fluorescence example 5 are shown in FIGS. 19-22; and relations of fluorescence, excitation and absorption in the combination of the first coloring material and the second coloring material in the reference example 3 are shown in FIGS. 23-26. These charts will not be explained, but will be understood from the foregoing explanation of the technology of the subject plural fluorescent coloring materials and the explanation of the reference example.

Here, each of the above reference examples uses the combination of the conventional coloring materials while using the same solvent conditions as those of the present invention. Thus, each of the above reference examples is provided as the reference example.

TABLE 2

|  | Example 2 | Example 3 | Example 4 | Example 5 | Example 6 | Reference Example 2 | Reference Example 3 |
|---|---|---|---|---|---|---|---|
| First coloring material | AR52 0.25% by mass | AR52 0.25% by mass | BV10 0.25% by mass | AR52 0.25% by mass | AR52 0.25% by mass | AR52 0.5% by mass | AR52 0.25% by mass |
| Second coloring material | Compound (A) 1% by mass | Compound (A) 2% by mass | Compound (A) 1% by mass | SG7 0.3% by mass | Compound (A) 1% by mass | AY73 0.5% by mass | AY18 41% by mass |
| Third coloring material | AR92 0.6% by mass | AR92 0.6% by mass | — | — | — | — | — |
| First solvent | Glycerin 7.5% by mass | Glycerin 7.5% by mass | Triethylene glycol 7.5% by mass | Xylitol 7.5% by mass | — | Glycerin 7.5% by mass | Glycerin 7.5% by mass |
| Diethylene glycol | 5% by mass | 5% by mass | 5% by mass | 5% by mass | 5% by mass | 5% by mass | 5% by mass |
| Urea | 5% by mass | 5% by mass | 5% by mass | 5% by mass | 5% by mass | 5% by mass | 5% by mass |
| Acetylenol E100 | 1% by mass | 1% by mass | 1% by mass | 1% by mass | 1% by mass | 1% by mass | 1% by mass |
| Second solvent (water) | 79.65% by mass | 78.65% by mass | 80.25% by mass | 80.95% by mass | 87.75% by mass | 80.5% by mass | 80.25% by mass |

Each of inks prepared as above was irradiated with light at an excitation wavelength of 254 nm. Then, the spectrum of the resulting fluorescence emission was obtained. For the inks of Plural Fluorescence Examples 2 to 4, effects such as two strong peaks in fluorescence intensities are recognized from FIGS. 20 and 21 and comparison thereof. On the other hand, such a relationship was not found in the inks of

REFERENCE EXAMPLES 1 TO 3

Furthermore, the fluorescence intensities and so on were evaluated just as in the case of each of Plural Fluorescence Example 1 and Reference Example 1. As shown in Table 3, there were substantial differences between the examples and the reference examples.

TABLE 3

|  | (1) Fluorescence intensity | (2) Color development | (3) Fastness |
|---|---|---|---|
| Plural Fluorescence Example 2 | AA | AA | AA |
| Plural Fluorescence Example 3 | AA | AA | AA |
| Plural Fluorescence Example 4 | AA | A | A |
| Plural Fluorescence Example 5 | AA | A | A |
| Plural Fluorescence Example 6 | A | A | A |
| Reference Example 2 | B | AA | B |
| Reference Example 3 | B | A | B |

As described above, according to the present invention, there are provided: a fluorescence ink having a high fluorescence intensity, high color development property, and high fastness property, which cannot be attained in the prior art; and an inkjet recording method using such a fluorescence ink.

In some cases, a non-fluorescent water-soluble coloring material may be used in combination. In such a case, there can be utilized, for example, a direct dye, an acid dye, a basic dye or a vat dye, and specific examples include Direct Black 168, Direct Black 154, Direct Yellow 142, Direct Yellow 86, Direct Red 227, Direct Blue 199, Direct Yellow 142, Direct Black 195, and Food Black 1, 2 but such examples are not restrictive. The water-soluble coloring material can also be employed singly or in combination of two or more kinds.

Also among such water-soluble coloring materials, those with a low solubility in water and showing a pigment-like behavior may be utilized as a water-dispersible coloring material.

An amount of the water-soluble coloring material is not particularly limited, but in general it is preferably within a range of 0.1 to 15 mass % of the total mass of the ink, more preferably 0.1 to 10 mass % and further preferably 1 to 10 mass %.

Also the coloring material having a carboxylic acid as the water-soluble group can specifically be a dis- or tris-azo coloring material with a strong substantivity such as Direct Black 195 or Direct Black 51 or a coloring material of a dimeric structure connected through a connecting group, for example, coloring materials in a form of a free acid as represented by the following general formulas (A) to (C), but not limited thereto.

(1) Coloring materials in a form of a free acid, represented by the following general formula (A):

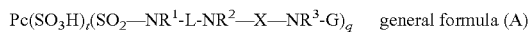  general formula (A)

wherein, Pc represents a metal-containing phthalocyanine nucleus; $R_1$, $R_2$ and $R_3$ each independently represents H, an alkyl group, a substituted alkyl group, an alkenyl group, a substituted alkenyl group, an aralkyl group or a substituted aralkyl group; L represents a divalent organic connecting group; X each independently represents a carbonyl group or a group represented by the following formulas (2) to (4);

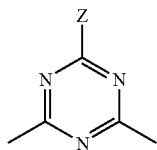 (2)

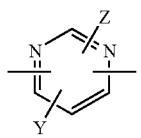 (3)

 (4)

(Z in the formulas (2)-(4) each independently represents $NR_4R_5$, $SR_6$, or $OR_6$; Y in (3) represents H, Cl, aforementioned Z, $SR_7$ or $OR_7$; E in (4) represents Cl or CN; $R_4$, $R_5$, $R_6$ and $R_7$ each independently represents H, an alkyl group, a substituted alkyl group, an aryl group, a substituted aryl group, an aralkyl group or a substituted aralkyl group; and $R_4$ and $R_5$ form a 5- or 6-membered ring together with a nitrogen atom); G represents a colorless organic residue substituted with one or two COSH or COOH; and t+q is 3 or 4.]

An example of the compound represented by the general formula (A) is the following:

Example coloring material (1)

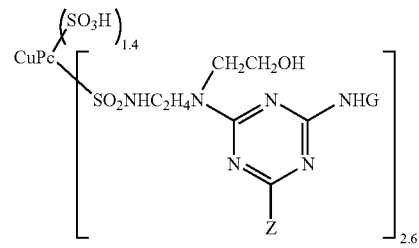 (1)

(2) Coloring materials in a form of a free acid represented by the following general formula (B):

  general formula (B)

[In the general formula (B), J represents the following formula:

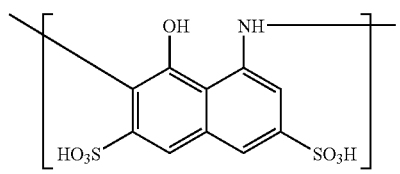

In the general formula (B), $Ar^1$ and $Ar^2$ each independently represents an aryl group or a substituted aryl group, and at least either of $Ar^1$ and $Ar^2$ independently has at least a substituent selected from COOH and COSH; $R_1$ and $R_2$ each independently represents H, an alkyl group, a substituted alkyl group, an alkenyl group, or a substituted alkenyl group; L represents a divalent organic connecting group; n represents 0 or 1; and X each independently represents a carbonyl group or a group represented by the following formulas (2) to (4):

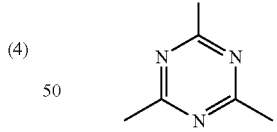 (2)

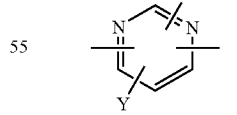 (3)

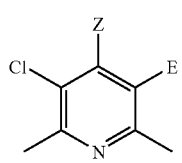 (4)

(Z in the formulas (2)-(4) each independently represents $NR_3R_4$, $SR_5$, or $OR_5$; Y in (3) represents H, Cl, aforementioned Z, $SR_6$ or $OR_6$; E in (4) represents Cl or CN; $R_3$, $R_4$, $R_5$ and $R_6$ each independently represents H, an alkyl group, a substituted alkyl group, an alkenyl group, a substituted alkenyl group, an aryl group, a substituted aryl group, an aralkyl group or a substituted aralkyl group; and $R_4$ and $R_5$ form a 5- or 6-membered ring together with a nitrogen atom); and the compound represented by the general formula (B) includes a group selected from COOH and COSH, of a number-at least equal to that of $SO_3H$.]

Examples of the compound represented by the general formula (B) are as follows:

Example coloring material (2)

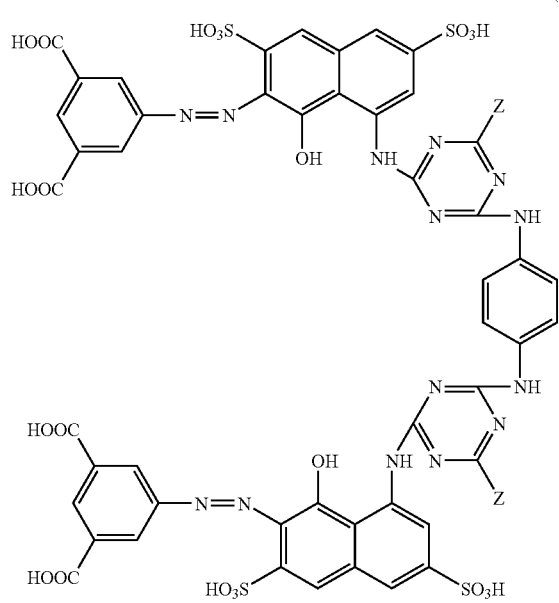

(2)

Example coloring material (3)

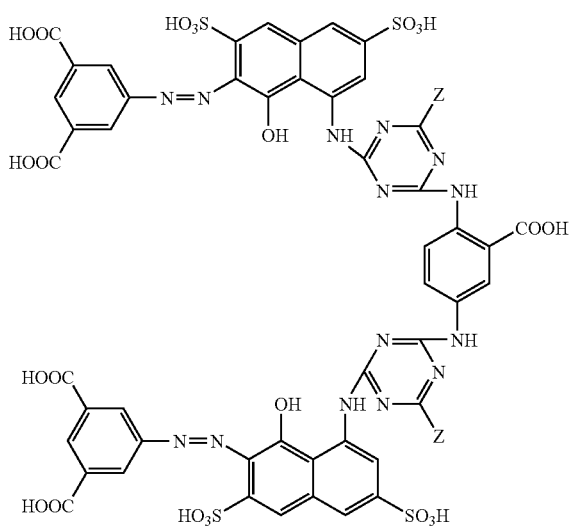

(3)

Example coloring material (4)

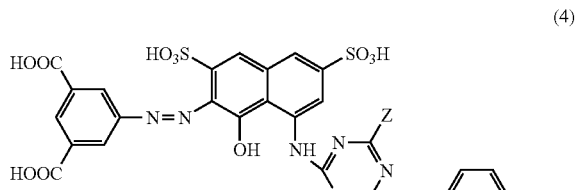

(4)

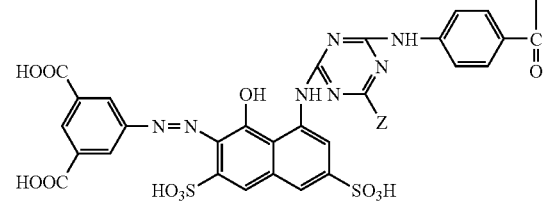

Example coloring material (5)

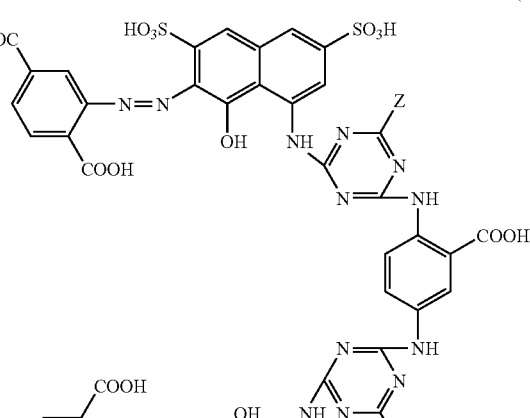

(5)

(3) Coloring materials in a form of a free acid represented by the following general formula (C):

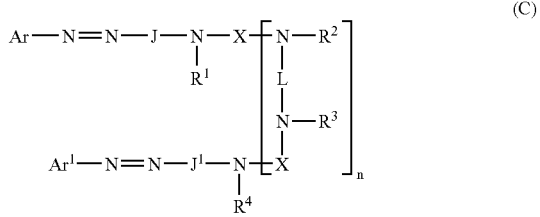

(C)

[In the general formula (C), Ar and Ar¹ each independently represents an aryl group or a substituted aryl group, and at least one of Ar and Ar¹ has a substituent selected from a group of a sulfone group, a carboxyl group and a thiocarboxyl group; and J and J¹ each independently represents the following general formula (2), (3) or (4):

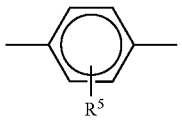

(2)

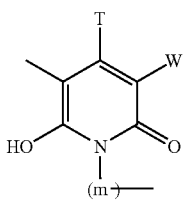

(3)

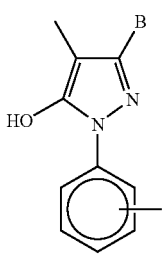

(4)

group, and a substituted alkyl group; L represents a divalent organic connecting group; n represents 0 or 1; and X each independently represents a carbonyl group or a group represented by the following formula (5), (6) and (7):

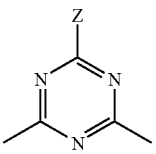

(5)

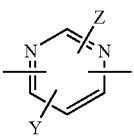

(6)

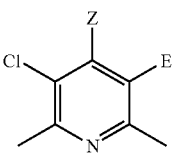

(7)

(In the formula (2), $R_5$ is selected from a hydrogen atom, an alkyl group, a substituted alkyl group, an alkoxy group, a halogen atom, CN, an ureido group and $NHCOR_6$; $R_6$ is selected from a hydrogen atom, an alkyl group, a substituted alkyl group, an aryl group, a substituted aryl group, an aralkyl group and a substituted aralkyl group; in the formula (3), T represents an alkyl group; W is selected from a hydrogen atom, CN, $CONR_{10}R_{11}$, a pyridium group and a carboxyl group; $R_{10}$ and $R_{11}$ each independently is selected from a hydrogen atom, an alkyl group and a substituted alkyl group; m represents an alkylene chain with 2 to 8 carbon atoms; and B in the formula (4) is selected from a hydrogen atom, an alkyl group and a carboxyl group.

In the general formula (C), $R_1$, $R_2$, $R_3$ and $R_4$ each is independently selected from a hydrogen atom, an alkyl (Z in the formulas (5)-(7) is selected from $OR_7$, $SR_7$ and $NR_8R_9$; Y is selected from H, Cl, CN and Z; E is selected from Cl and CN; $R_7$, $R_8$, and $R_9$ each is independently selected from a hydrogen atom, an alkenyl group, a substituted alkenyl group, an alkyl group, a substituted alkyl group, an aryl group, a substituted aryl group, an aralkyl group or a substituted aralkyl group; and $R_8$ and $R_9$ may form a 5- or 6-membered ring together with a nitrogen atom connected thereto).

When the compound of the general formula (C) does not have a sulfone group, there are provided at least two groups selected from carboxyl groups and thiocarboxyl groups, and the compound of the general formula (C) has a group selected from a carboxyl group and a thiocarboxyl group of a number at least equal to that of sulfone group.]

Examples of the compound represented by the general formula (C) are as follows:

Example coloring material (6)

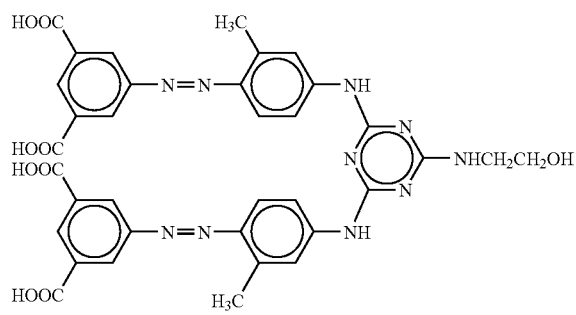

(6)

Example coloring material (7)

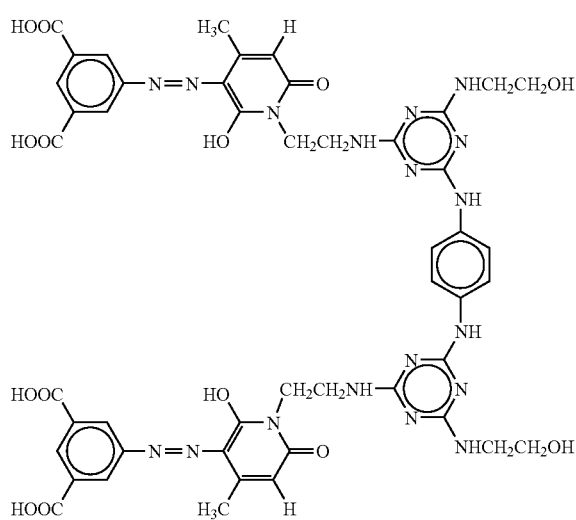

(7)

Example coloring material (8)

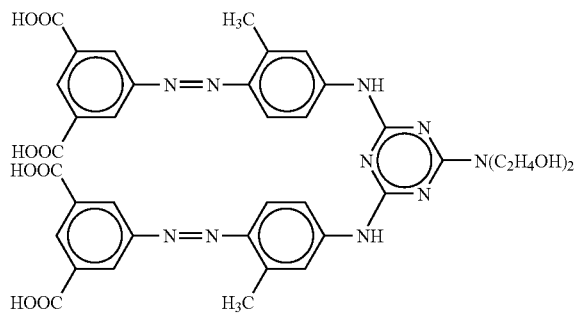

(8)

Example coloring material (9)

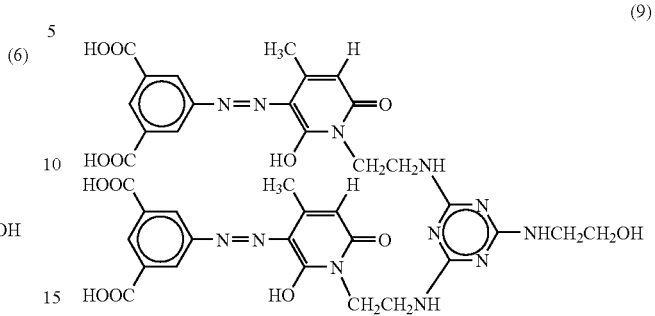

(9)

Example coloring material (10)

(10)

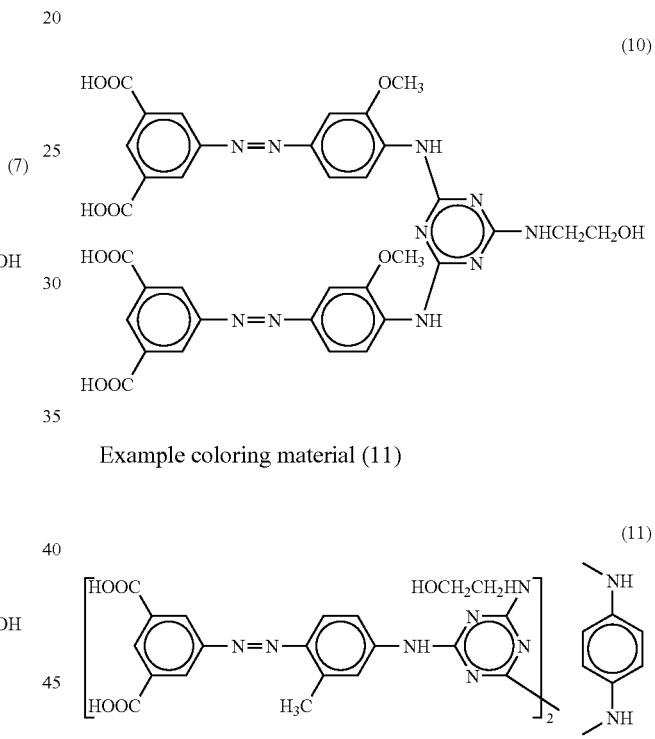

Example coloring material (11)

(11)

Specific examples of the water-soluble organic solvent usable for the ink containing the second coloring material of the present invention include an alkyl alcohol with 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol or n-pentanol; an amide such as dimethylformamide, dimethylacetamide; a ketone or a ketoalcohol such as acetone or diacetone alcohol; an ether such as tetrahydrofuran or dioxane; an oxyethylene or oxypropylene addition product such as diethylene glycol, triethylene glycol, tetraethylene glycol, dipropylene glycol, tripropylene glycol, polyethylene glycol or polypropylene glycol; an alkylene glycol with 2 to 6 alkylene groups such as ethylene glycol, propylene glycol, trimethylene glycol, butylenes glycol, pentanediol or hexylene glycol; a triol such as glycerin, trimethylol ethane, trimethylol propane or 1,2,6-hexanetriol; thiodiglycol; bishydroxyethylsulfone; a lower alkyl glycol ether such as ethylene glycol mono-methyl (or -ethyl or -butyl) ether, diethylene glycol mono-methyl (or -ethyl or -butyl) ether, or triethylene glycol mono-methyl (or -ethyl or -butyl) ether; a lower dialkyl glycol ether such as triethylene glycol di-methyl (or -ethyl) ether or tetraethylene glycol di-methyl (or -ethyl) ether; an alkanolamine such as monoethanolamine, diethanolamine, or triethanolamine; sulforan, N-methyl-2-pyrrolidone, 2-pyrrolidone and 1,3-dimethyl-2-imidazolidinone. Such water-soluble organic solvent as mentioned above may be used singly or in a mixture of two or more kinds.

The content of such water-soluble organic solvents is generally 50 mass % or less in total of the total mass of the ink, preferably 5 to 40 mass % and more preferably 10 to 30 mass %.

Among these solvents, it is preferred to employ ethylene glycol, diethylene glycol, triethylene glycol, 2-pyrrolidone, glycerin or 1,2,6-hexanetriol.

It is also preferred to include, in the ink including the second coloring material of the present invention, a humidifier similar to the solvent such as urea, ethyleneurea or trimethylol propane. In particular, ethyleneurea or trimethylol propane is very suitable to the second coloring material of the present invention. A content of such humidifier is preferably 1 mass % or higher of the total mass of the ink, and is preferably 20 mass % or less.

In the ink including the second coloring material of the present invention, in addition to the foregoing components, there may added, if necessary, a defoaming agent, a surface tension adjusting agent, a pH adjusting agent, a viscosity adjusting agent, a fluorescence intensifier, an antioxidant, an evaporation accelerator, an antirusting agent, an antimold agent and a chelating agent, in order to provide the ink with desired properties.

The ink including the second coloring material of the present invention preferably has a viscosity within a range of 0.7 to 12 cP at 25° C. An ink viscosity outside the above-mentioned range may fail in a normal discharge in the ink jet recording, and, in particular, an ink exceeding 12 cP shows slow permeation into the recording medium due to the viscosity resistance and is undesirable for the fixing property.

Also the ink including the second coloring material of the present invention has a surface tension preferably adjusted within a range of 20 to 60 dyne/cm at 25° C. A surface tension less than 20 dyne/cm is undesirable since the force to retract the meniscus is weak after discharge of a liquid droplet by the ink jet recording system or on the contrary, the retraction force is relatively weak when the meniscus is projected, which may cause bubble inclusion or wetting of the orifice resulting in deviated discharge. The ink proposed by the second coloring material of the present invention, constructed as explained above, is particularly excellent in ink storability, recording density, fixability by drying and print quality as an ink for the ink jet recording on plain paper.

In particular, the structure of a coloring material, especially the second fluorescent coloring material, preferably has the plurality of fluorescence groups.

That is, a coloring material having a plurality of fluorescence groups in the same molecular structure is large structurally, and shows an enhanced three-dimensional property, compared with the conventional fluorescent coloring material. Thus, it becomes difficult to aggregate or associate the coloring material with regularity as compared to the conventional fluorescent coloring material. Therefore, even if the content of the fluorescent coloring material in the ink is increased compared with that of the conventional coloring material, it is difficult to decrease the fluorescence intensity.

Furthermore, a coloring material having a plurality of fluorescence groups in the same molecular structure contains a plurality of fluorescence groups in the single molecule of the coloring material. Thus, the fluorescence emission per molecule becomes strong, so that the intensity of fluorescence emission can be enhanced. In addition, as described above, compared with the conventional fluorescent coloring material, the fluorescent coloring material of the present invention is structurally large, and shows an enhanced three-dimensional property, so that the coloring materials can be easily absorbed on the components of the recording medium, resulting in good water-resistance. Furthermore, when the fluorescent coloring material has substantivity, its water-resistance can be improved and also the substantivity can contribute to the durability of fluorescence emission.

Furthermore, the coloring material having a plurality of fluorescence groups in the same molecular structure hardly aggregates or associates with regularity, compared with the conventional coloring material. Therefore, for example, even if the water content in the ink is evaporated, the aggregation of the coloring material hardly has regularity. Accordingly, a strong aggregation state is hardly caused, so that excellent sticking resistance can be obtained.

This mechanism allows the ink of the present invention to have good fluorescence intensity and water-resistance. In addition, the coloring material having a plurality of fluorescence groups in the same molecular structure further improves the effects of the present invention using a sulfonic acid with a strong affinity to water as a hydrophilic group.

A preferred fluorescence emitting unit is a aminostilbene disulfonic acid derivative.

As a liquid medium for including components such as the dispersed coloring material, there is preferred a mixture of water and a water-soluble organic solvent. Examples of the water-soluble organic solvent include an amide such as dimethylformamide or dimethylacetamide; a ketone such as acetone; an ether such as tetrahydrofuran or dioxane; a polyalkylene glycol such as polyethylene glycol or polypropylene glycol; an alkylene glycol containing an alkylene group with 2 to 6 carbon atoms such as ethylene glycol, propylene glycol, butylene glycol, triethylene glycol, 1,2,6-hexanetriol, thiodiglycol, hexylene glycol, or diethylene glycol; glycerin; a lower alkyl ether of a polyhydric alcohol such as ethylene glycol mono-methyl (or -ethyl) ether, diethylene glycol mono-methyl (or -ethyl) ether, or triethylene glycol mono-methyl (or -ethyl) ether; N-methyl-2-pyrrolidone, 1,3-dimethyl-2-imidazolidinone, triethanolamine, sulforan, dimethylsulfoxide, 2-pyrrolidone; and a compound with a crystalline property such as urea, ethyleneurea, ε-caprolactone, succinimide, thiourea, dimethylolurea or 2-pyrrolidone, and these compounds may have at least one substituent selected from ethylene oxide, propylene oxide and an alkyl. Also a cyclic structure is preferred in consideration of the stability of the crystalline component in the ink. The crystal forming component may be employed singly or in combination of two or more kinds if necessary.

Particularly, a substance that is solid under the normal temperature environment can satisfactorily exhibit the crystal precipitation effect of the invention. The normal temperature environment means the range of 20 to 25° C. In consideration of convenience of use, however, it is advantageous that the crystal forming component which is solid in the normal temperature environment has a melting point of 30° C. or higher, preferably 60° C. or higher and more preferably 120° C. or higher.

The content of such a substance in the ink can be selected according to the kind of the substance, but is preferably within a range of 1 to 30 mass % of the total mass of the ink, more preferably 2 to 20 mass %. An excessively low content is unable to exhibit the effect of the present invention, while an excessively high content detrimentally affect the discharge characteristics when applied to the ink jet recording.

The water content in the ink is selected from the range of 30 to 95 mass %. A water content less than 30 mass % may be unable to secure the dissolving power for water-soluble components, and increases the ink viscosity. On the other hand, a water content exceeding 95 mass % may result in insufficient fixation because of the excess evaporating component.

A surfactant is preferably employed as a component of the ink of the present invention. Various surfactants can be used, but, according to the purpose, a surfactant is used selected from a surfactant capable of holding a water-soluble coloring material more than a water-dispersible coloring material, or a surfactant capable of holding the coloring material having a free sulfonic acid as a principal water-soluble group more than a coloring material having a free carboxylic acid as a principal water-soluble group.

A preferred surfactant is a nonionic or anionic surfactant. This is because a cationic property may deteriorate the color-developing property and the reliability. In particular, a nonionic surfactant is preferable. A preferable nonionic surfactant is one that does not show phase separation in an aqueous solution state. A nonionic surfactant showing a phase separation in the aqueous solution state is undesirable since, if employed in the ink, the ink becomes unstable. This means it is preferable to employ a surfactant that is in appearance in a state dissolved or uniformly dispersed in water. A nonionic surfactant showing an emulsion state in an aqueous solution is particularly preferable. Further, the content of the nonionic surfactant in the ink is preferably not higher than the amount capable of maintaining an emulsion state in an aqueous solution, to eliminate fear for the ink stability reduction.

Among the nonionic surfactants, it is preferred, in the present invention, a surfactant having an HLB not higher than 15, in consideration of the fixability of the ink to the recording medium. In general, an HLB value exceeding 15 increases a water-soluble property, whereby a satisfactory ink permeation into the recording medium cannot be attained.

As the surfactant to be employed in the present invention, a surfactant having a smaller difference between a dynamic surface tension and a static surface tension, because of a faster orienting speed of the surfactant to an interface, can accelerate the diffusion of the liquid medium of the ink on and into the recording medium. Also in case a water-dispersible coloring material is employed in the invention, such a surfactant can promptly adsorb onto such a water-dispersible coloring material, so that it can be oriented and adsorbed on the water-dispersible coloring material still in the minute agglomeration state. Minute agglomerates of the water-dispersible coloring material formed on the recording medium enhance the effect of the present invention. In case the aforementioned difference of the surface tensions is large, the advantage of the present invention cannot be effectively attained.

The content of the nonionic surfactant in the ink of the present invention is specifically 0.5 mass % or higher of the total mass of the ink, preferably 1 to 20 mass %. With a content less than 0.5 mass %, the ink with desired permeation or spreading properties in the image formation may not be obtained, while with a content exceeding 20 mass %, satisfactorily balanced image quality may not be obtained, namely satisfactory balance in performances such as image density, image fixability, prevention of feathering (whisker-like blotting).

Among the nonionic surfactants meeting the aforementioned requirements, particularly preferred ones for the ink of the present invention are compounds represented by the following general formula (I) and compounds represented by the following formulas (II) to (VII), but such examples are not restrictive.

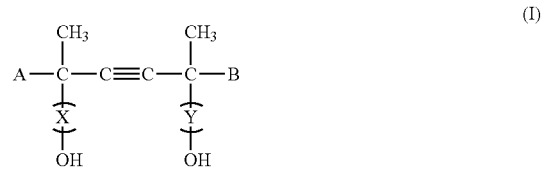

[In the general formula (I), A and B each independently represents $C_nH_{2n-1}$ (n being an integer from 1 to 10); and X and Y each independently represents a ring-opened ethylene oxide unit and/or a ring-opened propylene oxide unit.]

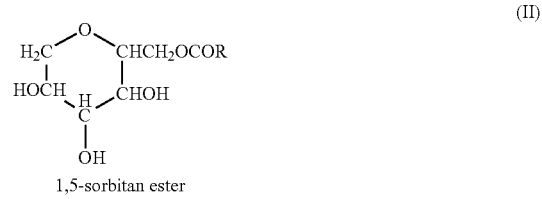

1,5-sorbitan ester

1,4-sorbitan ester

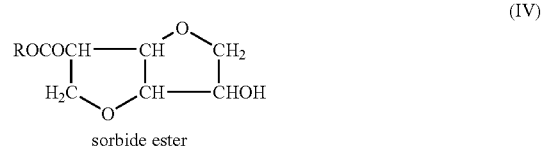

sorbide ester

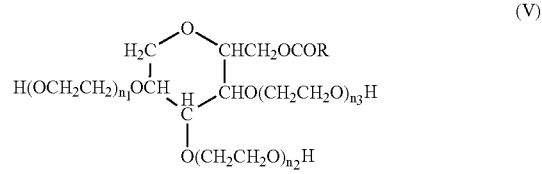

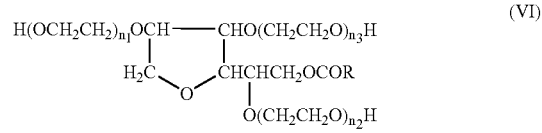

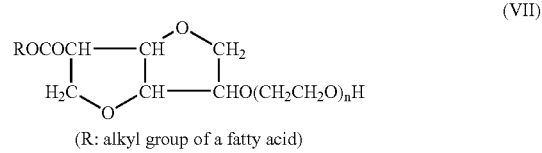

(R: alkyl group of a fatty acid)

Also among the nonionic surfactants represented by the general formula (I), a compound represented by the following general formula (VIII) is particularly preferred.

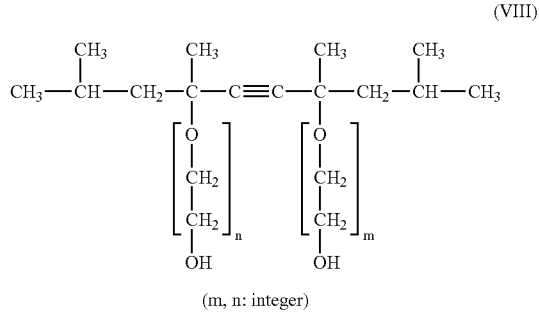

(VIII)

(m, n: integer)

In consideration of the ink stability, the ink of the present invention preferably further includes monohydric alcohol. Monohydric alcohol prevents growth of microbes such as mold that may cause clogging. Also monohydric alcohol facilitates effective expression of the benefit of the present invention, because it enhances ink evaporation or permeation into the recording medium when deposited on the recording medium. The content of monohydric alcohol in the ink of the invention is 0.1 to 20 mass % of the total mass of the ink, preferably 0.5 to 10 mass %. Specific examples of monohydric alcohol employable as an ink component of the invention include ethanol, isopropyl alcohol and n-butanol, and these can be employed singly or in combination of two or more kinds.

The ink of the present invention may further include, if necessary, various additives such as a water-soluble organic solvent, a surfactant, an antirusting agent, an antiseptic, an antimold agent, an antioxidant, an antireductant, an evaporation accelerator, a chelating agent, a water-soluble polymer or a pH adjusting agent.

The ink of the present invention preferably has a surface tension of 40 mN/m or less. This is because it is preferable for the liquid droplet to show a certain spreading after recording, in view of the effective expression of the mechanisms explained in the foregoing. Also the ink of the present invention preferably has a pH value of 6.5 of higher, for the ink stability.

Furthermore, the ink of the present invention preferably contains plural alkali metal ions as counter ions of the coloring material. In the ink jet recording, the combined use improves the stability of the ink and the ink discharging property. Examples of the alkali metal ions are $Li^+$, $Na^+$, $K^+$ etc.

As a method and an apparatus suitable for recording with the ink of the present invention, there can be employed a method and an apparatus of giving a thermal energy corresponding to a recording signal to the ink in a chamber of a recording head and generating a liquid droplet by such thermal energy.

The aqueous ink of the present invention, constructed as explained in the foregoing, can be utilized as an ink for ordinary stationery utensils, but is particularly effective in an ink jet recording. The ink jet recording method includes a recording method of applying a mechanical energy to the ink thereby discharging a liquid droplet and a recording method of applying a thermal energy to the ink to generate a bubble therein thereby discharging a liquid droplet. The ink is particularly suitable for the latter ink jet recording system where the ink is discharged with the ink bubbling phenomenon by thermal energy, providing features of achieving an extremely stable discharge and avoiding generation of satellite dots. In this case, however, adjustment of thermal properties (such as specific heat, thermal expansion coefficient, thermal conductivity etc.) may be required.

Also to solve the water resistance problem of the ink of a record printed on, for example, a plain paper, and at the same time to improve matching with an ink jet head, it is preferable to adjust the physical properties of the ink of the present invention such that the surface tension is from 30 to 40 mN/m at 25° C., and the viscosity is 15 cP or less, preferably 10 cP or less and more preferably 5 cP or less. Therefore, in order to adjust the ink to the above-mentioned physical properties and to solve the fixation problem on the plain paper, the water content of the ink of the present invention is advantageously 50 to 98 mass %, preferably 60 to 95 mass %.

On the other hand, the crystal forming component to be included in the ink of the present invention comprises a water-soluble substance which is solid in a normal temperature environment. Such a substance is a crystalliferous substance having crystallinity of acicular, spherical etc. and dissolved with added water. Also such a substance recrystalizes from an aqueous solution thereof, when water is decreased for example by heating. Such a substance can for example be urea, ethyleneurea, ε-caprolactone, succinimide, thiourea, dimethylolurea or 2-pyrrolidone, and at least one of ethylene oxide, propylene oxide and an alkyl may be added as a substituent to these compounds. Also a cyclic structure is preferred in consideration of a stability of a crystalline component in the ink. The crystal forming component may be employed singly or in combination of two or more kinds if necessary. Also a substance which is solid under the normal temperature environment can satisfactorily exhibit the effect of the invention by a crystallization of the crystalline component of the present invention. The normal temperature environment indicates a range of 20 to 25° C., but, in consideration of convenience of use, it is advantageous that the crystal forming component which is solid in the normal temperature environment has a melting point of 30° C. or higher, preferably 60° C. or higher and more preferably 120° C. or higher. A content of such substance in the ink can be selected according to the kind of the substance, but is preferably within a range of 1 to 30 mass % of the total mass of the ink, more preferably 2 to 20 mass %. An excessively low content is unable to exhibit the effect of the present invention, while an excessively high content detrimentally affect the discharge characteristics when applied to the ink jet recording.

The present invention is effective for an ink jet head, and as a replenishing ink therefor. Among the ink jet recording methods, the present invention provides a particularly excellent effect with a recording head and a recording apparatus of the bubble jet system.

The representative configuration and principle are disclosed, for example, in the U.S. Pat. Nos. 4,723,129 and 4,740,796. This system is applicable to either of the so-called on-demand type and the continuous type, but particularly to the on-demand type, where at least one driving signal is applied to an electrothermal converting member arranged corresponding to the sheets or liquid channels holding ink, which causes rapid temperature elevation exceeding nucleus boiling, and thermal energy generated at the electrothermal converting member induces film boiling at the heat action surface of the recording head to form a bubble in the liquid (ink) corresponding one-to-one to the driving signals corresponding to the recording information.

The ink is discharged through a discharge orifice as an ink droplet according to the inflation and shrinkage of the bubble. By forming the driving signals into pulse shapes, growth and shrinkage of the bubble can be effected instantly and adequately to accomplish more preferable discharging of the liquid (ink) particularly excellent in the response characteristics. As the driving signals of such pulse shapes, those disclosed in the U.S. Pat. Nos. 4,463,359 and 4,345,262 are suitable. Further excellent recording can be performed by employment of the conditions described in the U.S. Pat. No. 4,313,124 of the invention concerning the temperature elevation rate of the above-mentioned heating surface.

As the configuration of the recording head, in addition to the combinations of the discharging orifice, liquid channel and electrothermal converting member (linear liquid channel or right-angled liquid channel) as disclosed in the above-mentioned respective specifications, the configuration based on U.S. Pat. Nos. 4,558,333 and 4,459,600 disclosing the configuration having the heating portion arranged in-the flexed region is also effective with the present invention. In addition, the present invention can also be effectively applied to the configuration (Japanese Unexamined Patent Publication No. S59-123670 etc.) using an orifice common to a plurality of electrothermal converting members.

Furthermore, the present invention is effectively applicable to the recording head of a full line type having a length corresponding to the maximum width of the printing medium which can be recorded by the printing device, and such recording head may have a configuration realizing such length by the combination of plural recording heads, or a configuration constituted by an integrally formed single recording head.

In addition, the present invention is effective, within the printing devices of the serial type mentioned above, in a recording head fixed to the main body of the printing device, or an exchangeable chip-type recording head enabling electrical connection with the main body of the printing device or ink supply from such main body by being mounted on the main body, or the recording head of a cartridge type in which an ink tank is integrally provided in the recording head itself. Also in the configuration of the printing device of the present invention, the addition of discharge restoration means for the recording head, preliminary auxiliary means etc. is preferable, because the effect of the present invention can be further stabilized. Specific examples of these may include, capping means, cleaning means, pressurization or aspiration means, preliminary heating means for effecting heating by an electrothermal converting member, another heating element or a combination thereof, and preliminary discharge means for effecting an idle discharge independent from that for printing.

EXAMPLES

In the following, the present invention will be clarified in detail by examples, but such examples do not limit the scope of the invention. In the text, percentage is based on mass unless otherwise specified.

In Examples and Comparative Examples, inks were prepared by mixing the following components, then sufficiently dissolving and/or dispersing these under sufficient agitation and executing a filtration under pressurization with a Fluoropore filter of a pore size of 0.1 μm (manufactured by Sumitomo Denko Co.):

Example 1

Ink Composition

| | |
|---|---|
| Cabojet 300 (self-dispersing coloring material, water-soluble group: carboxylic acid group, a 15 wt % aqueous solution) | 6.7% |
| C.I. Acid Red 52 (water-soluble fluorescent coloring material, hydrophilic group: sulfonic acid group) | 0.2% |
| Diethylene glycol | 10% |
| Triethylene glycol | 10% |
| Surfactant of general formula (VIII) (20 mole-ethylene oxide adduct to induce coagulation of the water-dispersible coloring material) | 2% |
| Pure water | remainder |

Example 2

Ink Composition

| | |
|---|---|
| Cabojet 300 (a 15 wt % aqueous solution) | 13.4% |
| C.I. Acid Red 52 | 0.2% |
| Diethylene glycol | 10% |
| Triethylene glycol | 10% |
| Surfactant of general formula (VIII) (20 mole ethylene oxide adduct) | 2% |
| Pure water | remainder |

Example 3

Ink Composition

Preparation of Pigment Dispersion

An ABC type block polymer having an acid value of 350 and a number-averaged molecular weight of 5000 was prepared by an ordinary method from benzyl methacrylate, methacrylic acid and ethoxyethylene glycol methacrylate, then neutralized with an aqueous solution of potassium hydroxide, and was diluted with ion-exchanged water to obtain a uniform 50% aqueous polymer solution. To 60 g of this 50% polymer solution, 100 g of carbon black and 340 g of ion-exchanged water were mixed and mechanically agitated for 0.5 hours. This mixture was processed in a microfluidizer by passing 5 times through an interaction chamber under a liquid pressure of about 10,000 psi (about 70 MPa) to obtain a dispersion liquid. The dispersion liquid was centrifuged (12,000 rpm, 20 minutes) to remove coarse particles. The obtained dispersion 4 had a pigment concentration of 10% and a dispersant concentration of 3.5%.

Ink Composition

| | |
|---|---|
| Pigment dispersion 1 | 15% |
| C.I. Acid Red 289 (water-soluble fluorescent coloring material, hydrophilic group: sulfonic acid group) | 0.1% |
| Glycerin | 8% |
| Triethylene glycol | 8% |
| Ethyleneurea | 9% |
| Surfactant of general formula (VIII) (0 mole ethylene oxide adduct for coagulation of the water-dispersible coloring material) | 1.5% |
| Pure water | remainder |

Example 4

Ink Composition

| | |
|---|---|
| Cabojet 300 (a 15 wt % aqueous solution) | 10.0% |
| Cabojet 200 (self-dispersing coloring material, water-soluble group: carboxylic acid group, a 15 wt % aqueous solution) | 3.4% |
| C.I. Acid Red 52 | 0.15% |
| Diethylene glycol | 10% |
| Triethylene glycol | 10% |
| Surfactant of general formula (VIII) (10-mole ethylene oxide adduct for coagulation of the water-dispersible coloring material) | 2% |
| Pure water | remainder |

Example 5

Ink Composition

| | |
|---|---|
| Cabojet 300 (a 15 wt % aqueous solution) | 6.7% |
| Pigment dispersion 1 | 6.7% |
| C.I. Acid Red 52 | 0.1% |
| Diethylene glycol | 10% |
| Triethylene glycol | 10% |
| Surfactant of general formula (VIII) (10 mole ethylene oxide adduct for coagulation of the water-dispersible coloring material) | 2% |
| Pure water | remainder |

Example 6

Ink Composition

| | |
|---|---|
| Cabojet 300 (a 15 wt % aqueous solution) | 15.0% |
| Fluorescent material A (hydrophilic group: sulfonic acid group) | 2% |
| Glycerin | 8% |
| Triethylene glycol | 8% |
| Surfactant of general formula (VIII) (10 mole ethylene oxide adduct for coagulation of water-dispersible coloring material) | 2% |
| Pure water | remainder |

Example 7

Ink Composition

| | |
|---|---|
| Cabojet 300 (a 15 wt % aqueous solution) | 14.0% |
| C.I. Acid Red 52 | 0.1% |
| Fluorescent material A | 2% |
| Glycerin | 8% |
| Ethyleneurea | 9% |
| Surfactant of general formula (VIII) (10 mole ethylene oxide adduct) | 2% |
| Pure water | remainder |

Example 8

Ink Composition

| | |
|---|---|
| Cabojet 300 (a 15 wt % aqueous solution) | 1.3% |
| C.I. Acid Red 52 | 0.1% |
| Fluorescent material A | 2% |
| Diethylene glycol | 7% |
| Triethylene glycol | 7% |
| Ethyleneurea | 7% |
| Newpol GE600 (trade name, manufactured by Sanyo Chemical Co. for coagulation of the water-dispersible coloring material) | 1.0% |
| Pure water | remainder |

Example 9

Ink Composition

| | |
|---|---|
| Cabojet 300 (a 15 wt % aqueous solution) | 10.0% |
| Cabojet 200 (a 15 wt % aqueous solution) | 3.4% |
| C.I. Acid Red 52 | 0.1% |
| Fluorescent material A) | 2% |
| Diethylene glycol | 7% |
| Triethylene glycol | 7% |
| Ethyleneurea | 7% |
| Surfactant of general formula (VIII) (10 mole ethylene oxide adduct) | 2% |
| Pure water | remainder |

Example 10

Ink Composition

Preparation of Pigment Dispersion

An AB type block polymer having an acid value of 250 and a number-averaged molecular weight-of 3000 was prepared by an ordinary method from benzyl methacrylate and methacrylic acid, then neutralized with an aqueous solution of potassium hydroxide, and diluted with ion-exchanged water to obtain a uniform 50% aqueous polymer solution. 100 g of this 50% polymer solution, 100 g of C.I. Pigment Red 122 and 300 g of ion-exchanged water were mixed and mechanically agitated for 0.5 hours. This mixture was processed in a microfluidizer by passing 5 times through an interaction chamber under a liquid pressure of about 10,000 psi (about 70 MPa) to obtain a dispersion liquid. The dispersion liquid was centrifuged to remove coarse particles (12,000 rpm, 20 minutes) to obtain a dispersion 2. The obtained dispersion 2 had a pigment concentration of 10% and a dispersant concentration of 5%.

Ink Composition

| | |
|---|---|
| Pigment dispersion prepared above | 6.7% |
| C.I. Acid Red 52 | 0.05% |
| C.I. Acid Red 92 (water-soluble fluorescent coloring material, hydrophilic group: sulfonic acid group) | 0.6% |

-continued

| | |
|---|---|
| Fluorescent material A) | 2% |
| Glycerin | 7% |
| Ethyleneurea | 9% |
| Surfactant of general formula (VIII) (10 mole ethylene oxide adduct) | 1.2% |
| Pure water | remainder |

Example 11

Ink Composition

Preparation of Pigment Dispersion 3

An AB type block polymer having an acid value of 250 and a number-averaged molecular weight of 3000 was prepared by an ordinary method from benzyl methacrylate and methacrylic acid, then neutralized with an aqueous solution of potassium hydroxide, and diluted with ion-exchanged water to obtain a uniform 50% aqueous polymer solution. 180 g of this 50% polymer solution, 100 g of C.I. Pigment Blue 15:3 and 220 g of ion-exchanged water were mixed and mechanically agitated for 0.5 hours. This mixture was processed in a microfluidizer by passing 5 times through an interaction chamber under a liquid pressure of about 10,000 psi (about 70 MPa) to obtain a dispersion liquid. The dispersion liquid was centrifuged to remove coarse particles (12,000 rpm, 20 minutes) to obtain a dispersion 1. The obtained dispersion 1 had a pigment concentration of 10% and a dispersant concentration of 10%.

Ink Composition

| | |
|---|---|
| Pigment dispersion | 0.05% |
| Cabojet 300 (a 15 wt % aqueous solution) | 13.4% |
| C.I. Acid Red 52 | 0.1% |
| Fluorescent material A | 2% |
| Glycerin | 7% |
| Ethyleneurea | 9% |
| Surfactant of general formula (VIII) (20 mole ethylene oxide adduct) | 2% |
| Pure water | remainder |

Example 12

Ink Composition

| | |
|---|---|
| Cabojet 300 (a 15 wt % aqueous solution) | 13.4% |
| C.I. Acid Red 52 | 0.1% |
| Fluorescent material A | 2% |
| Glycerin | 7% |
| Ethyleneurea | 9% |
| Surfactant of general formula (VIII) (10 mole ethylene oxide adduct) | 2% |
| Newpol GE600 | 1% |
| Pure water | remainder |

Example 13

Ink Composition

| | |
|---|---|
| IJX266 (water-dispersible coloring material, water-soluble group: sulfonic acid group, a 15 wt % aqueous solution) | 6.7% |
| C.I. Acid Red 52 | 0.1% |
| Fluorescent material A | 2% |
| C.I. Solvent Green 7 (water-soluble fluorescent coloring material, hydrophilic group: sulfonic acid group) | 1% |
| C.I. Acid Yellow 7 (water-soluble fluorescent coloring material, hydrophilic group: sulfonic acid group) | 0.05% |
| Glycerin | 7% |
| Diethylene glycol | 5% |
| Triethylene glycol | 7% |
| Surfactant of general formula (VIII) (10 mole ethylene oxide adduct) | 2% |
| Sodium dodecylbenzenesulfonate | 0.5% |
| Pure water | remainder |

Example 14

Ink Composition

| | |
|---|---|
| Pigment dispersion 1 | 0.05% |
| Cabojet 300 (a 15 wt % aqueous solution) | 13.4% |
| C.I. Acid Red 52 | 0.2% |
| C.I. Acid Red 289 (water-soluble fluorescent coloring material, hydrophilic group: sulfonic acid) | 0.05% |
| Fluorescent material A | 1% |
| C.I. Solvent Green 7 | 1% |
| C.I. Acid Yellow 184 (water-soluble fluorescent coloring material, hydrophilic group: sulfonic acid) | 0.5% |
| Glycerin | 7% |
| Ethyleneurea | 9% |
| Surfactant of general formula (VIII) (10 mole ethylene oxide adduct) | 1.5% |
| Pure water | remainder |

Example 15

Ink Composition

| | |
|---|---|
| Pigment dispersion in Example 13 | 12.0% |
| C.I. Acid Red 52 | 0.05% |
| C.I. Acid Red 289 | 0.5% |
| Fluorescent material A | 2% |
| Glycerin | 8% |
| Triethylene glycol | 8% |
| Surfactant of general formula (VIII) (10 mole ethylene oxide adduct) | 1.2% |
| Pure water | remainder |

Example 16

Ink Composition

| | |
|---|---|
| Cabojet 300 (a 15 wt % aqueous solution) | 13.4% |
| IJX253 (self-dispersing coloring material, water-soluble group: sulfonic acid group, a 15 wt % aqueous solution) | 0.05% |
| C.I. Acid Red 52 | 0.1% |
| Fluorescent material A | 1% |
| C.I. Solvent Green 7 | 0.05% |
| Glycerin | 7% |
| Ethyleneurea | 9% |
| Surfactant of general formula (VIII) (10 mole ethylene oxide adduct) | 2% |
| Pure water | remainder |

Example 17

Ink Composition

| | |
|---|---|
| Cabojet 300 (a 15 wt % aqueous solution) | 13.4% |
| C.I. Acid Red 52 | 0.1% |
| Fluorescent material A | 1.5% |
| Glycerin | 7% |
| Ethyleneurea | 9% |
| Ionet T60C (trade name, manufactured by Sanyo Chemical Co., for coagulation of the water-dispersible coloring material) | 2% |
| Pure water | remainder |

Example 18

Ink Composition

| | |
|---|---|
| Cabojet 300 (a 15 wt % aqueous solution) | 13.4% |
| C.I. Acid Red 52 | 0.1% |
| Fluorescent material A | 1.5% |
| Glycerin | 7% |
| Ethyleneurea | 9% |
| Surfactant of general formula (VIII) (10 mole ethylene oxide adduct) | 2% |
| Isopropyl alcohol | 2% |
| Pure water | remainder |

Example 19

Ink Composition

| | |
|---|---|
| Cabojet 300 (a 15 wt % aqueous solution) | 13.4% |
| C.I. Acid Red 52 | 0.1% |
| Fluorescent material A | 1.5% |
| Glycerin | 7% |
| Ethyleneurea | 9% |
| Surfactant of general formula (VIII) (10 mole ethylene oxide adduct) | 2% |
| Isopropyl alcohol | 2% |
| Triethanolamine | 0.1% |
| Pure water | remainder |

Example 20

Ink Composition

| | |
|---|---|
| Cabojet 300 (a 15 wt % aqueous solution) | 13.4% |
| CD380 (water-soluble coloring material, water-soluble group: carboxylic acid group, manufactured by Liedel de Haan) | 0.1% |
| Glycerin | 7% |
| Ethyleneurea | 9% |
| Surfactant of general formula (VIII) (10 mole ethylene oxide adduct) | 2% |
| Pure water | remainder |

Example 21

Ink Composition

| | |
|---|---|
| Cabojet 300 (a 15 wt % aqueous solution) | 13.4% |
| C.I. Acid Red 52 | 0.1% |
| Fluorescent material A | 1.5% |
| Glycerin | 7% |
| Ethyleneurea | 9% |
| Surfactant of general formula (VIII) (20 mole ethylene oxide adduct) | 2% |
| Surfactant of general formula (VIII) (10 mole ethylene oxide adduct) | 1% |
| Pure water | remainder |

Example 22

Ink composition

| | |
|---|---|
| Cabojet 300 (a 15 wt % aqueous solution) | 13.4% |
| C.I. Acid Red 52 | 0.1% |
| Ethylene glycol | 10% |
| Triethylene glycol | 10% |
| Surfactant of general formula (VIII) (10 mole ethylene oxide adduct) | 0.75% |
| Pure water | remainder |

Example 23

Ink Composition

| | |
|---|---|
| Cabojet 300 (a 15 wt % aqueous solution) | 16.8% |
| C.I. Acid Red 52 | 0.1% |
| Ethylene glycol | 10% |
| Triethylene glycol | 10% |
| Surfactant of general formula (VIII) (10 mole ethylene oxide adduct) | 0.75% |
| Pure water | remainder |

Example 24

Ink Composition

| | |
|---|---|
| Cabojet 300 (a 15 wt % aqueous solution) | 20.0% |
| C.I. Acid Red 52 | 0.1% |
| Ethylene glycol | 10% |
| Triethylene glycol | 10% |
| Surfactant of general formula (VIII) (10 mole ethylene oxide adduct) | 0.75% |
| Pure water | remainder |

Example 25

Ink Composition

| | |
|---|---|
| Cabojet 300 (a 15 wt % aqueous solution) | 26.7% |
| C.I. Acid Red 52 | 0.1% |
| Ethylene glycol | 10% |
| Triethylene glycol | 10% |
| Surfactant of general formula (VIII) (10 mole ethylene oxide adduct) | 0.75% |
| Pure water | remainder |

Ink Composition

Comparative Example 1

| | |
|---|---|
| C.I. Acid Red 52 | 0.2% |
| C.I. Direct Black 154 (water-soluble coloring material, hydrophilic group: sulfonic acid group) | 2% |
| Glycerin | 10% |
| Ethylene glycol | 5% |
| Pure water | remainder |

Ink Composition

Comparative Example 2

| | |
|---|---|
| C.I. Acid Red 52 | 0.2% |
| C.I. Direct Black 154 | 2% |
| Glycerin | 10% |
| Ethylene glycol | 5% |
| Surfactant of general formula (VIII) (10 mole ethylene oxide adduct for dissolving above-mentioned two dyes) | 1% |
| Pure water | remainder |

Ink Composition

Comparative Example 3

| | |
|---|---|
| Millijet Black 2000 (polymer-modified dye, a product of MILLIKEN CHEMICAL) | 1.9% |
| Millijet Blue 18 (polymer-modified dye, a product of MILLIKEN CHEMICAL) | 3% |
| C.I. Acid Red 52 | 0.4% |
| Pyranin 120 (water-soluble fluorescent coloring material, hydrophilic group: sulfonic acid group) | 1.4% |
| C.I. Acid Yellow 7 | 0.2% |
| Triethylene glycol monobutyl ether | 4.6% |
| 4-methylmorpholine | 2.5% |
| Polyviylpyrrolidone (K-12) | 6% |
| Sodium dodecylbenzenesulfonate | 1.1% |
| Triethanolamine | 0.1% |
| Pure water | remainder |

Ink Composition

Comparative Example 4

| | |
|---|---|
| Pigment dispersion 2 | 4.3% |
| C.I. Acid Red 52 | 0.5% |
| C.I. Acid Yellow 73 (water-soluble fluorescent coloring material, hydrophilic group: carboxylic acid group) | 0.5% |
| 2-Pyrrolidone | 8% |
| Triethylene glycol | 7% |
| Pure water | remainder |

Ink Composition

Comparative Example 5

| | |
|---|---|
| Pigment dispersion prepared in Example 10 | 20% |
| C.I. Acid Red 52 | 1% |
| Ethylene glycol | 7% |
| Diethylene glycol | 7% |
| Triethylene glycol | 7% |
| 2-Pyrrolidone | 8% |
| pure water | remainder |

Ink Composition

Comparative Example 6

| | |
|---|---|
| C.I. Acid Red 52 | 0.5% |
| C.I. Acid Yellow 7 | 0.5% |
| Glycerin | 7% |
| Ethylene glycol | 7% |
| Diethylene glycol | 7% |
| Pure water | remainder |

Ink Composition

Comparative Example 7

| | |
|---|---|
| C.I. Food Black 2 (water-soluble fluorescent coloring material, hydrophilic group: sulfonic acid group) | 2% |
| C.I. Acid Yellow 52 (water-soluble fluorescent coloring material, hydrophilic group: sulfonic acid group) | 0.1% |
| Glycerin | 7% |
| Ethylene glycol | 7% |
| Diethylene glycol | 7% |
| Pure water | remainder |

Ink Composition

Comparative Example 8

| | |
|---|---|
| Cabojet 300 (a 15 wt % aqueous solution) | 13.4% |
| C.I. Acid yellow 52 | 1% |
| C.I. Acid Yellow 73 | 1% |
| Glycerin | 7% |
| Ethylene glycol | 7% |
| Diethylene glycol | 7% |
| Pure water | remainder |

<Evaluation>

(Evaluation for Separation of Coloring Materials 1)

0.5 ml of each ink of Examples and Comparative Examples were dropped with a commercial dropper onto a commercially available bond paper from a height of 10 cm above the paper, and the change of the ink drop on the paper was evaluated according to the following criteria:

A: On the paper surface where the ink was dropped, a first region of the concentrated first coloring material was formed in the center, and a second region with the second coloring material was clearly formed on the entire periphery. On the rear side of the paper, diffusion of the second region was observed.

B: On the paper surface where the ink was dropped, the first region with the concentrated first coloring material was formed in the center, and the second region with the second coloring material was slightly observed on the entire periphery very close to the edge of the first region. On the rear side of the paper, diffusion of the second region was observed.

C: On the paper surface where the ink was dropped, the region of the first coloring material was formed in the center, but an region of the second coloring material was not observed on the periphery. On the rear side of the paper, a diffusion of the second coloring material was observed.

D: On the paper surface where the ink was dropped, the region of the first coloring material was formed in the center, but the region of the second coloring material was not observed on the periphery. Also on the rear side of the paper, diffusion of the second coloring material was not observed.

(Evaluation for Separation of Coloring Materials 2)

Each ink of Examples and Comparative Examples was used with a commercially available ink jet recording apparatus BJS600 (trade name, manufactured by Canon Inc.) to print a single-dot image, which was radiated with an excitation light of 254 nm using a commercial ultraviolet irradiator (trade name: Handy UV Lamp SLUV-4, manufactured by Iuchi), and examined microscopically under a stereo microscope.

Evaluation was carried out according to the following criteria:

A: Within a dot on the paper, there are a fluorescing portion and a large number of small coagulations with no fluorescence. When the periphery of the dot was observed at a lower magnification, fluorescence was observed on the periphery of the dot.

B: Within a dot on the paper, there were a fluorescent portion and a large number of small coagulations not fluorescing. However, the fluorescence was weak, and the separation of the first coloring material and the second coloring material was not sufficient.

C: Within a dot on the paper, any fluorescing portion was not observed, and an assembly of coagulations without fluorescence was observed.

(Evaluation of Fluorescence Emission 1)

Each sample subjected to the foregoing evaluation for separation of coloring materials 1 was irradiated with an exciting light of 254 nm by using a commercial ultraviolet irradiator (trade name: Handy UV Lamp SLUV-4, manufactured by Iuchi), and the dropped ink was examined visually and evaluated according to the following criteria:

A: On the surface of the commercial bond paper on which an ink drop was dropped, clear fluorescence emission was observed in the second region of the second coloring material than in the first region of the first coloring material. Also the fluorescence emission by the second coloring material was observed on the opposite surface.

B: On the surface of the commercial bond paper on which an ink drop was dropped, fluorescence emission of the second coloring material was not observed, and fluorescence was scarcely observed in the first region of the first coloring material. However fluorescence emission by the second coloring material was observed on the opposite surface.

C: On the surface of the commercial bond paper on which an ink drop was dropped, fluorescence emission of the second coloring material was not observed, and fluorescence emission was scarcely observed in the region of the first coloring material. The fluorescence emission of the second coloring material was not observed on the opposite surface.

(Evaluation of Fluorescence Emission 2)

Each ink of Examples and Comparative Examples was used in a commercially available ink jet recording apparatus BJS600 (trade name, manufactured by Canon Inc.) to print a solid image of 100% duty and alphanumeric characters, which were examined visually under irradiation with an exciting light of 254 nm using a commercial ultraviolet irradiator (trade name: Handy UV Lamp SLUV-4, manufactured by Iuchi), and evaluated according to the following criteria:

A: Fluorescence emission was clearly observed with the solid image of 100% duty and the alphanumeric characters.

B: Fluorescence emission was slightly observed with the solid image of 100% duty and the alphanumeric characters.

C: Fluorescence emission was hardly observed with the solid image of 100% duty and the alphanumeric characters.

(Evaluation of Fluorescence Emission 3)

Each ink of Examples and Comparative Examples was used in a commercially available ink jet recording apparatus BJS600 (trade name, manufactured by Canon Inc.) to print a solid image of 100% duty and a solid image of 50% duty, and the images were examined by using a commercial fluorescence intensity measuring instrument FP-750 (trade name, manufactured by Nippon Keiko Co.) with excitation at 254 nm. Evaluation was carried out according to the following criteria:
- A: The maximum fluorescence emission intensity in the visible region (400-700 nm) was 200 or higher;
- B: The maximum fluorescence emission intensity in the visible region (400-700 nm) was 100 or higher but less than 200;
- C: The maximum fluorescence emission intensity in the visible region (400-700 nm) was less than 100.

(Quality Evaluation)

Each ink of Examples and Comparative Examples was used in a commercially available ink jet recording apparatus BJS600 (trade name, manufactured by Canon Inc.) to print images and alphanumeric characters in different print densities on a commercial bond paper, and the prints were visually evaluated according to the following criteria:
- A: Legibility of alphanumeric characters was satisfactory and granularity was not observed in the images of different print densities, thereby providing a smooth and satisfactory print quality;
- B: Legibility of alphanumeric characters was satisfactory but granularity was observed in the images of different print densities;
- C: Legibility of alphanumeric characters was unsatisfactory and granularity was observed in the images of different print densities.

(Density Evaluation)

Each ink of Examples and Comparative Examples was used in a commercially available ink jet recording apparatus BJS600 (trade name, manufactured by Canon Inc.) to print a solid image of 50% duty on a commercial bond paper, and, after the image was sufficiently fixed for 1 day in an environment of a normal temperature and a normal humidity, a print density was measured by using MacBeth RD918, a print densitometer:
- A: Density was 1.0 or higher;
- B: Density was 0.8 or higher but less than 1.0;
- C: Density was less than 0.8.

(Evaluation of Water Resistance)

Each ink of Examples and Comparative Examples was used in a commercially available ink jet recording apparatus BJS600 (trade name, manufactured by-Canon Inc.) to print a 50% duty solid image on a commercial bond paper, which, after standing for 24 hours, was immersed in city water for 5 minutes and the change of the print density was evaluated with MacBeth RD918 according to the following criteria:
- A: Density change was less than 20%;
- B: Density change was 20% or higher but less than 50%;
- C: Density change was 50% or higher.

(Measurement of Print Contrast)

Figure 31:
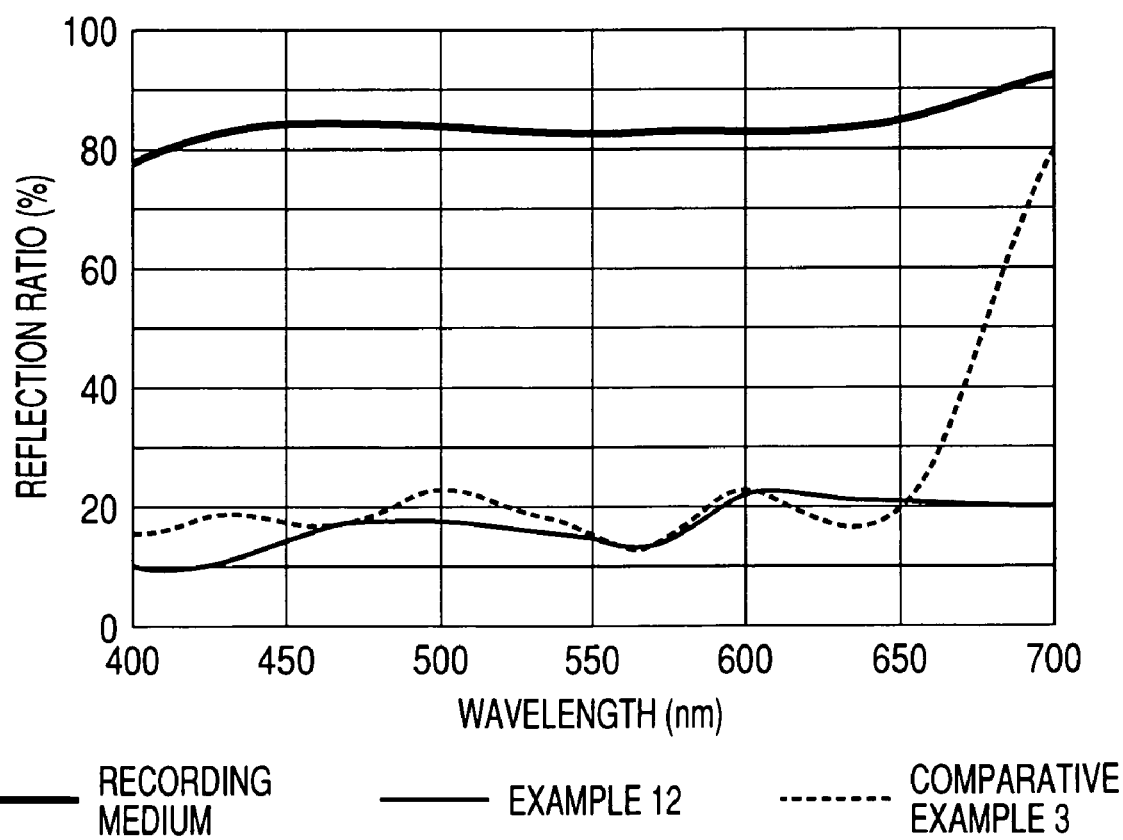
FIG. 31 shows a difference in contrast between inks of Example 12 and Comparative Example 3.

Each ink of Examples 1-9, 11, 12, 14, 16-19 and Comparative Examples 1-3 and 6-8 was used in a commercially available ink jet recording apparatus BJS600 (trade name, manufactured by Canon Inc.) to print a 50% duty solid image on a commercial bond paper, which, after standing for 24 hours, was subjected to a measurement of a reflective density with a reflective densitometer CM2002 (trade name, manufactured by Minolta Ltd.). The inks of the Examples provided a sufficient contrast over an entire wavelength range of 400 to 700 nm, but the contrast was insufficient with the inks of the Comparative Examples. FIG. 31 shows a difference in the contrast of the inks of Example 12 and Comparative Example 3.

(Results of Evaluations)

Evaluation results are shown in the following tables.

|  | Examples | | | | | | | | | | | | | | | | | | | | | | | | |
| --- | --- | --- | --- | --- | --- | --- | --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Separation of color materials 1 | A | A | A | A | A | A | A | A | A | A | A | A | A | A | A | A | A | A | A | A | A | A | A | B | B |
| Separation of color materials 2 | A | A | A | A | A | A | A | A | A | A | A | A | A | A | A | A | A | A | A | A | A | A | A | A | A |
| Evaluation of fluorescence emission 1 | A | A | A | A | A | A | A | A | A | A | A | A | A | A | A | A | A | A | A | A | A | A | A | A | A |
| Evaluation of fluorescence emission 2 | A | A | A | A | A | A | A | A | A | A | A | A | A | A | A | A | A | A | A | A | A | A | A | A | A |
| Evaluation of fluorescence emission 3 | A | A | A | A | A | A | A | A | A | A | A | A | A | A | A | A | A | A | A | A | A | A | A | B | B |
| Evaluation of quality | A | A | A | A | A | A | A | A | A | A | A | A | A | A | A | A | A | A | A | A | A | A | A | A | A |
| Evaluation of density | A | A | A | A | A | A | A | A | A | A | A | A | A | A | A | A | A | A | A | A | A | A | A | A | A |
| Evaluation of water fastness | A | A | A | A | A | A | A | A | A | A | A | A | A | A | A | A | A | A | A | A | A | A | A | A | A |

|  | Comparative Examples | | | | | | | |
| --- | --- | --- | --- | --- | --- | --- | --- | --- |
|  | 1 | 2 | 3 | 4 | 5 | 6 | 7 | 8 |
| Separation of color materials 1 | C | C | C | C | C | C | C | C |
| Separation of color materials 2 | C | C | C | C | C | C | C | C |
| Evaluation of fluorescence emission 1 | C | C | C | C | C | C | C | C |
| Evaluation of fluorescence emission 2 | C | C | B | B | C | B | C | C |
| Evaluation of fluorescence emission 3 | C | C | B | C | C | C | C | C |
| Evaluation of quality | A | A | A | A | A | A | A | A |
| Evaluation of density | A | A | A | A | A | A | A | A |
| Evaluation of water fastness | B | B | C | C | B | C | C | B |

(Evaluation of Sticking Resistance)

About 100 ml of each ink of Examples was placed in a Petri dish, then left standing for about 1 month in an environment of a temperature of 25° C. and a humidity of 55% to evaporate the water in the ink. Thereafter water of a lost amount was added and a re-dissolving property of the ink was evaluated. Inks utilizing a water-dispersible coloring material of self-dispersible type were re-dissolved, but the re-dissolving property was insufficient in inks utilizing a polymer dispersant.

As explained in the foregoing, the present invention provides an aqueous single fluorescent ink, a fluorescent recorded image and a recording method, providing improved image fastness, and coloring and fluorescing properties. Also reliability such as sticking resistance and discharge properties was satisfactory.

Also the present invention enables recognition of the obtained recorded image with plural colors. The present invention specifically solves the problem of fluorescence intensity reduction due to the overlap of the light emission wavelength and the light absorption wavelength, thereby allowing to obtain a satisfactory fluorescent image.

Furthermore, the ink of the present invention, when applied to an ink jet recording method, shows satisfactory reliability. In particular, an ink employing a self-dispersing coloring material as the water-dispersible coloring material can reduce the ink attachment around a nozzle during continuous discharge and on a blade that removes the ink attached on the nozzle-bearing face, as-a beneficial effect.

Furthermore, the ink of the present invention, as shown by the evaluation of "print contrast", can provide a sufficient contrast, and, as shown by the fluorescence evaluation, the aqueous fluorescent single ink of the present invention provides satisfactory fluorescence emission.

This application claims priority from Japanese Patent Application No. 2003-162988 filed May 2, 2003, which is hereby incorporated by reference herein.

What is claimed is:

1. An aqueous fluorescent ink comprising a first coloring material, a second coloring material, and a liquid medium and water for dissolving or dispersing the coloring materials, wherein at least one of the first coloring material and the second coloring material is a fluorescent coloring material, the ink being capable of forming on a recording medium a first region, in which the first coloring material is concentrated with the second coloring material, and a second region, in which the second coloring material is present alone, to surround the entire periphery of the first region including a portion in the recording medium,
wherein the first coloring material is a water-dispersible coloring material comprising a number of water-dispersible particles, and the second coloring material is a water-soluble coloring material, and
wherein the first region includes a plurality of minute fixed spots of the first coloring material scattered in a fixed spot of the second coloring material, each of the minute fixed spots comprising a number of water-dispersible particles of the first coloring material in a coagulated state.

2. The ink according to claim 1, wherein a fluorescence emission from the second region is stronger than that from the first region.

3. The ink according to claim 1, further comprising a surfactant, wherein the surfactant is capable of dissolving or dispersing the water-soluble coloring material in an amount that is larger than the amount of the water-dispersible coloring material that can be dissolved or dispersed by the surfactant.

4. The ink according to claim 3, wherein the surfactant is nonionic.

5. The ink according to claim 1, wherein the water-dispersible coloring material is a coloring material that does not emit fluorescence on the recording medium, and the water-soluble coloring material is a coloring material that emits fluorescence on the recording medium.

6. The ink according to claim 1, wherein the second coloring material has a fluorescence emitting wavelength range inside an absorption wavelength range of the first coloring material.

7. A recorded image formed on a recording medium comprising a first region surrounded by a second region, in the first region a first coloring material being concentrated with a second coloring material, and in the second region the second coloring material being present alone surrounding the entire periphery of the first region including a portion in the recording medium, wherein at least one of the first coloring material and the second coloring material is a fluorescent coloring material,
wherein the first coloring material is a water-dispersible coloring material comprising a number of water-dispersible particles, and the second coloring material is a water-soluble coloring material, and
wherein the first region includes a plurality of minute fixed spots of the first coloring material scattered in a fixed spot of the second coloring material, each of the minute fixed spots comprising a number of water-dispersible particles of the first coloring material in a coagulated state.

8. The recorded image according to claim 7, wherein a fluorescence emission from the second region is stronger than that from the first region.

9. The recorded image according to claim 7, wherein the second region is formed by a diffusion of a surfactant.

10. The recorded image according to claim 9, wherein the surfactant is nonionic.

11. The recorded image according to claim 7, wherein the water-dispersible coloring material is a coloring material that does not emit fluorescence on the recording medium, and the water-soluble coloring material is a coloring material that emits fluorescence on the recording medium.

12. The recorded image according to claim 7, wherein the second region has a fluorescence emitting wavelength range inside an absorption wavelength range of the first region.

* * * * *